US008403501B2

(12) United States Patent
Jung et al.

(10) Patent No.: US 8,403,501 B2
(45) Date of Patent: Mar. 26, 2013

(54) MOTION RESPONSIVE DEVICES AND SYSTEMS

(75) Inventors: Edward K. Y. Jung, Bellevue, WA (US);
Eric C. Leuthardt, St. Louis, MO (US);
Royce A. Levien, Lexington, MA (US);
Robert W. Lord, Seattle, WA (US);
Mark A. Malamud, Seattle, WA (US);
John D. Rinaldo, Jr., Bellevue, WA
(US); Lowell L. Wood, Jr., Bellevue, WA (US)

(73) Assignee: The Invention Science Fund, I, LLC, Bellevue, WA (US)

( * ) Notice: Subject to any disclaimer, the term of this patent is extended or adjusted under 35 U.S.C. 154(b) by 497 days.

(21) Appl. No.: 12/217,118

(22) Filed: Jun. 30, 2008

(65) Prior Publication Data

US 2010/0002204 A1 Jan. 7, 2010

Related U.S. Application Data

(63) Continuation-in-part of application No. 12/214,422, filed on Jun. 17, 2008, and a continuation-in-part of application No. 12/217,116, filed on Jun. 30, 2008, and a continuation-in-part of application No. 12/217,115, filed on Jun. 30, 2008, and a (Continued)

(51) Int. Cl.
*G03B 21/26* (2006.01)
(52) U.S. Cl. ........................................................ 353/94
(58) Field of Classification Search .................... 353/69, 353/71, 79, 94
See application file for complete search history.

(56) References Cited

U.S. PATENT DOCUMENTS

| 3,622,223 A | 11/1971 | Brakell |
| 3,623,804 A | 11/1971 | Spreitzer |
| 3,644,027 A | 2/1972 | Bennett |
| 3,874,787 A | 4/1975 | Taylor |
| 3,905,695 A | 9/1975 | Taylor |
| 4,012,133 A | 3/1977 | Burton |
| 4,320,664 A | 3/1982 | Rehn et al. |
| 4,684,136 A | 8/1987 | Turner |
| 4,739,567 A | 4/1988 | Cardin |
| 4,779,240 A | 10/1988 | Dorr |
| 5,026,152 A | 6/1991 | Sharkey |
| 5,469,258 A | 11/1995 | Grasso |
| 5,515,079 A | 5/1996 | Hauck |
| 5,581,783 A | 12/1996 | Ohashi |
| 5,635,725 A | 6/1997 | Cooper |
| 5,747,690 A | 5/1998 | Park et al. |
| 5,757,490 A | 5/1998 | Martin |
| 5,793,470 A | 8/1998 | Haseltine et al. |
| 5,838,889 A | 11/1998 | Booker |
| 5,902,030 A | 5/1999 | Blanchard |
| 5,914,756 A | 6/1999 | Maeda et al. |

(Continued)

FOREIGN PATENT DOCUMENTS

JP 2005-165129 A 6/2005
WO WO 2006/027855 A1 3/2006

(Continued)

OTHER PUBLICATIONS

Lee et al. "Automatic Projector Calibration with Embedded Light Sensors", UIST '04, Oct. 24-27, 2004, Sante Fe, New Mexico.*

(Continued)

*Primary Examiner* — Thanh Luu

(57) ABSTRACT

The present disclosure relates to motion responsive devices and systems that may be configured for projection.

17 Claims, 20 Drawing Sheets

Related U.S. Application Data continuation-in-part of application No. 12/217,123, filed on Jun. 30, 2008, and a continuation-in-part of application No. 12/217,135, filed on Jun. 30, 2008, and a continuation-in-part of application No. 12/217,117, filed on Jun. 30, 2008.

U.S. PATENT DOCUMENTS

| | | |
|---|---|---|
| 5,951,015 A | 9/1999 | Smith et al. |
| 6,002,505 A | 12/1999 | Kraenert et al. |
| 6,115,022 A | 9/2000 | Mayer, III et al. |
| 6,266,048 B1 | 7/2001 | Carau, Sr. |
| 6,272,231 B1 | 8/2001 | Maurer et al. |
| 6,310,650 B1 | 10/2001 | Johnson et al. |
| 6,310,988 B1 | 10/2001 | Flores et al. |
| 6,334,063 B1 | 12/2001 | Charlier et al. |
| 6,340,976 B1 | 1/2002 | Oguchi et al. |
| 6,362,797 B1 | 3/2002 | Dehmlow |
| 6,414,672 B2 | 7/2002 | Rekimoto et al. |
| 6,424,998 B2 | 7/2002 | Hunter |
| 6,456,339 B1 | 9/2002 | Surati et al. |
| 6,489,934 B1 | 12/2002 | Klausner |
| 6,498,651 B1 | 12/2002 | Loil |
| 6,516,666 B1 | 2/2003 | Li |
| 6,527,395 B1 | 3/2003 | Raskar et al. |
| 6,549,487 B2 | 4/2003 | Gualtieri |
| 6,550,331 B2 | 4/2003 | Fujii et al. |
| 6,551,493 B2 | 4/2003 | Mori et al. |
| 6,554,431 B1 | 4/2003 | Binsted et al. |
| 6,563,504 B1 | 5/2003 | Rose et al. |
| 6,573,887 B1 | 6/2003 | O'Donnell, Jr. |
| 6,577,496 B1 | 6/2003 | Gioscia et al. |
| 6,583,864 B1 | 6/2003 | Stanners |
| 6,595,644 B2 | 7/2003 | Kostrzewski et al. |
| 6,601,037 B1 | 7/2003 | Kolls |
| 6,611,252 B1 | 8/2003 | DuFaux |
| 6,611,253 B1 | 8/2003 | Cohen |
| 6,614,422 B1 | 9/2003 | Rafii et al. |
| 6,626,543 B2 | 9/2003 | Derryberry |
| 6,665,100 B1 | 12/2003 | Klug et al. |
| 6,675,630 B2 | 1/2004 | Challoner et al. |
| 6,695,451 B1 | 2/2004 | Yamasaki et al. |
| 6,708,087 B2 | 3/2004 | Matsumoto |
| 6,710,754 B2 | 3/2004 | Oliver et al. |
| 6,710,770 B2 | 3/2004 | Tomasi et al. |
| 6,727,864 B1 | 4/2004 | Johnson et al. |
| 6,733,138 B2 | 5/2004 | Raskar |
| 6,750,849 B2 | 6/2004 | Potkonen |
| 6,755,537 B1 | 6/2004 | Raskar et al. |
| 6,760,075 B2 | 7/2004 | Mayer, III et al. |
| 6,764,185 B1 | 7/2004 | Beardsley et al. |
| 6,793,350 B1 | 9/2004 | Raskar et al. |
| 6,798,401 B2 | 9/2004 | DuFaux |
| 6,802,614 B2 | 10/2004 | Haldiman |
| 6,811,264 B2 | 11/2004 | Raskar et al. |
| 6,840,627 B2 | 1/2005 | Olbrich |
| 6,844,893 B1 | 1/2005 | Miller et al. |
| 6,857,746 B2 | 2/2005 | Dyner |
| 6,909,670 B1 | 6/2005 | Li |
| 6,919,892 B1 | 7/2005 | Cheiky et al. |
| 6,955,297 B2 | 10/2005 | Grant |
| 6,984,039 B2 | 1/2006 | Agostinelli |
| 6,997,563 B1 | 2/2006 | Wang et al. |
| 7,013,029 B2 | 3/2006 | Keskar et al. |
| 7,016,711 B2 | 3/2006 | Kurakane |
| 7,036,936 B2 | 5/2006 | Hattori et al. |
| 7,043,987 B2 | 5/2006 | Jeong et al. |
| 7,071,924 B2 | 7/2006 | Wilbrink et al. |
| 7,088,352 B2 | 8/2006 | Wampler |
| 7,088,440 B2 | 8/2006 | Buermann et al. |
| 7,103,313 B2 | 9/2006 | Heinonen et al. |
| 7,134,078 B2 | 11/2006 | Vaarala |
| 7,151,530 B2 | 12/2006 | Roeber et al. |
| 7,151,764 B1 | 12/2006 | Heinonen et al. |
| 7,155,978 B2 | 1/2007 | Lo et al. |
| 7,159,441 B2 | 1/2007 | Challoner et al. |
| 7,173,605 B2 | 2/2007 | Fong et al. |
| 7,191,653 B2 | 3/2007 | Park et al. |
| 7,193,241 B2 | 3/2007 | Hayashi et al. |
| 7,195,170 B2 | 3/2007 | Matsumoto et al. |
| 7,209,569 B2 | 4/2007 | Boesen |
| 7,216,799 B2 | 5/2007 | Amemiya |
| 7,231,063 B2 | 6/2007 | Naimark et al. |
| 7,232,700 B1 | 6/2007 | Kubena |
| 7,239,445 B2 | 7/2007 | Pouslen |
| 7,242,388 B2 | 7/2007 | Lieberman et al. |
| 7,245,381 B2 | 7/2007 | Marino et al. |
| 7,248,151 B2 | 7/2007 | Mc Call |
| 7,252,002 B2 | 8/2007 | Zerbini et al. |
| 7,256,923 B2 | 8/2007 | Liu et al. |
| 7,257,255 B2 | 8/2007 | Pittel |
| 7,259,658 B2 | 8/2007 | Noguchi et al. |
| 7,266,391 B2 | 9/2007 | Warren |
| 7,270,003 B2 | 9/2007 | Sassolini et al. |
| 7,282,712 B2 | 10/2007 | Shibayama |
| 7,284,866 B2 | 10/2007 | Buchmann |
| 7,287,428 B2 | 10/2007 | Green |
| 7,290,885 B2 | 11/2007 | Salvatori et al. |
| 7,301,648 B2 | 11/2007 | Foxlin |
| 7,305,368 B2 | 12/2007 | Lieberman et al. |
| 7,328,616 B2 | 2/2008 | Won et al. |
| 7,330,269 B2 | 2/2008 | Zurn et al. |
| 7,332,717 B2 | 2/2008 | Murata et al. |
| 7,336,271 B2 | 2/2008 | Ozeki et al. |
| 7,337,669 B2 | 3/2008 | Nozoe |
| 7,350,923 B2 | 4/2008 | Olson et al. |
| 7,355,583 B2 | 4/2008 | Beardsley et al. |
| 7,355,584 B2 | 4/2008 | Hendriks et al. |
| 7,355,796 B2 | 4/2008 | Robinson |
| 7,358,986 B1 | 4/2008 | Knighton et al. |
| 7,361,899 B2 | 4/2008 | Iida |
| 7,363,816 B2 | 4/2008 | Judy et al. |
| 7,373,833 B2 | 5/2008 | Hopper et al. |
| 7,379,630 B2 | 5/2008 | Lagakos et al. |
| 7,382,599 B2 | 6/2008 | Kikuiri et al. |
| 7,460,185 B2 | 12/2008 | Saletta |
| 7,484,855 B2 | 2/2009 | Kobayashi et al. |
| 7,549,754 B2 | 6/2009 | Furui |
| 7,595,809 B2 | 9/2009 | Widdowson |
| 7,630,522 B2 | 12/2009 | Popp et al. |
| 7,742,949 B2 | 6/2010 | Evangelist et al. |
| 7,783,892 B2 | 8/2010 | Russell et al. |
| 7,810,114 B2 | 10/2010 | Flickinger et al. |
| 7,870,592 B2 | 1/2011 | Hudson et al. |
| 7,874,679 B2 | 1/2011 | Stonier |
| 7,891,826 B2 | 2/2011 | Fujinawa et al. |
| 7,936,943 B2 | 5/2011 | Way et al. |
| 7,967,445 B2 | 6/2011 | Hamano et al. |
| 7,980,707 B2 | 7/2011 | Murphy |
| 8,024,762 B2 | 9/2011 | Britt |
| 8,049,721 B2 | 11/2011 | Tagawa |
| 8,055,907 B2 | 11/2011 | Deem et al. |
| 2001/0000300 A1 | 4/2001 | Haile-mariam |
| 2001/0012001 A1 | 8/2001 | Rekimoto et al. |
| 2001/0024231 A1 | 9/2001 | Nakamura et al. |
| 2002/0105624 A1 | 8/2002 | Quori |
| 2002/0154091 A1 | 10/2002 | Uchida et al. |
| 2002/0184098 A1 | 12/2002 | Giraud et al. |
| 2003/0017846 A1 | 1/2003 | Estevez et al. |
| 2003/0038925 A1 | 2/2003 | Choi |
| 2003/0038927 A1 | 2/2003 | Alden |
| 2003/0038928 A1 | 2/2003 | Alden |
| 2003/0051256 A1 | 3/2003 | Uesaki et al. |
| 2003/0061607 A1 | 3/2003 | Hunter et al. |
| 2004/0003398 A1 | 1/2004 | Donian et al. |
| 2004/0012849 A1 | 1/2004 | Cruz-Uribe et al. |
| 2004/0027539 A1 | 2/2004 | Plunkett |
| 2004/0075820 A1 | 4/2004 | Chu et al. |
| 2004/0158865 A1 | 8/2004 | Kubler et al. |
| 2004/0184010 A1 | 9/2004 | Raskar et al. |
| 2004/0184013 A1 | 9/2004 | Raskar et al. |
| 2004/0222983 A1 | 11/2004 | Kakemura |
| 2004/0239884 A1 | 12/2004 | Nagashima et al. |
| 2005/0030486 A1 | 2/2005 | Lee et al. |
| 2005/0036117 A1 | 2/2005 | Kobayashi |
| 2005/0046803 A1 | 3/2005 | Akutsu |

| | | |
|---|---|---|
| 2005/0060210 A1 | 3/2005 | Levi et al. |
| 2005/0068501 A1 | 3/2005 | Nonaka et al. |
| 2005/0076372 A1 | 4/2005 | Moore et al. |
| 2005/0091671 A1 | 4/2005 | Deem et al. |
| 2005/0099432 A1 | 5/2005 | Chavis et al. |
| 2005/0117130 A1 | 6/2005 | Bohn et al. |
| 2005/0153759 A1 | 7/2005 | Varley |
| 2005/0153760 A1 | 7/2005 | Varley |
| 2005/0179875 A1 | 8/2005 | Aoyanagi |
| 2005/0184958 A1 | 8/2005 | Gnanamgari et al. |
| 2005/0219467 A1 | 10/2005 | Nomizo et al. |
| 2005/0237492 A1* | 10/2005 | Shinozaki ................ 353/69 |
| 2005/0240417 A1 | 10/2005 | Savage |
| 2005/0253776 A1 | 11/2005 | Lee et al. |
| 2005/0259084 A1 | 11/2005 | Popovich et al. |
| 2005/0259231 A1 | 11/2005 | Salvatori et al. |
| 2005/0280628 A1 | 12/2005 | Adams et al. |
| 2006/0001543 A1 | 1/2006 | Raskar et al. |
| 2006/0015375 A1 | 1/2006 | Lee et al. |
| 2006/0017890 A1 | 1/2006 | Inazumi |
| 2006/0020481 A1 | 1/2006 | Lee et al. |
| 2006/0020515 A1 | 1/2006 | Lee et al. |
| 2006/0028624 A1 | 2/2006 | Kaise et al. |
| 2006/0038814 A1 | 2/2006 | Rivera |
| 2006/0038965 A1 | 2/2006 | Hennes |
| 2006/0044513 A1 | 3/2006 | Sakurai |
| 2006/0059002 A1 | 3/2006 | Shibata et al. |
| 2006/0066564 A1 | 3/2006 | Yee et al. |
| 2006/0075019 A1 | 4/2006 | Donovan et al. |
| 2006/0095515 A1 | 5/2006 | Forstadius |
| 2006/0103811 A1 | 5/2006 | May et al. |
| 2006/0109237 A1 | 5/2006 | Morita et al. |
| 2006/0129551 A1 | 6/2006 | Teicher |
| 2006/0158425 A1 | 7/2006 | Andrews et al. |
| 2006/0158623 A1 | 7/2006 | Kobayashi et al. |
| 2006/0164526 A1 | 7/2006 | Suzuki et al. |
| 2006/0170875 A1 | 8/2006 | Falck et al. |
| 2006/0170885 A1 | 8/2006 | Kitahara |
| 2006/0171008 A1 | 8/2006 | Mintz et al. |
| 2006/0184977 A1 | 8/2006 | Mueller et al. |
| 2006/0187421 A1 | 8/2006 | Hattori et al. |
| 2006/0198550 A1 | 9/2006 | Jung et al. |
| 2006/0234784 A1 | 10/2006 | Reinhorn |
| 2006/0256076 A1 | 11/2006 | Liou et al. |
| 2006/0266135 A1 | 11/2006 | Nishikawa et al. |
| 2006/0271486 A1 | 11/2006 | Cross et al. |
| 2007/0005450 A1 | 1/2007 | Krishnamoorthy et al. |
| 2007/0005809 A1 | 1/2007 | Kobayashi et al. |
| 2007/0024580 A1 | 2/2007 | Sands et al. |
| 2007/0024763 A1 | 2/2007 | Chung |
| 2007/0064208 A1 | 3/2007 | Giegerich et al. |
| 2007/0075982 A1 | 4/2007 | Morrison et al. |
| 2007/0085977 A1 | 4/2007 | Fricke et al. |
| 2007/0091278 A1 | 4/2007 | Zakoji et al. |
| 2007/0103652 A1 | 5/2007 | Nijim et al. |
| 2007/0106950 A1 | 5/2007 | Hutchinson et al. |
| 2007/0109500 A1 | 5/2007 | Kobori et al. |
| 2007/0109505 A1* | 5/2007 | Kubara et al. ................ 353/69 |
| 2007/0109509 A1 | 5/2007 | Lee |
| 2007/0115440 A1 | 5/2007 | Wiklof |
| 2007/0178973 A1 | 8/2007 | Camhi |
| 2007/0180409 A1 | 8/2007 | Sohn et al. |
| 2007/0188450 A1 | 8/2007 | Hernandez et al. |
| 2007/0199108 A1 | 8/2007 | Angle et al. |
| 2007/0218432 A1 | 9/2007 | Glass et al. |
| 2007/0220575 A1 | 9/2007 | Cooper et al. |
| 2007/0242033 A1 | 10/2007 | Cradick et al. |
| 2007/0242233 A1 | 10/2007 | Sokeila et al. |
| 2007/0247422 A1 | 10/2007 | Vertegaal et al. |
| 2007/0266412 A1 | 11/2007 | Trowbridge et al. |
| 2007/0273842 A1 | 11/2007 | Morrison et al. |
| 2007/0273848 A1 | 11/2007 | Fan et al. |
| 2007/0282564 A1 | 12/2007 | Sprague et al. |
| 2008/0036969 A1 | 2/2008 | Otsuka et al. |
| 2008/0056544 A1 | 3/2008 | Aikawa et al. |
| 2008/0060014 A1 | 3/2008 | Bentley et al. |
| 2008/0066111 A1 | 3/2008 | Ellis et al. |
| 2008/0079752 A1 | 4/2008 | Gates et al. |
| 2008/0121701 A1 | 5/2008 | Gabriel |
| 2008/0129647 A1 | 6/2008 | Canova |
| 2008/0168523 A1 | 7/2008 | Ansari et al. |
| 2008/0183820 A1 | 7/2008 | Golovchinsky et al. |
| 2008/0192017 A1 | 8/2008 | Hildebrandt et al. |
| 2008/0212039 A1 | 9/2008 | Taylor |
| 2008/0224251 A1 | 9/2008 | Troost et al. |
| 2008/0256453 A1 | 10/2008 | Fein et al. |
| 2008/0291213 A1 | 11/2008 | Bhogal et al. |
| 2008/0319857 A1 | 12/2008 | Dobbins et al. |
| 2009/0019078 A1 | 1/2009 | Chisholm et al. |
| 2009/0037382 A1 | 2/2009 | Ansari et al. |
| 2009/0051961 A1 | 2/2009 | Ohsawa |
| 2009/0070276 A1 | 3/2009 | Kodimer et al. |
| 2009/0070881 A1 | 3/2009 | Yellepeddy et al. |
| 2009/0079945 A1* | 3/2009 | Klosowiak et al. ............. 353/69 |
| 2009/0088204 A1 | 4/2009 | Culbert et al. |
| 2009/0091714 A1 | 4/2009 | Aufranc et al. |
| 2009/0096994 A1 | 4/2009 | Smits |
| 2009/0117846 A1 | 5/2009 | Mavrakakis |
| 2009/0136212 A1 | 5/2009 | Klein |
| 2009/0149246 A1 | 6/2009 | Opaluch |
| 2009/0150947 A1 | 6/2009 | Soderstrom |
| 2009/0181645 A1 | 7/2009 | Chan et al. |
| 2009/0186700 A1 | 7/2009 | Konkle |
| 2009/0217320 A1 | 8/2009 | Aldrey |
| 2009/0295712 A1* | 12/2009 | Ritzau ................ 345/156 |
| 2009/0310099 A1 | 12/2009 | Jung et al. |
| 2009/0310101 A1 | 12/2009 | Jung et al. |
| 2009/0310102 A1 | 12/2009 | Jung et al. |
| 2009/0311965 A1 | 12/2009 | Jung et al. |
| 2009/0316671 A1 | 12/2009 | Rolf et al. |
| 2010/0082743 A1 | 4/2010 | Zeng et al. |
| 2011/0255059 A1 | 10/2011 | Furui |

FOREIGN PATENT DOCUMENTS

| | | | |
|---|---|---|---|
| WO | WO 2006/040725 A1 | 4/2006 | |
| WO | WO 2007/111382 A1 | 10/2007 | |

OTHER PUBLICATIONS

Allen, Danny; "Before Nikon's S1000pj: The Cine-Twin Was the First Camera/Projector Hybrid"; printed on Nov. 25, 2009; pp. 1-2; gizmodo.com; located at http://gizmodo.com/5347564/before-nikon-s-s1000pj-the-cine+twin-was-the-first-cameraprojector-hybrid.

Allen, Danny; "Ericsson's Spider PC Concept Projects the Keyboard and Screen"; printed on Nov. 25, 2009; pp. 1-3;gizmodo.com; located at http://gizmodo.com/5392667/ericssons-spider-pc-concept-projects-the-keyboard-and-screen.

Herrman, John; "Nikon 51000pj Projector Camera Review: Screw You All, I Love This Thing"; printed on Nov. 25, 2009; pp. 1-5; gizmodo.com; located at http://gizmodo.com/5402528/nikon-s1000pj-projector-camera-review-screw-you-all-i-love-this-thing.

Miller, Paul; "Optoma's screen-in-a-bag actually makes a lot of sense"; bearing a date of Nov. 12, 2009; printed on Nov. 25, 2009; pp. 1-5; engadget.com; located at http://www.engadget.com/2009/11/12/optomas-screen-in-a-bag-actually-makes-a-lot-of-sense.

Blass, Evan; "Hands-On With Texas Instruments' Cellphone Projector"; Engadget; Bearing a date of Sep. 20, 2007; pp. 1-7; Weblogs, Inc.; located at: http://www.engadget.com/2007/09/20/hands-on-with-texas-instruments-cellphone-projector/; printed on Apr. 10, 2008.

Browne et al.; "Using Motion Control to Guide Augmented Reality Manufacturing Systems"; Motion Control Technology; Bearing a date of 2006; International, Inc.; located at: http://www.nasatech.com/motion/features/feat_1007.html; printed on May 8, 2008.

"Cell Phone With Built-in Projector"; Physorg; Bearing a date of Mar. 24, 2005; p. 1; located at: http://www.physorg.com/news3505.html; printed on Apr. 10, 2008.

"Concepts: Cellphone Projector Concept Allows Impromptu Sales Meetings"; Gizmodo; pp. 1-3; located at: http://gizmodo.com/gadgets/concepts/cellphone-projector-concept-allows-impromptu-sales-meetings-311590.php; printed on Apr. 10, 2008.

"Hybrid Technology"; InterSense; p. 1; InterSense, Inc.; located at: http://www.isense.com/products.aspx?id=43; printed on May 8, 2008.

"6-DOF Tracking (IS-900, IS-1200 Product Families)"; InterSense; p. 1; InterSense, Inc.; located at: http://www.isense.com/products.aspx?id=45&; printed on May 8, 2008.

"Precision Motion Tracking Solutions"; InterSense; p. 1; InterSense, Inc.; located at: http://www.isense.com/; printed on May 8, 2008.

"Is That a Projector in Your Pocket or a . . . Cell Phone?"; Gadget Review; Bearing a date of Mar. 27, 2007; pp. 1-6; located at: http://www.gadgetreview.com/2007/03/is-that-a-projector-in-your-pocket-or-acell-phone.html; printed on Apr. 10, 2008.

Kanellos, Michael; "TI Demos Its Movie Projector in a Phone"; CNET News; Bearing a date of Mar. 26, 2007; pp. 1-2; CNET Networks, Inc.; located at: http://earthlink.com.com/TI+demos+its+movie+projector+in+a+phone/2100-1041_3-6170619.html; printed on Apr. 10, 2008.

Lagorio, Christine; "Weird Science! NYU Student Invents Virtual Girlfriend"; New York Magazine; Bearing a date of May 14, 2008; pp. 1-2; New York Media LLC; located at: http://nymag.com/daily/intel/2008/05/weird_science_nyu_student_inve.html; printed on May 15, 2008.

"LCD Projector Cell Phone Next April"; Gadget Review; Bearing a date of Apr. 13, 2006; pp. 1-6; located at: http://www.gadgetreview.com/2006/04/lcd-project-cell-phone-next-april.html; printed on Apr. 10, 2008.

"Micro Piezo Gyro"; Heli-Max Performance Parts; Bearing a date of 1998; pp. 1-2; located at: http://manuals.hobbico.com/hmx/hmxm1010-manual.pdf.

Mooney, Allison; "Mobile Phone Projectors"; PSFK; Bearing a date of Oct. 22, 2007; pp. 1-6; located at: http://www.psfk.com/2007/10/mobile-phone-projectors.html; printed on Apr. 10, 2008.

"Nano Projector Now in Cellphones"; Ubergizmo; Bearing a date of Jul. 2, 2007; pp. 1-4; located at: http://www.ubergizmo.com/15/archives/2007/07/nano_projector_now_in_cellphones.html; printed on Apr. 10, 2008.

"PicoP: Mobile Phone Projector From Microvision"; Planet Cell Phone Blog; Bearing a date of Sep. 23, 2006; pp. 1-9; located at: http://blog.planet-cell-phone.com/2006/09/23/picop-mobile-phone-projector-from-microvision/; printed on Apr. 10, 2008.

"Pico: Optoma to Launch 'World's First' Pico Projector in 2008"; Gizmodo; Bearing a date of Jun. 18, 2008; pp. 1-3; located at: http://gizmodo.com/5017516/optoma-to-launch-worlds-first-pico-projector-in-2008; printed on Jun. 23, 2008.

Sakata et al.; "Digital Annotation System for Printed Paper Documents Using Camera-Projector Systems"; ACTA Press; Bearing a date of 2007; p. 1; located at: http://www.actapress.com/Abstract.aspx?paperId=27986; printed on May 2, 2008 (Abstract Only).

"Silicon Gyroscopes"; pp. 1-3; located at: http://www.boeing.com/defense-space/space/bss/factsheets/gyro/gyro.html; printed on Apr. 25, 2008.

Svensson, Peter; "Projectors to Magnify Cell-Phone Cinema"; Physorg; Bearing a date of Apr. 3, 2008; pp. 1-2; The Associated Press; located at: http://www.physorg.com/news126457642.html; printed on Apr. 10, 2008.

"Technology: Micro Projectors:: Nice and Steady: Vibration-Compensated Mini Projectors"; Symbian-freak; Bearing a date of Jun. 14, 2007; pp. 1-3; Symbian Freak; located at: http://www.symbian-freak.com/news/007/06/tiny_projector_nice_and_steady.htm; printed on Apr. 28, 2008.

Diaz, Jesus; "Rear-Projection Urinal Lets You Pee Over Football Games or Bill O'Reilly"; Gizmodo; bearing a date of Aug. 10, 2009; pp. 1; located at http://gizmodo.com/5333854/; printed on Aug. 10, 2009.

U.S. Appl. No. 12/459,581, Jung et al.
U.S. Appl. No. 12/459,580, Jung et al.
U.S. Appl. No. 12/454,184, Jung et al.
U.S. Appl. No. 12/380,595, Jung et al.
U.S. Appl. No. 12/380,582, Jung et al.
U.S. Appl. No. 12/380,571, Jung et al.
U.S. Appl. No. 12/322,876, Jung et al.
U.S. Appl. No. 12/322,875, Jung et al.
U.S. Appl. No. 12/322,063, Jung et al.
U.S. Appl. No. 12/291,025, Jung et al.
U.S. Appl. No. 12/291,024, Jung et al.
U.S. Appl. No. 12/291,023, Jung et al.
U.S. Appl. No. 12/291,019, Jung et al.
U.S. Appl. No. 12/290,241, Jung et al.
U.S. Appl. No. 12/290,240, Jung et al.
U.S. Appl. No. 12/286,750, Jung et al.
U.S. Appl. No. 12/286,731, Jung et al.
U.S. Appl. No. 12/229,536, Jung et al.
U.S. Appl. No. 12/229,534, Jung et al.
U.S. Appl. No. 12/229,519, Jung et al.
U.S. Appl. No. 12/229,518, Jung et al.
U.S. Appl. No. 12/229,508, Jung et al.
U.S. Appl. No. 12/229,505, Jung et al.
U.S. Appl. No. 12/220,906, Jung et al.
U.S. Appl. No. 12/218,269, Jung et al.
U.S. Appl. No. 12/218,268, Jung et al.
U.S. Appl. No. 12/218,267, Jung et al.
U.S. Appl. No. 12/218,266, Jung et al.
U.S. Appl. No. 12/217,135, Jung et al.
U.S. Appl. No. 12/217,123, Jung et al.
U.S. Appl. No. 12/217,117, Jung et al.
U.S. Appl. No. 12/217,116, Jung et al.
U.S. Appl. No. 12/217,115, Jung et al.
U.S. Appl. No. 12/214,422, Jung et al.

"2010 Toyota Prius Touch Tracer Display"; KickingTires; printed on Mar. 4, 2009; pp. 1-5; located at http://blogs.cars.com/kickingtires/2009/03/2010-toyota-prius-touch-tracer-display.html.

Foo, Juniper; "MIT's 6$^{th}$ Sense device could trump Apple's multitouch"; Crave; bearing a date of Feb. 9, 2009; printed on Feb. 19, 2009; pp. 1-4; located at http://news.cnet.com/8301-17938_105-10159601-1.html.

Frucci, Adam; "MiLi Pro Turns Your iPhone Into a Projector"; GIZMODO; bearing a date of Jun. 26, 2009; printed on Jul. 8, 2009; pp. 1-3; located at http://gizmodo.com/5302942/mili-pro-turns-your-iphone-into-a-projector/gallery/.

Hereld, Mark et al.; "Introduction to Building Projection-based Tiled Display Systems"; pp. 1-9; Computer Science Department, University of Chicago.

June, Laura; "Toshiba announces TDP-F10U pico projector"; Engadget; bearing a date of Jan. 7, 2009; printed on Jan. 15, 2009; pp. 1-2; Weblogs, Inc.; located at: http://www.engadget.com/2009/01/07/toshiba-announces-tdp-f10u-pico-projector/.

Lam, Brian; "Bug Labs Open Source Gadgets Getting Pico Projector, 3G modules and More"; Gizmodo; bearing a date of Jan. 7, 2009; printed on Jan. 15, 2009; pp. 1-2; located at: http://i.gizmodo.com/5125563/bug-labs-open-source-gadgets-getting-pico-projector-3g-modules-and-more.

Melanson, Donald; "Apple patent filing suggests a safer in-car touchscreen"; Engadget; bearing a date of Mar. 30, 2009; printed on Apr. 10, 2009; pp. 1-8; located at: http://www.engadget.com/2009/03/30/apple-patent-filing-suggests-a-safer-in-car-touchscreen/.

Melanson, Donald; "Light Blue Optics promises tough-interface pico projectors"; Engadget; bearing a date of Jun. 3, 2009; printed on Jun. 8, 2009; pp. 1-4; located at http://www.engadget.com/2009/06/03/light-blue-optics-promises-touch-interface-pico-projectors/.

Miller, Ross; "WowWee Cinemin Swivel, Stick, and Station pico PJs hands-on"; Engadget; bearing a date of Jan. 7, 2009; printed on Jan. 15, 2009; pp. 1-3; Weblogs, Inc.; located at: http://www.engadget.com/2009/01/07/wowwee-cinemin-swivel-stick-and-station-pico-pjs-hands-on/.

Murph, Darren; "TI's DLP Pico technology unveiled in new round of pico projectors"; Engadget; bearing a date of Jan. 7, 2009; printed on Jan. 15, 2009; pp. 1-2; Weblogs, Inc.; located at: http://www.engadget.com/2009/01/07/tis-dlp-pico-technology-unveiled-in-new-round-of-pico-projector/.

Nosowitz, Dan; "Official Specs and Prices for New Nikon Coolpix Line, Including Mutant Projector-Camera"; Gizmodo; bearing a date of Aug. 4, 2009; printed on Aug. 4, 2009; pp. 1-4; located at http://gizmodo.com/5329376/official-specs-and-prices-for-new-nikon-coolpix-line-including-mutant-projector+camera.

Oliver, Sam; "Apple may add micro projectors to iPhones, iPod touches"; AppleInsider; bearing a date of Jul. 6, 2009; printed on Jul. 8, 2009; pp. 1-8; located at http://www.appleinsider.com/articles/09/07/06/apple_may_add_micro_projectors_to_iphones_ipod_touches.html/.

"Rear Projection Products and Technology"; Christie Digital; printed on Feb. 13, 2009; pp. 1-2; located at http://controlrooms.christiedigital.com/Products/RearScreenTilingProjectors/.

"What is Science on a Sphere® (SOS)?"; Science on a Sphere®; printed on Mar. 4, 2009; pp. 1-2; NOAA; located at http://sos.noaa.gov/about/.

Wilson, Mark; "Logic Bolt: The US's First Projecting Cellphone"; Gizmodo; bearing a date of Jan. 8, 2009; printed on Jan. 15, 2009; pp. 1-3; located at: http://i.gizmodo.com/5126754/logic-bolt-the-uss-first-projecting-cellphone.

Wilson, Mark; "New Pico Projectors Offer DVD-Quality Resolution"; Gizmodo; bearing a date of Feb. 17, 2009; printed on Feb. 19, 2009; pp. 1; located at http://i.gizmodo.com/5155132/new-pico-projectors-offer-dvd+quality-resolution.

Diaz, Jesus; "Is There an iPad Cinema in Your Future?"; Bearing a date of Mar. 16, 2010, printed on Mar. 19, 2010; pp. 1-2; Gizmodo.com; located at http://gizmodo.com/5494787/is-there-an-ipad-cinema-in-your-future.

Hannaford, Kat; "Pico Projector From Light Blue Optics Throws Up a 10-inch Touchscreen Laser Projection"; Bearing a date of Jan. 5, 2010, printed on Jan. 19, 2010; pp. 1-2; Gizmodo.com; located at http://gizmodo.com/5440651/pico-projector-from-light-blue-optics-throws-up-a-10+inch-touchscreen-laser-projection.

Loftus, Jack; "Dell Froot Concept Design Does Away with Keyboard, Monitor"; Bearing a date of Jan. 17, 2010, printed on Jan. 19, 2010; pp. 1-2; Gizmodo.com; located at http://gizmodo.com/5450176/dell-froot-concept-design-does-away-with-keyboard-monitor.

Harding, Margaret; "Futuristic Windshield Helps Drivers See the Road"; Siliconvalley.com; Bearing a date of Jul. 18, 2008; pp. 1-2; located at: http://www.silicon valley.com/ci_9919977?IADID=Search-www.siliconvalley.com-www.siliconvalley.com; printed on Aug. 18, 2008.

Menon, Anuradha; "Flexible Computers Conform to Any Shape"; The Future of Things; Bearing a date of Jul. 3, 2008; pp. 1-3; located at: http://thefutureofthings.com/news/1222/flexible-computers-able-to-conform-any-shape.html; printed on Jul. 9, 2008.

"Mint V 10: World's Smallest Pocket Projector"; Gizmodo; Bearing a date of Aug. 18, 2008; pp. 1-3; located at: http://gizmodo.com/5031873/mint-v10-worlds-smallest-pocket-projector; printed on Aug. 18, 2008.

Murph, Darren; "3M Reveals MPro110 Pocket Projector: Ships This Month"; Engadget; Bearing a date of Sep. 13, 2008; pp. 1-5; Weblogs, Inc.; located at: http://www.engadget.com/2008/09/13/3m-reveals-mpro110-pocket-projector-ships-this-month/; printed on Sep. 22, 2008.

"Projectors: LG Projector Phone Is Like a Media-Throwing Web Shooter"; Gizmodo; Bearing a date of Jul. 9, 2008; pp. 1-3; located at: http://gizmodo.com/5022626/lg-projector-phone-is-like-a-media+throwing-web-shooter; printed on Jul. 9, 2008.

"Projectors: 18 Super Small Projectors"; Gizmodo; Bearing a date of Aug. 18, 2008; pp. 1-3; located at: http://gizmodo.com/5031238/18-super-small-projectors; printed on Aug. 18, 2008.

Ricker, Thomas; "Video: Camera-Based Concept Turns Any Surface into a DJ Deck"; Engadget; Bearing a date of Jul. 31, 2008; pp. 1-5; Weblogs, Inc.; located at: http://www.engadget.com/2008/07/31/video-camera-based-concept-turns-any-surface-into-a-dj-deck/; printed on Aug. 18, 2008.

Topolsky, Joshua; "SenseSurface Sticks Knobs Onto Screens, Turns Virtual Controls Physical"; Engadget; Bearing a date of Jul. 16, 2008; pp. 1-7; Weblogs, Inc.; located at: http://www.engadget.com/2008/07/16/sensesurface-sticks-knobs-onto-screens-turns-virtual-controls-p/; printed on Aug. 18, 2008.

Wilson, Andrew D.; Benko, Hrvoje; "Combining Multiple Depth Cameras and Projectors for Interactions on, Above, and Between Surfaces"; UIST'10; 10 total pages; bearing a date of Oct. 3-6, 2010; ACM.

U.S. Appl. No. 60/990,851, Klein, Scott V.

"Panasonic—Electronic Print Board (Interactive Panaboard) Operating Instructions with Installation Manual (for qualified service personnel), Model No. KX-BP800"; Panasonic; Bearing a date of 2001; pp. 1-86; Kyushu Matsushita Electric Co., Ltd.

* cited by examiner

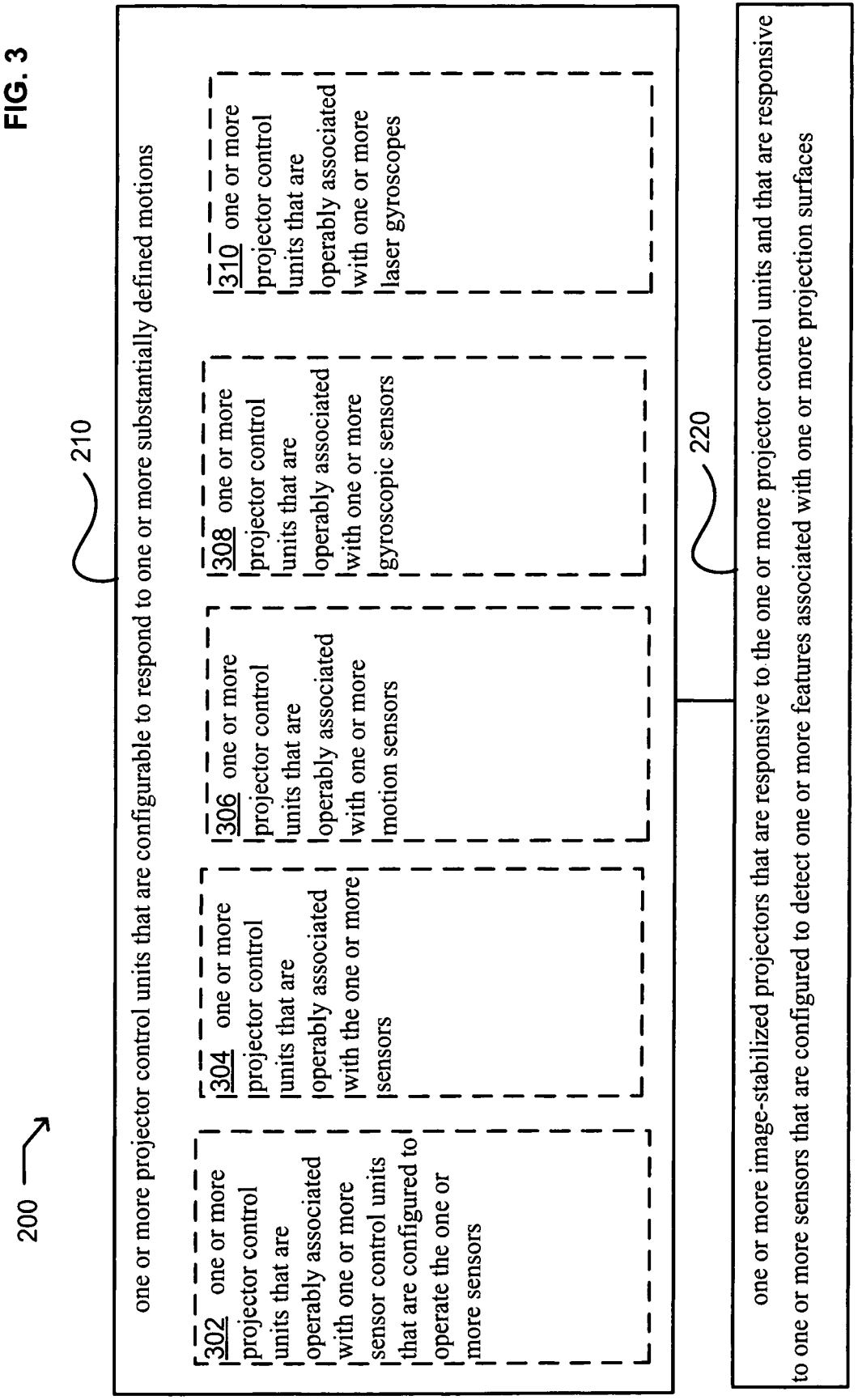

FIG. 4

200 → one or more projector control units that are configurable to respond to one or more substantially defined motions ~ 210

| 402 one or more projector control units that are operably associated with one or more silicon gyroscopes | 404 one or more projector control units that are operably associated with one or more inertial sensors | 406 one or more projector control units that are operably associated with one or more yaw rate sensors | 408 one or more projector control units that are operably associated with one or more pressure sensors | 410 one or more projector control units that are operably associated with the one or more sensors that are configured to detect one or more persons | 412 one or more projector control units that are operably associated with the one or more sensors that are configured to detect one or more specific persons |

~ 220 one or more image-stabilized projectors that are responsive to the one or more projector control units and that are responsive to one or more sensors that are configured to detect one or more features associated with one or more projection surfaces

210 — one or more projector control units that are configurable to respond to one or more substantially defined motions

| 502 one or more projector control units that are operably associated with one or more cameras | 504 one or more projector control units that are operably associated with one or more cameras that are configured to detect one or more calibration images | 506 one or more projector control units that are operably associated with one or more cameras that are configured to detect content | 508 one or more projector control units that are operably associated with one or more cameras that are configured to detect one or more projected calibration images | 510 one or more projector control units that are operably associated with one or more cameras that are configured to detect projected content | 512 one or more projector control units that are operably associated with one or more user interfaces |

220 — one or more image-stabilized projectors that are responsive to the one or more projector control units and that are responsive to one or more sensors that are configured to detect one or more features associated with one or more projection surfaces

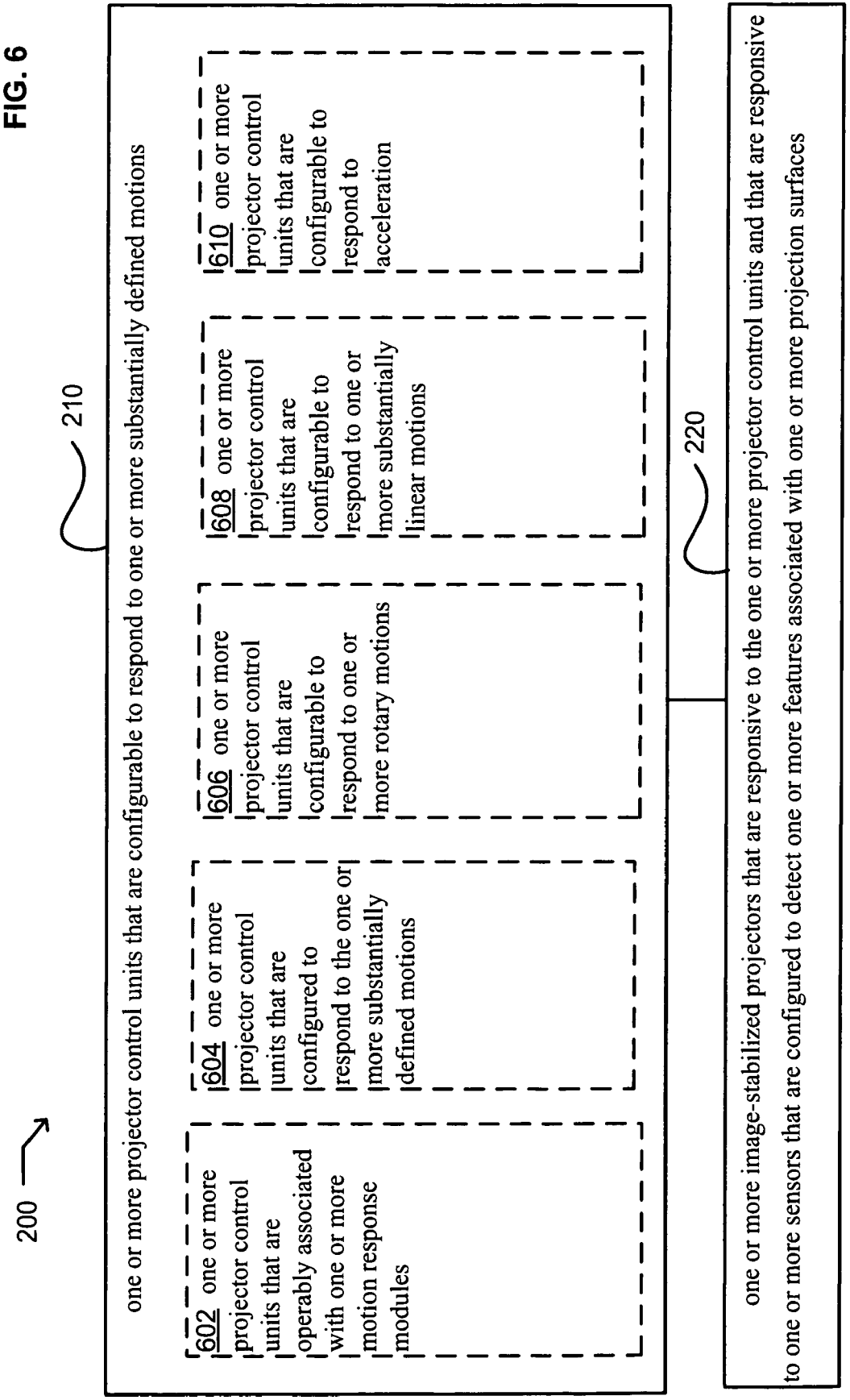

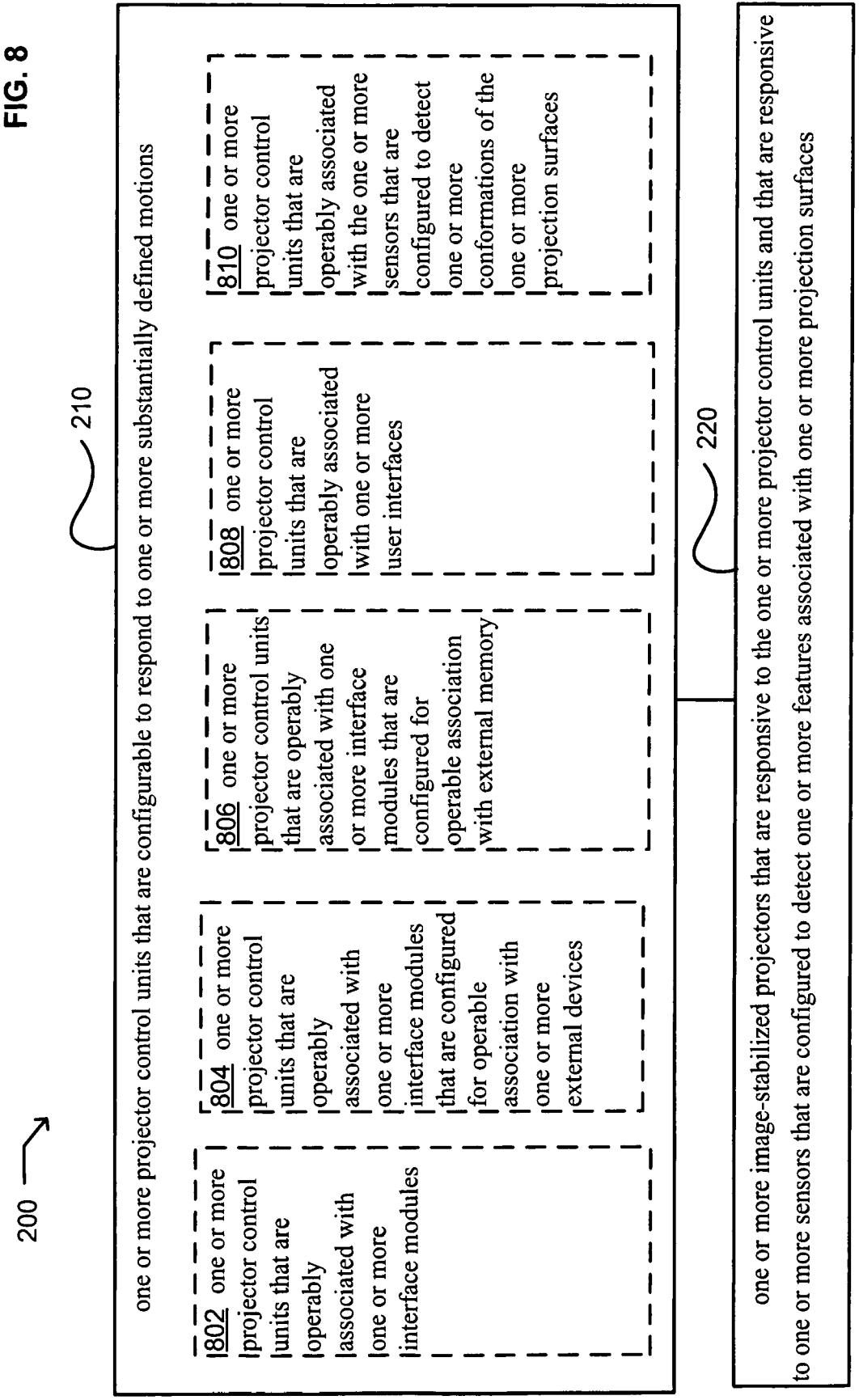

210 — one or more projector control units that are configurable to respond to one or more substantially defined motions 902 one or more projector control units that are operably associated with the one or more sensors that are configured to detect one or more changes in one or more conformations of the one or more projection surfaces 904 one or more projector control units that are operably associated with one or more control unit receivers 906 one or more projector control units that are operably associated with one or more control unit transmitters 220 — one or more image-stabilized projectors that are responsive to the one or more projector control units and that are responsive to one or more sensors that are configured to detect one or more features associated with one or more projection surfaces

MOTION RESPONSIVE DEVICES AND SYSTEMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/214,422, entitled SYSTEMS AND DEVICES, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 17 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,116, entitled SYSTEMS AND METHODS FOR PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,115, entitled SYSTEMS AND METHODS FOR TRANSMITTING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,123, entitled SYSTEMS AND METHODS FOR RECEIVING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,135, entitled SYSTEMS AND METHODS FOR PROJECTING IN RESPONSE TO POSITION, naming Edward K.Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,117, entitled SYSTEMS AND METHODS FOR PROJECTING IN RESPONSE TO CONFORMATION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates to motion responsive devices and systems that may be configured for projection.

SUMMARY

In one aspect, a device includes but is not limited to one or more projector control units that are configurable to respond to one or more substantially defined motions and one or more image-stabilized projectors that are responsive to the one or more projector control units and that are responsive to one or more sensors that are configured to detect one or more features associated with one or more projection surfaces. The device may optionally include one or more housings. In addition to the foregoing, other aspects are described in the claims, drawings, and text forming a part of the present disclosure.

In one aspect, a system includes but is not limited to circuitry for operating one or more projector control units that are configurable to respond to one or more substantially defined motions and circuitry for operating one or more image-stabilized projectors that are responsive to the one or more projector control units and that are responsive to one or more sensors that are configured to detect one or more features associated with one or more projection surfaces. In addition to the foregoing, other system aspects are described in the claims, drawings, and text forming a part of the present disclosure.

In one aspect, a system includes but is not limited to means for operating one or more projector control units that are configurable to respond to one or more substantially defined motions and means for operating one or more image-stabilized projectors that are responsive to the one or more projector control units and that are responsive to one or more sensors that are configured to detect one or more features associated with one or more projection surfaces. In addition to the foregoing, other system aspects are described in the claims, drawings, and text forming a part of the present disclosure.

In one aspect, a system includes but is not limited to a signal-bearing medium bearing one or more instructions for operating one or more projector control units that are configurable to respond to one or more substantially defined motions and one or more instructions for operating one or more image-stabilized projectors that are responsive to the one or more projector control units and that are responsive to one or more sensors that are configured to detect one or more features associated with one or more projection surfaces. In addition to the foregoing, other system aspects are described in the claims, drawings, and text forming a part of the present disclosure.

In one or more various aspects, means include but are not limited to circuitry and/or programming for effecting the herein referenced functional aspects; the circuitry and/or programming can be virtually any combination of hardware, software, and/or firmware configured to effect the herein referenced functional aspects depending upon the design choices of the system designer. In addition to the foregoing, other system aspects means are described in the claims, drawings, and/or text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein referenced method aspects depending upon the design choices of the system designer. In addition to the foregoing, other system aspects are described in the claims, drawings, and/or text forming a part of the present application.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 3 illustrates alternate embodiments of the device of FIG. 2.

FIG. 4 illustrates alternate embodiments of the device of FIG. 2.

FIG. 5 illustrates alternate embodiments of the device of FIG. 2.

FIG. 6 illustrates alternate embodiments of the device of FIG. 2.

FIG. 8 illustrates alternate embodiments of the device of FIG. 2.

FIG. 9 illustrates alternate embodiments of the device of FIG. 2.

DETAILED DESCRIPTION

Figure 1:
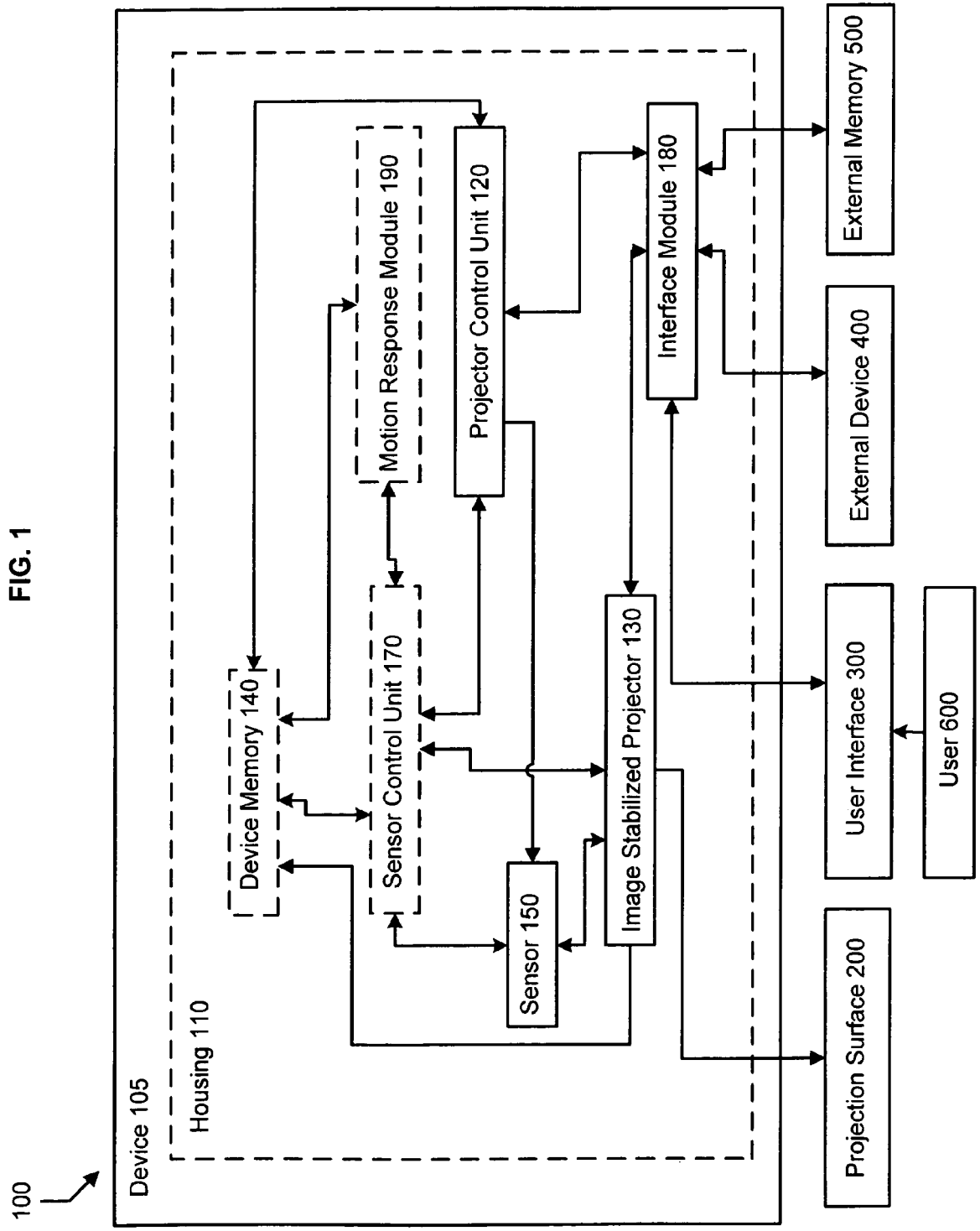
FIG. 1 illustrates an example system 100 in which embodiments may be implemented.
Figure 1A:
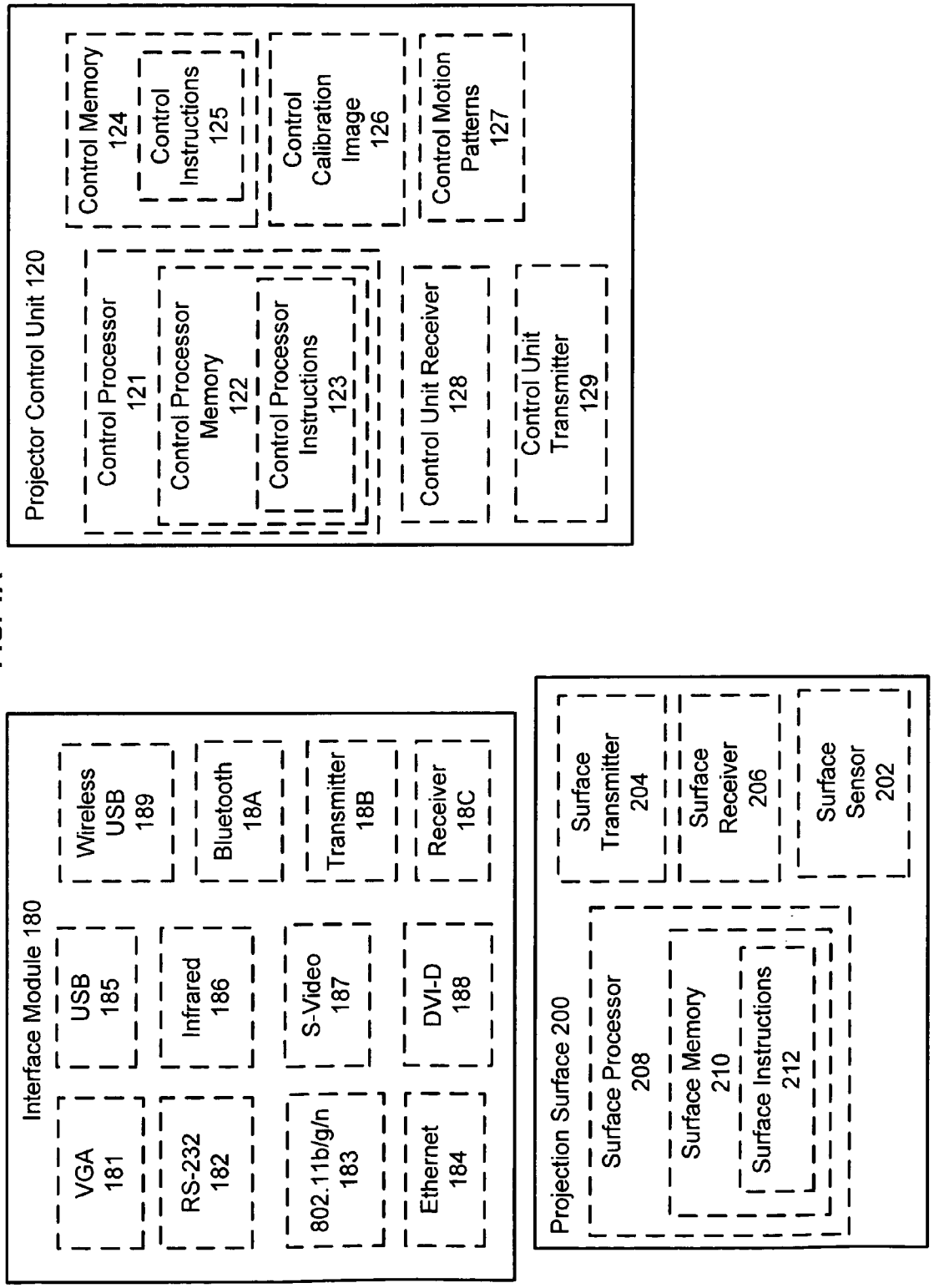
FIG. 1A illustrates example components that may be implemented within example system 100.
Figure 1B:
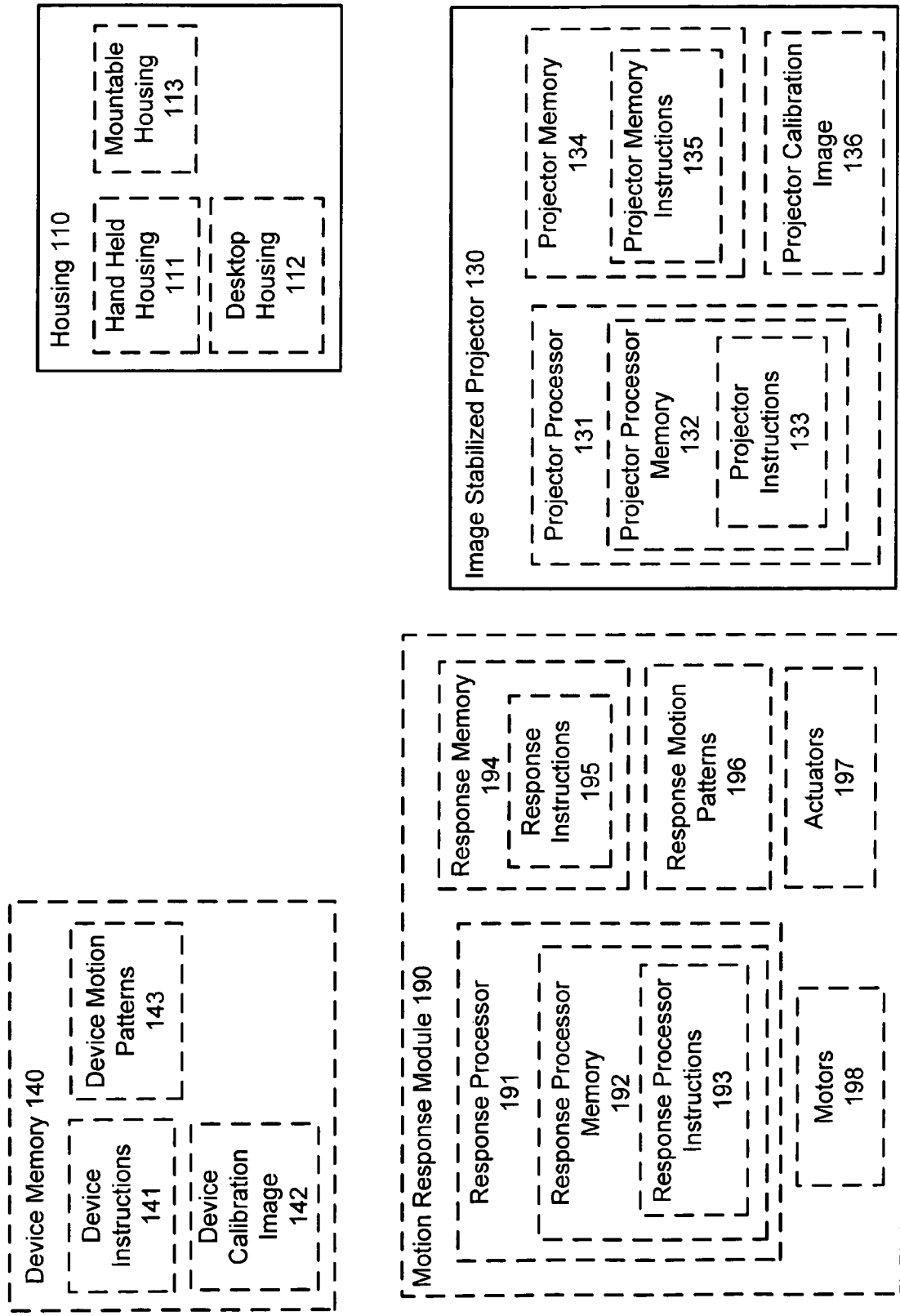
FIG. 1B illustrates example components that may be implemented within example system 100.
Figure 1C:
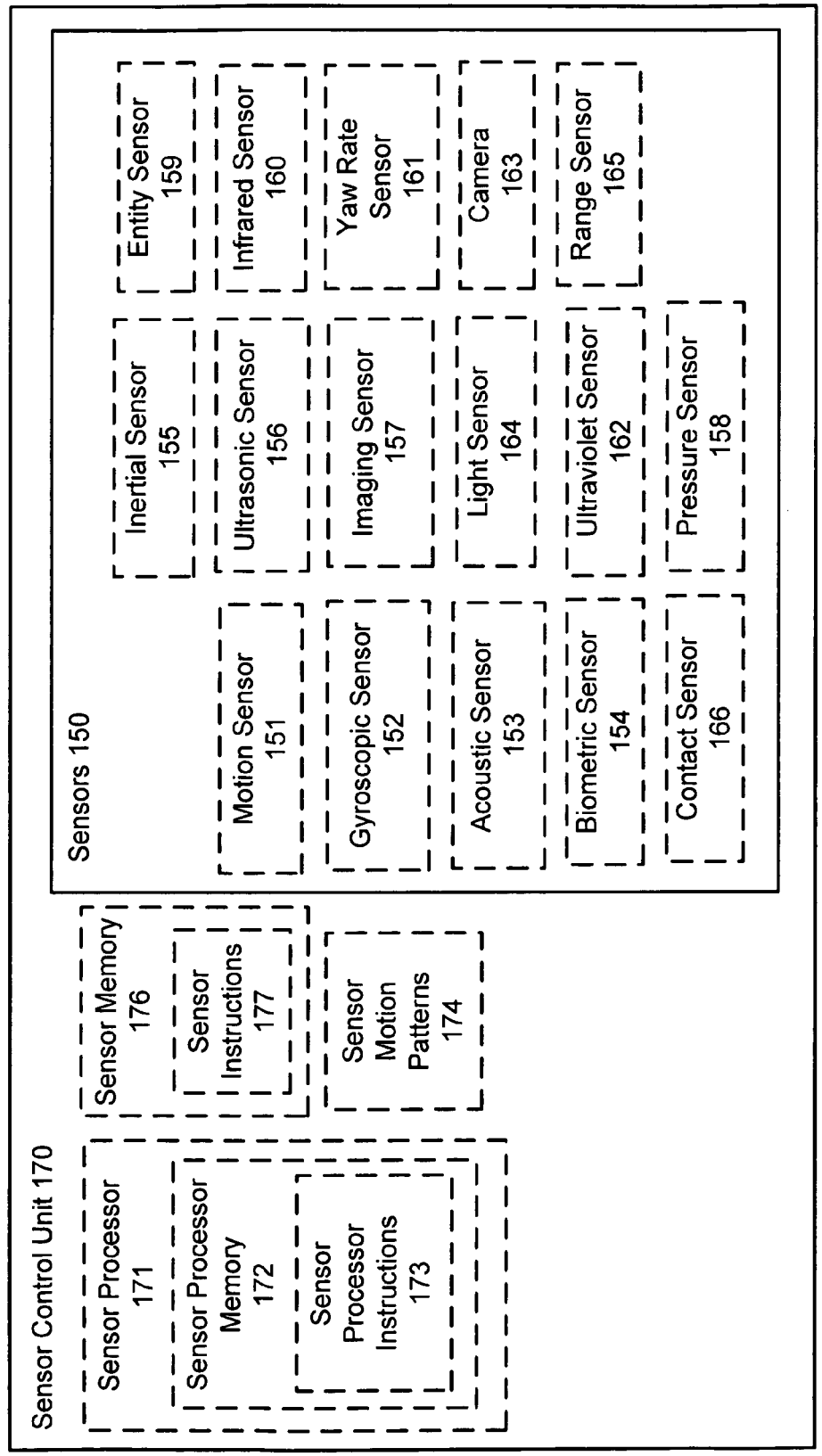
FIG. 1C illustrates example components that may be implemented within example system 100.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

FIG. 1 illustrates an example system 100 in which embodiments may be implemented. In some embodiments, system 100 may include one or more devices 105. In some embodiments, system 100 may include one or more housings 110. In some embodiments, system 100 may include device memory 140. In some embodiments, system 100 may include one or more image stabilized projectors 130. In some embodiments, system 100 may include one or more projector control units 120. In some embodiments, system 100 may include one or more motion response modules 190. In some embodiments, system 100 may include one or more sensor control units 170. In some embodiments, system 100 may include one or more sensors 150. In some embodiments, system 100 may include one or more interface modules 180. In some embodiments, system 100 may include one or more projection surfaces 200. In some embodiments, system 100 may include one or more user interfaces 300. In some embodiments, system 100 may include one or more external devices 400. In some embodiments, system 100 may include external memory 500. In some embodiments, system 100 may provide for user 600 interaction. In some embodiments, system 100 may include two or more image stabilized projectors 130 that project in a coordinated manner. For example, in some embodiments, two or more image stabilized projectors 130 may project the same content such that the projections are registered together to create a continuous projection.

Device

A device 105 may be configured to have numerous conformations. In some embodiments, a device 105 may be configured as a hand held device. For example, in some embodiments, a device 105 may be configured as a computer mouse. In some embodiments, a device 105 may be configured as a hand held projector. In some embodiments, a device 105 may be configured as a hand held projector and laser pointer. In some embodiments, a device 105 may be configured as a mountable device. For example, in some embodiments, a device 105 may be configured as a device 105 that may be mounted to a ceiling. In some embodiments, a device 105 may be configured as a ceiling mounted device 105 that may be configured to project content onto one or more portions of one or more substantially vertical surfaces. In some embodiments, a device 105 may be configured as a ceiling mounted device 105 that may be configured to project content onto one or more portions of one or more substantially horizontal surfaces. In some embodiments, a device 105 may be configured as a ceiling mounted device 105 that may be configured to project content onto one or more portions of one or more substantially vertical surfaces and onto one or more portions of one or more substantially horizontal surfaces. In some embodiments, a device 105 may be configured to project content onto one or more portions of one or more tabletops. For example, in some embodiments, a device 105 may be mounted onto a wall and configured to project content onto one or more tabletops. In some embodiments, a device 105 may be mounted and/or positioned onto a desk and configured to project content onto one or more desktops. In some embodiments, a device 105 may be mounted to or otherwise contained within another system, such as a desktop or mobile computer, PDA, cellular phone, camera 163, video player, or other system, for the display of content associated with that system. Accordingly, a device 105 may be configured in numerous ways to project content onto numerous types of projection surfaces 200.

In some embodiments, a device 105 may be configured to project in response to motion imparted to the device 105. In some embodiments, a device 105 may be configured to project content in manner that is dependent upon one or more substantially specific motions that are imparted to the device 105. For example, in some embodiments, a device 105 may be configured to project content contained on pages of a book in a manner that is motion dependent. Accordingly, in some embodiments, a device 105 may be configured to project content contained on the next page in a series upon rotation of the device 105 in a clockwise direction. In some embodiments, a device 105 may be configured to project content contained on the preceding page in a series upon rotation of the device 105 in a counterclockwise direction. In some embodiments, a device 105 may be configured to project content on the next page in a series upon being moved to the left from a starting position and then moved substantially back to the starting position. In some embodiments, the device 105 may be configured to project content on the preceding page in a series upon being moved to the right from a starting position and then moved substantially back to the starting position. In some embodiments, a device 105 may select content to be projected in response to motion imparted to the device 105. For example, in some embodiments, a device 105 may be configured to project content associated with a newspaper when the device 105 is positioned in a first orientation and be configured to project content associated with a news magazine when positioned in a second orientation. In some embodiments, a device 105 may be configured to correlate substantially specific motions with projection commands to select content in a motion dependent manner. In some embodiments, a device 105 may be configured to correlate substantially specific motions with projection commands to project content in a motion dependent manner. In some embodiments, a device 105 may be configured to correlate substantially specific motions with projection commands to select and project content in a motion dependent manner.

In some embodiments, a device 105 may be configured to project content in a manner that is dependent upon a person who is associated with the device 105. For example, in some embodiments, a device 105 may be configured to project children's content if held by a child. In some embodiments, a device 105 may be configured to project the statistics associated with various sports teams when associated with a first person and configured to project stock quotes when associated with a second person. Accordingly, a device 105 may be configured to project content that is selected in accordance with specific persons or classes of persons.

Housing

A device 105 may include one or more housings 110. In some embodiments, a housing 110 may be configured to include one or more image stabilized projectors 130, one or more projector control units 120, one or more motion response modules 190, one or more sensor control units 170, one or more sensors 150, one or more interface modules 180, or substantially any combination thereof. In some embodiments, a housing 110 may be configured for use in a handheld device 105. In some embodiments, a housing 110 may be configured for use in a mountable device 105. Accordingly, a housing 110 may be configured to have numerous conformations. A housing 110 may be constructed from numerous types of materials and combinations of materials. Examples of such materials include, but are not limited to, plastics, metals, papers, ceramics, and the like. In some embodiments, a housing 110 may include electrical connections to provide for operable association of components associated with the housing 110. In some embodiments, a housing 110 may include optical connections to provide for operable association of components associated with the housing 110.

Memory

A device 105 may include numerous types of memory. Examples of memory include, but are not limited to, flash memory, random access memory, read-only memory, hard drives, optical storage, and the like. In some embodiments, the memory located in the device 105 may be dedicated for access from one or more individual components (e.g., one or more processors) contained in the device 105. In some embodiments, the memory located in the device 105 may be configured for system wide access. A device 105 may have memory that is in numerous configurations. Examples of such configurations include, but are not limited to, device memory 140, projector processor memory 132, projector memory 134, control processor memory 122, control memory 124, response processor memory 192, response memory 194, sensor processor memory 172, sensor memory 176, and substantially any combination thereof.

Image Stabilized Projector

A device 105 may include one or more image stabilized projectors 130. In some embodiments, an image stabilized projector 130 may be operably associated with one or more projector control units 120. In some embodiments, an image stabilized projector 130 may be operably associated with one or more motion response modules 190. In some embodiments, an image stabilized projector 130 may be operably associated with one or more interface modules 180. In some embodiments, an image stabilized projector 130 may be operably associated with one or more sensors 150. In some embodiments, an image stabilized projector 130 may be operably associated with one or more sensor control units 170. In some embodiments, an image stabilized projector 130 may be operably associated with device memory 140. In some embodiments, an image stabilized projector 130 may be operably associated with one or more projector processors 131. In some embodiments, an image stabilized projector 130 may be operably associated with projector processor memory 132. In some embodiments, an image stabilized projector 130 may be operably associated with one or more projector instructions 133. In some embodiments, an image stabilized projector 130 may be operably associated with projector memory 134. In some embodiments, an image stabilized projector 130 may be operably associated with projector memory instructions 135. In some embodiments, an image stabilized projector 130 may be operably associated with one or more projector calibration images 136. In some embodiments, an image stabilized projector 130 may be operably associated with one or more control motion patterns 127. In some embodiments, an image stabilized projector 130 may be operably associated with one or more user interfaces 300. In some embodiments, an image stabilized projector 130 may be operably associated with one or more external devices 400. In some embodiments, an image stabilized projector 130 may be operably associated with external memory 500. In some embodiments, an image stabilized projector 130 may be operably associated with one or more housings 110.

A device 105 may include numerous types of image stabilized projectors 130. In some embodiments, an image stabilized projector 130 may include inertia and yaw rate sensors 161 that detect motion and provide for adjustment of projected content to compensate for the detected motion. In some embodiments, an image stabilized projector 130 may include an optoelectronic inclination sensor and an optical position displacement sensor to provide for stabilized projection (e.g., U.S. Published Patent Application No.: 2003/0038927). In some embodiments, an image stabilized projector 130 may include an optoelectronic inclination sensor, an optical position sensitive detector, and a piezoelectric accelerometer that provide for stabilized projection (e.g., U.S. Published Patent Application No.: 2003/0038928). Image stabilized projectors 130 have been described (e.g., U.S. Pat. Nos. 7,284,866; U.S. Published Patent Application Nos.: 20050280628; 20060103811, and 2006/0187421). In some embodiments, one or more projectors may be modified to become image stabilized projectors 130. Examples of such projectors have been described (e.g., U.S. Pat. Nos. 6,002,505; 6,764,185; 6,811,264; 7,036,936; 6,626,543; 7,134,078; 7,355,584; U.S. Published Patent Application No.: 2007/0109509).

Image stabilized projectors 130 may be configured to project numerous wavelengths of light. In some embodiments, an image stabilized projector 130 may be configured to project ultraviolet light. In some embodiments, an image stabilized projector 130 may be configured to project visible light. In some embodiments, an image stabilized projector 130 may be configured to project infrared light. In some embodiments, an image stabilized projector 130 may be configured to project numerous combinations of light. For example, in some embodiments, an image stabilized projector 130 may project one or more infrared calibration images and one or more visible images.

Motion Response Module

In some embodiments, device 105 may include one or more motion response modules 190. In some embodiments, one or more motion response modules 190 may be operably associated with one or more image stabilized projectors 130. In some embodiments, one or more motion response modules 190 may be operably associated with one or more projector control units 120. In some embodiments, one or more motion response modules 190 may be operably associated with one or more sensors 150. In some embodiments, one or more motion response modules 190 may be operably associated with one or more sensor control units 170. In some embodiments, one or more motion response modules 190 may be operably associated with one or more response processors 191. In some embodiments, one or more motion response modules 190 may be operably associated with response processor memory 192. In some embodiments, one or more motion response modules 190 may be operably associated with one or more response processor instructions 193. In some embodiments, one or more motion response modules 190 may be operably associated with response memory 194. In some embodiments, one or more motion response modules 190 may be operably associated with one or more response instructions 195. In some embodiments, one or more motion response modules 190 may be operably associated with one or more response motion patterns 196. In some embodiments, a motion response module 190 may be configured to modulate output from an image stabilized projector 130 in response to motion that is imparted to a device 105 that includes the image stabilized projector 130. For example, in some embodiments, a motion response module 190 may include one or more motors 198 that are operably coupled to one or more actuators 197 that control one or more lenses. Accordingly, in some embodiments, one or more motion response modules 190 may focus output from an image stabilized projector 130 in response to motion imparted to a device 105 that includes the image stabilized projector 130. Motion response modules 190 may be configured in numerous conformations to modulate output from an operably associated image stabilized projector 130.

Projector Control Unit

A device 105 may include one or more projector control units 120. In some embodiments, one or more projector control units 120 may be operably associated with one or more image stabilized projectors 130. In some embodiments, one or more projector control units 120 may be operably associated with one or more motion response modules 190. In some embodiments, one or more projector control units 120 may be operably associated with one or more image stabilized projectors 130 and one or more motion response modules 190. In some embodiments, a projector control unit 120 may be operably associated with one or more control processors 121. In some embodiments, a projector control unit 120 may be operably associated with control processor memory 122. In some embodiments, a projector control unit 120 may be operably associated with one or more control processor instructions 123. In some embodiments, a projector control unit 120 may be operably associated with control memory 124. In some embodiments, a projector control unit 120 may be operably associated with one or more control instructions 125. In some embodiments, a projector control unit 120 may be operably associated with one or more control calibration images 126. In some embodiments, a projector control unit 120 may be operably associated with one or more control motion patterns 127. In some embodiments, a projector control unit 120 may be configured to modulate output projected by one or more image stabilized projectors 130. In some embodiments, one or more projector control units 120 may be configured to select one or more wavelengths of light that will be projected by one or more image stabilized projectors 130. For example, in some embodiments, one or more projector control units 120 may select one or more wavelengths of ultraviolet light that will be projected by one or more image stabilized projectors 130. In some embodiments, one or more projector control units 120 may select one or more wavelengths of visible light that will be projected by one or more image stabilized projectors 130. In some embodiments, one or more projector control units 120 may select one or more wavelengths of infrared light that will be projected by one or more image stabilized projectors 130. Accordingly, in some embodiments, one or more projector control units 120 may select numerous wavelengths of light that will be projected by one or more image stabilized projectors 130.

In some embodiments, one or more projector control units 120 may select content that is to be projected by one or more image stabilized projectors 130. In some embodiments, one or more projector control units 120 may select content that is to be projected in response to one or more features associated with one or more projection surfaces 200. For example, in some embodiments, one or more projector control units 120 may select content that is to be projected in response to motion associated with device 105. In some embodiments, one or more projector control units 120 may select content that is to be projected in response to motion associated with one or more projection surfaces 200. In some embodiments, one or more projector control units 120 may select content that is not to be projected by one or more image stabilized projectors 130. In some embodiments, one or more projector control units 120 may select content that is not to be projected in response to one or more features associated with one or more projection surfaces 200. For example, in some embodiments, one or more projector control units 120 may select content that is not to be projected in response to motion associated with device 105. In some embodiments, one or more projector control units 120 may select content that is not to be projected in response to motion associated with one or more projection surfaces 200.

In some embodiments, one or more projector control units 120 may modulate output that is projected by one or more image stabilized projectors 130. In some embodiments, one or more projector control units 120 may modulate the intensity of light that is projected by one or more image stabilized projectors 130. In some embodiments, one or more projector control units 120 may modulate the brightness of light that is projected by one or more image stabilized projectors 130. In some embodiments, one or more projector control units 120 may modulate the contrast of light that is projected by one or more image stabilized projectors 130. In some embodiments, one or more projector control units 120 may modulate the sharpness of light that is projected by one or more image stabilized projectors 130.

In some embodiments, one or more projector control units 120 may modulate the direction of output that is projected by one or more image stabilized projectors 130. In some embodiments, one or more projector control units 120 may direct output from one or more image stabilized projectors 130 onto one or more moving projection surfaces 200. In some embodiments, one or more projector control units 120 may direct output from one or more image stabilized projectors 130 onto one or more stationary projection surfaces 200. In some embodiments, one or more projector control units 120 may direct output from one or more image stabilized projectors 130 onto one or more moving projection surfaces 200 and onto one or more stationary projection surfaces 200. In some embodiments, one or more projector control units 120 may direct output from one or more image stabilized projectors 130 onto multiple projection surfaces 200. For example, in some embodiments, one or more projector control units 120 may direct output from one or more image stabilized projectors 130 onto a first projection surface 200 and direct output from one or more image stabilized projectors 130 onto a second projection surface 200.

In some embodiments, one or more projector control units 120 may dynamically modulate output from one or more image stabilized projectors 130. For example, in some embodiments, one or more image stabilized projectors 130 may be carried from room to room such that one or more projector control units 120 modulate output from the one or more image stabilized projectors 130 in response to the available projection surface 200. In some embodiments, one or more projector control units 120 may dynamically modulate output from one or more image stabilized projectors 130 in an outdoor environment. For example, in some embodiments, one or more image stabilized projectors 130 may be configured to project an image of one or more running companions, such as persons or animals, and one or more projector control units 120 may dynamically modulate projection of the image in response to changing terrain.

In some embodiments, one or more projector control units 120 may be configured to respond to one or more substantially defined motions. In some embodiments, a user 600 may program one or more projector control units 120 to correlate one or more substantially defined motions with one or more projection commands. For example, in some embodiments, a user 600 may program one or more projector control units 120 to correlate clockwise motion of device 105 with a command to advance a projected slide presentation by one slide. Accordingly, in some embodiments, a device 105 may be configured to project in response to substantially defined motions that are programmed according to the preferences of an individual user 600.

Sensor Control Unit

A device 105 may include one or more sensor control units 170. In some embodiments, one or more sensor control units 170 may be operably associated with one or more sensors 150. In some embodiments, one or more sensor control units 170 may be operably associated with one or more image stabilized projectors 130. In some embodiments, one or more sensor control units 170 may be operably associated with device memory 140. In some embodiments, one or more sensor control units 170 may be operably associated with one or more sensor processors 171. In some embodiments, one or more sensor control units 170 may be operably associated with sensor processor memory 172. In some embodiments, one or more sensor control units 170 may be operably associated with one or more sensor processor instructions 173. In some embodiments, one or more sensor control units 170 may be operably associated with sensor memory 176. In some embodiments, one or more sensor control units 170 may be operably associated with one or more sensor instructions 177. In some embodiments, one or more sensor control units 170 may be operably associated with one or more sensor motion patterns 174.

In some embodiments, one or more sensor control units 170 may signal a change in sensor response to one or more associated systems. For example, in some embodiments, a change in ambient light signal from one or more ambient light sensors 164, range sensors 165, motion sensors 151, or other sensors 150 alone or in combination can be stored in memory for future diagnosis and/or be signaled to one or more image stabilized projectors 130 where the change in ambient light may trigger a change in projector 130 output intensity. In some embodiments, one or more projector control units 120 may use prior sensor response, user input, or other stimulus, to activate or deactivate one or more sensors 150 or other subordinate features contained within one or more sensor control units 170. In some embodiments, one or more sensor control units 170 may use prior sensor response, user input, or other stimulus, to activate or deactivate one or more sensors 150 or other subordinate features contained within one or more sensor control units 170.

Sensor

A device 105 may include one or more sensors 150. In some embodiments, one or more sensors 150 may be operably associated with one or more sensor control units 170. In some embodiments, one or more sensors 150 may be operably associated with memory. In some embodiments, one or more sensors 150 may be operably associated with one or more user interfaces 300. In some embodiments, one or more sensors 150 may be operably associated with one or more image stabilized projectors 130. In some embodiments, one or more sensors 150 may be operably associated with one or more projection control units 120. In some embodiments, one or more sensors 150 may be operably associated with one or more motion response modules 190. In some embodiments, one or more sensors 150 may be operably associated with one or more housings 110.

A device 105 may include many types of sensors 150 alone or in combination. Examples of sensors 150 include, but are not limited to, cameras 163, light sensors 164, range sensors 165, contact sensors 166, entity sensors 159, infrared sensors 160, yaw rate sensors 161, ultraviolet sensors 162, inertial sensors 155, ultrasonic sensors 156, imaging sensors 157, pressure sensors 158, motion sensors 151, gyroscopic sensors 152, acoustic sensors 153, biometric sensors 154, and the like.

In some embodiments, one or more sensors 150 may be configured to detect motion that is imparted to one or more devices 105 that include the one or more sensors 150. Accordingly, in some embodiments, one or more sensors 150 that are configured to detect motion may be operably associated with one or more image stabilized projectors 130 to facilitate modulation of projection output in response to motion. In some embodiments, one or more sensors 150 may be associated with one or more image stabilized projectors 130 through one or more projector control units 120. In some embodiments, one or more sensors 150 may be associated with one or more image stabilized projectors 130 through one or more motion response modules 190. In some embodiments, one or more sensors 150 may be associated with one or more image stabilized projectors 130 through or independent of one or more sensor control units 170.

Interface Module

A device 105 may include one or more interface modules 180. In some embodiments, one or more interface modules 180 may be operably associated with one or more image stabilized projectors 130. In some embodiments, one or more interface modules 180 may be operably associated with one or more projector control units 120. In some embodiments, one or more interface modules 180 may be operably associated with one or more motion response modules 190. In some embodiments, one or more interface modules 180 may be operably associated with one or more sensors 150. In some embodiments, one or more interface modules 180 may be operably associated with one or more sensor control units 170. In some embodiments, one or more interface modules 180 may be operably associated with one or more external devices 400. In some embodiments, one or more interface modules 180 may be operably associated with external memory 500. In some embodiments, one or more interface modules 180 may be operably associated with one or more user interfaces 300.

An interface module 180 may communicate with other components of system 100 through use of numerous communication formats and combinations of communication formats. Examples of such formats include, but are not limited to, VGA 181, USB 185, wireless USB 189, RS-232 182, infrared 186, Bluetooth 18A, 802.11b/g/n 183, S-video 187, Ethernet 184, DVI-D 188, and the like. In some embodiments, an interface module 180 may include one or more transmitters 18B. In some embodiments, an interface module 180 may include one or more receivers 18C.

External Device

A device 105 may be operably associated with one or more external devices 400. Examples of such external devices 400 include, but are not limited to, projectors, recording devices, projection surfaces 200, image acquiring surfaces, image printing surfaces (e.g., a projection surface 200 that facilitates the printing or other recordation of content projected on the surface), networks, the internet, wireless devices (e.g., personal digital assistant, cellular telephones, telephones, television transmissions, etc.), receivers 18C, transmitters 18B, and the like.

External Memory

A device 105 may be operably associated with external memory 500. Examples of such external memory 500 include, but are not limited to, USB flash drives, memory cards, external hard drives, networked storage, and the like. In some embodiments, display content is retrieved from external memory 500. In some embodiments, sensor data, operational parameters, usage information, or other device or subsystem information can be stored on external memory 500.

Projection Surface

System 100 may include one or more projection surfaces 200. In some embodiments, nearly any surface may be utilized as a projection surface 200. In some embodiments, a projection surface 200 may be portable. In some embodiments, a projection surface 200 may be carried by an individual person. For example, in some embodiments, a projection surface 200 may be configured as a sheet of material, a tablet, two or more sheets of material that may be separated from each other, and the like. Accordingly, in some embodiments, a projection surface 200 may be configured as a sheet of material that a user 600 may unfold and place on a surface, such as a desk, wall, floor, ceiling, etc.

In some embodiments, a projection surface 200 may include one or more surface sensors 202 that are associated with the projection surface 200. In some embodiments, a projection surface 200 may include one or more magnetic surface sensors 202. For example, in some embodiments, a projection surface 200 may include magnetic surface sensors 202 that are configured to detect magnetic ink that is applied to the projection surface 200. In some embodiments, a projection surface 200 may include one or more pressure surface sensors 202. For example, in some embodiments, a projection surface 200 may include pressure surface sensors 202 that are configured to detect pressure that is applied to the projection surface 200 (e.g., contact of a stylus with the projection surface 200, contact of a pen with the projection surface 200, contact of a pencil with the projection surface 200, etc.). In some embodiments, a projection surface 200 may include one or more motion surface sensors 202. For example, in some embodiments, a projection surface 200 may include motion surface sensors 202 that are configured to detect movement associated with the projection surface 200. In some embodiments, a projection surface 200 may include one or more strain surface sensors 202. For example, in some embodiments, a projection surface 200 may include strain surface sensors 202 that are configured to detect changes in conformation associated with the projection surface 200. In some embodiments, a projection surface 200 may include one or more positional surface sensors 202 (e.g., global positioning surface sensors 202). For example, in some embodiments, a projection surface 200 may include positional surface sensors 202 that are configured to detect changes in position associated with the projection surface 200.

A projection surface 200 may be constructed from numerous types of materials and combinations of materials. Examples of such materials include, but are not limited to, cloth, plastic, metal, ceramics, paper, wood, leather, glass, and the like. In some embodiments, one or more projection surfaces 200 may exhibit electrochromic properties. In some embodiments, one or more projection surfaces 200 may be coated. For example, in some embodiments, a projection surface 200 may be coated with paint. In some embodiments, a projection surface 200 may include one or more materials that alter light. For example, in some embodiments, a projection surface 200 may convert light (e.g., up-convert light, down-convert light).

In some embodiments, a projection surface 200 may be associated with one or more fiducials. For example, in some embodiments, one or more fluorescent marks may be placed on a projection surface 200. In some embodiments, one or more phosphorescent marks may be placed on a projection surface 200. In some embodiments, one or more magnetic materials may be placed on a projection surface 200. In some embodiments, fiducials may be placed on a projection surface 200 in numerous configurations. For example, in some embodiments, fiducials may be positioned in association with a projection surface 200 such that they form a pattern. In some embodiments, a projection surface 200 may include one or more calibration images.

In some embodiments, a projection surface 200 may include one or more surface transmitters 204. Accordingly, in some embodiments, a projection surface 200 may be configured to transmit one or more signals. Such signals may include numerous types of information. Examples of such information may include, but are not limited to, information associated with: one or more positions of one or more projection surfaces 200, one or more conformations of one or more projection surfaces 200, one or more changes in the position of one or more projection surfaces 200, one or more changes in the conformation of one or more projection surfaces 200, one or more motions associated with one or more projection surfaces 200, one or more changes in the motion of one or more projection surfaces 200, and the like.

In some embodiments, a projection surface 200 may include one or more surface receivers 206. Accordingly, in some embodiments, a projection surface 200 may be configured to receive one or more signals. For example, in some embodiments, one or more surface receivers 206 may receive one or more signals that are transmitted by one or more control unit transmitters 129.

In some embodiments, a projection surface 200 may include one or more surface processors 208. Accordingly, in some embodiments, a surface processor 208 may be configured to process information received from one or more surface sensors 202.

In some embodiments, a projection surface 200 may include surface memory 210. In some embodiments, a surface memory 210 may include one or more lookup tables that include correlation information associated with the position of one or more fiducials associated with a projection surface 200 and one or more conformations of the projection surface 200. In some embodiments, surface memory 210 may include surface instructions 212. In some embodiments, surface instructions 212 may include instructions for a projection surface 200 to transmit one or more signals that indicate that a projection surface 200 has undergone a change in conformation. In some embodiments, surface instructions 212 may include instructions for a projection surface 200 to transmit one or more signals that indicate that a projection surface 200 has undergone a change in position. In some embodiments, surface instructions 212 may include instructions for a projection surface to transmit one or more signals that indicate that a projection surface 200 has undergone a change in motion.

User Interface

A device 105 may include one or more user interfaces 300. In some embodiments, a device 105 may include one or more user interfaces 300 that are configured as gestural user interfaces 300. In some embodiments, a device 105 may project content in response to substantially specific motion that is imparted to the device 105. For example, in some embodiments, a user 600 may rotate a handheld device 105 in a clockwise direction to advance the projection of a slide presentation by one frame. In some embodiments, a device 105 may respond to user input acquired through sensor information other than motion. For example, in some embodiments, acoustic sensors 153 may be employed for response to voice commands or other auditory signals. In some embodiments, cameras 163 or other imaging detectors may use user location, user gestures, laser pointer location, and/or other information as an input signal. In some embodiments, a device 105 may include one or more user interfaces 300 that are configured as control features on a device 105. Examples of such control features include, but are not limited to, buttons, switches, track balls, and the like.

User

A device 105 may be operated by one or more users 600. In some embodiments, a user 600 may be human. In some embodiments, a user 600 may be a non-human user 600. For example, in some embodiments, a user 600 may be a computer, a robot, and the like. In some embodiments, a user 600 may be proximate to a device 105. In some embodiments, a user 600 may be remote from a device 105.

Following are a series of charts depicting implementations. For ease of understanding, the charts are organized such that the initial charts present implementations via an example implementation and thereafter the following charts present alternate implementations and/or expansions of the initial chart(s) as either sub-component operations or additional component operations building on one or more earlier-presented charts. Those having skill in the art will appreciate that the style of presentation utilized herein (e.g., beginning with a presentation of a chart(s) presenting an example implementation and thereafter providing additions to and/or further details in subsequent charts) generally allows for a rapid and easy understanding of the various process implementations. In addition, those skilled in the art will further appreciate that the style of presentation used herein also lends itself well to modular and/or object-oriented program design paradigms.

Figure 2:
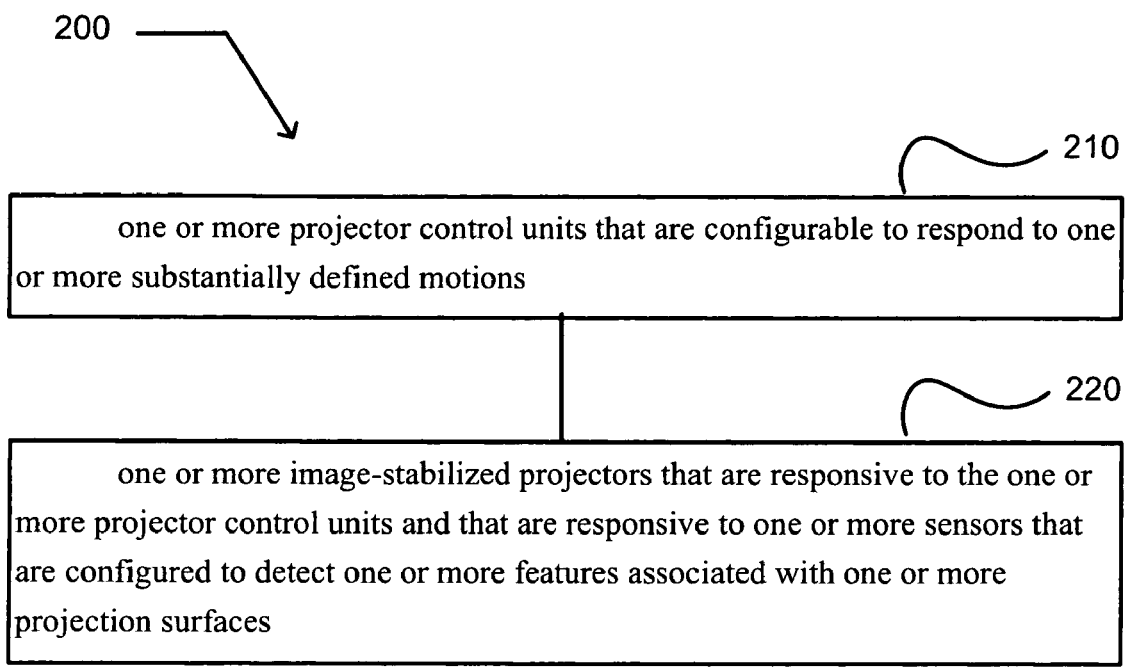
FIG. 2 illustrates an embodiment 200 of a device.

FIG. 2 illustrates embodiment 200 of device 105 within system 100. In FIG. 2, discussion and explanation may be provided with respect to the above-described example of FIG. 1, and/or with respect to other examples and contexts. However, it should be understood that the modules may execute operations in a number of other environments and contexts, and/or modified versions of FIG. 1. Also, although the various modules are presented in the sequence(s) illustrated, it should be understood that the various modules may be configured in numerous orientations.

The embodiment 200 may include module 210 that includes one or more projector control units that are configurable to respond to one or more substantially defined motions. In some embodiments, device 105 may include one or more projector control units 120 that are configurable to respond to one or more substantially defined motions. In some embodiments, a projector control unit 120 may be preconfigured to respond to one or more substantially defined motions. For example, in some embodiments, a projector control unit 120 may be preconfigured to respond to a substantially rightward motion followed by return to a starting position by advancing the progression of a presentation being projected by one or more image stabilized projectors 130. In some embodiments, a projector control unit 120 may be preconfigured to respond to a substantially upward motion followed by return to a starting position by increasing the volume of sound being projected from one or more image stabilized projectors 130. Accordingly, in some embodiments, a projector control unit 120 may be preconfigured to respond to numerous substantially defined motions. In some embodiments, a projector control unit 120 may be configurable to respond to one or more substantially user 600 defined motions. For example, in some embodiments, a user 600 may select substantially defined motions to which a projector control unit 120 will respond. For example, in some embodiments, a user 600 may cause a projector control unit 120 to correlate clockwise motion with advancement of a projection series. Accordingly, in some embodiments, numerous substantially defined motions may be correlated with commands for controlling the operation of one or more image stabilized projectors 130. In some embodiments, the parameters of one or more substantially defined motions that are recognized by one or more projector control units 120 may be set by one or more users 600. For example, in some embodiments, the minimum acceleration imparted to one or more devices 105 that is recognized by one or more projector control units 120 may be set by one or more users 600. Accordingly, numerous substantially defined motions that are recognized by one or more projector control units 120 may be set by one or more users 600.

The embodiment 200 may include module 220 that includes one or more image-stabilized projectors that are responsive to the one or more projector control units and that are responsive to one or more sensors that are configured to detect one or more features associated with one or more projection surfaces. In some embodiments, device 105 may include one or more image-stabilized projectors that are responsive to one or more features associated with one or more projection surfaces 200 and that are operably associated with one or more projector control units 120. In some embodiments, one or more image stabilized projectors 130 may be responsive to numerous features associated with one or more projection surfaces 200. In some embodiments, an image stabilized projector 130 may vary the brightness of projection based on one or more features of one or more projection surfaces 200. For example, in some embodiments, one or more image stabilized projectors 130 may increase projection flux if one or more projection surfaces 200 are in bright light. In some embodiments, one or more image stabilized projectors 130 may decrease projection flux if one or more projection surfaces 200 are in dim light. In some embodiments, one or more image stabilized projectors 130 may modulate one or more projections in response to one or more calibration images. For example, in some embodiments, two or more image stabilized projectors 130 may project an image that is modulated in response to a calibration image to cause the projected image to be in register. In some embodiments, one or more image stabilized projectors 130 may modulate a projected image in response to movement of a projection surface 200. For example, in some embodiments, one or more image stabilized projectors 130 may project a first content set when a projection surface 200 is in a first position and project a second content set when the projection surface 200 is in a second position. In some embodiments, one or more image stabilized projectors 130 may modulate a projected image in response to a conformation of a projection surface 200. For example, in some embodiments, one or more image stabilized projectors 130 may project a first content set when a projection surface 200 is in a first conformation and project a second content set when the projection surface 200 is in a second conformation. Accordingly, in some embodiments, one or more image stabilized projectors 130 may be configured to respond to one or more substantially defined motions and one or more features of one or more projection surfaces 200.

FIG. 3 illustrates alternative embodiments of embodiment 200 of device 105 within system 100 of FIG. 2. FIG. 3 illustrates example embodiments of module 210. Additional embodiments may include an embodiment 302, an embodiment 304, an embodiment 306, an embodiment 308, and/or an embodiment 310.

At embodiment 302, module 210 may include one or more projector control units that are operably associated with one or more sensor control units that are configured to operate the one or more sensors. In some embodiments, one or more projector control units 120 may include one or more projector control units 120 that are operably associated with one or more sensor control units 170 that are configured to operate one or more sensors 150. A projector control unit 120 may be configured to operate numerous types of sensors 150 and combinations of sensors 150. Examples of such sensors 150 include, but are not limited to, cameras 163, light sensors 164, range sensors 165, contact sensors 166, entity sensors 159, infrared sensors 160, yaw rate sensors 161, ultraviolet sensors 162, inertial sensors 155, ultrasonic sensors 156, imaging sensors 157, pressure sensors 158, motion sensors 151, gyroscopic sensors 152, acoustic sensors 153, biometric sensors 154, and the like. In some embodiments, a projector control unit 120 may include one or more processors. In some embodiments, a projector control unit 120 may include one or more processors that are operably associated with memory. In some embodiments, a projector control unit 120 may include one or more processors that are operably associated with memory that includes operating instructions.

In some embodiments, the operating instructions may use thresholds, image recognition, pattern recognition, and/or other event detection mechanisms to evaluate sensor information. In some embodiments, the sensor information and processing evaluation may be stored in one or more associated memory modules. In some embodiments, processor instructions may enable a logic module responsible for triggering one or more operating instructions based upon the sensor data and processing evaluation of the sensor information. In some embodiments, the operating instructions may include enabling or disabling the output of one or more image stabilized projectors 130, adjusting the output intensity of one or more image stabilized projectors 130, adjusting the focus of one or more image stabilized projectors 130, adjusting the image projection angle and shape of one or more images projected by one or more image stabilized projectors 130, and the like. In some embodiments, the operating instructions may include the enabling and/or disabling of one or more sensors 150, the enabling and/or disabling of one or more user interfaces 300, and the like.

In some embodiments, a projector control unit 120 may include one or more operating instructions. In some embodiments, a projector control unit 120 may include memory. In some embodiments, a projector control unit 120 may include memory that includes one or more operating instructions.

In some embodiments, the operating instructions may include algorithms associated with the normal operation of the device 105. These algorithms may include operational steps for starting up the projector system, operational steps for shutting down the projector system, operational steps for projecting content, operational steps for projecting content in conjunction with one or more additional projector systems in a tiled, overlapping, alternating, and/or other such mode, and the like.

In some embodiments, a projector control unit 120 may include one or more calibration images. In some embodiments, a projector control unit 120 may include one or more calibration images that are stored in memory. Calibration images may exhibit numerous configurations. Examples of such configurations include, but are not limited to, grid patterns, pictures, geometric shapes, and the like. In some embodiments, a calibration image may be configured as a portion of a complete image. In some embodiments, a first image stabilized projector 130 may be configured to project a first portion of a calibration image and a second image stabilized projector 130 may be configured to project a second portion of a calibration image that completes the image. Accordingly, calibration images that are projected from more than one image stabilized projector 130 may be brought into register through the use of calibration images. In some embodiments, one or more calibration images may be used to correct one or more projected images on one or more projection surfaces 200. In some embodiments, one or more calibration images may be used to calibrate one or more image stabilized projectors 130 to project in response to an irregular projection surface 200. For example, in some embodiments, one or more calibration images may be used to focus content that is projected on one or more rounded projection surfaces 200. In some embodiments, one or more calibration images may be used to focus content that is projected on one or more irregular projection surfaces 200. In some embodiments, one or more calibration images may be used to calibrate output from one or more image stabilized projectors 130 in response to one or more changes in conformation associated with one or more projection surfaces 200. In some embodiments, one or more calibration images may be used to calibrate output from one or more image stabilized projectors 130 in response to motion associated with one or more projection surfaces 200.

At embodiment 304, module 210 may include one or more projector control units that are operably associated with the one or more sensors. In some embodiments, one or more projector control units 120 may include one or more projector control units 120 that are operably associated with one or more sensors 150. A projector control unit 120 may be operably associated with numerous types of sensors 150 and combinations of sensors 150. Examples of such sensors 150 include, but are not limited to, cameras 163, light sensors 164, range sensors 165, contact sensors 166, entity sensors 159, infrared sensors 160, yaw rate sensors 161, ultraviolet sensors 162, inertial sensors 155, ultrasonic sensors 156, imaging sensors 157, pressure sensors 158, motion sensors 151, gyroscopic sensors 152, acoustic sensors 153, biometric sensors 154, and the like. Numerous types of sensors 150 have been described and are commercially available (e.g., U.S. Pat. Nos. 7,328,616; 7,155,978; 6,675,630; 5,747,690; 7,232,700; 7,191,653; 7,159,441; 7,043,987; 7,355,584; 7,134,078; 6,626,543; 7,036,936; 6,811,264; 6,764,185; 6,002,505; 7,284,866; 7,301,648; 6,310,988; U.S. Published Patent Applications: 2006/0187421; 20060103811; 20050280628; 2003/0038928; 2003/0038927) (Boeing, Inc., Seattle, Wash.; Hobby Services, Champaign, Ill.; Institute for Photonic Microsystems, Dresden; Intersense, Inc., Bedford, Mass.).

At embodiment 306, module 210 may include one or more projector control units that are operably associated with one or more motion sensors. In some embodiments, one or more projector control units 120 may include one or more projector control units 120 that are operably associated with one or more motion sensors 151. In some embodiments, one or more projector control units 120 may control one or more image stabilized projectors 130 in response to one or more motion detectors. For example, in some embodiments, one or more projector control units 120 may advance a slide show in response to clockwise motion imparted to a device 105. In some embodiments, one or more projector control units 120 may reverse a slide show in response to counter clockwise motion imparted to a device 105. One or more projector control units 120 may be operably associated with numerous types of motion detectors. In some embodiments, a motion detector may be an inertial detector. In some embodiments, a motion detector may be an accelerometer. In some embodiments, a motion detector may be a camera 163 that is configured to detect one or more fiducials on a projection surface 200. Accordingly, a device 105 may include numerous types of motion detectors. Numerous types of motion detectors have been described and are commercially available (e.g., U.S. Pat. Nos. 6,573,887; 7,355,583; Intersense, Inc., Bedford, Mass.).

At embodiment 308, module 210 may include one or more projector control units that are operably associated with one or more gyroscopic sensors. In some embodiments, one or more projector control units 120 may include one or more projector control units 120 that are operably associated with one or more gyroscopic sensors 152. In some embodiments, one or more projector control units 120 may control one or more image stabilized projectors 130 in response to one or more gyroscopic sensors 152. For example, in some embodiments, one or more projector control units 120 may advance a slide show in response to leftward motion imparted to a device 105. In some embodiments, one or more projector control units 120 may reverse a slide show in response to rightward motion imparted to a device 105. Numerous types of gyroscopic sensors 152 have been described and are commercially available (e.g., U.S. Pat. Nos. 7,043,987; 7,159,441; 7,191,653; 7,232,700; 5,747,690; 6,675,630; Boeing, Inc., Seattle, Wash.; Hobby Services, Champaign, Ill.).

At embodiment 310, module 210 may include one or more projector control units that are operably associated with one or more laser gyroscopes. In some embodiments, one or more projector control units 120 may include one or more projector control units 120 that are operably associated with one or more laser gyroscopes. In some embodiments, one or more projector control units 120 may control one or more image stabilized projectors 130 in response to one or more laser gyroscopes. For example, one or more image stabilized projectors 130 may project content in response to motion detected with one or more laser gyroscopes. Numerous types of laser gyroscopes have been described and are commercially available (e.g., U.S. Pat. Nos. 7,330,269; 6,498,651; 5,757,490; 5,469,258; 7,245,381; Honeywell International Inc., Morristown, N.J.).

FIG. 4 illustrates alternative embodiments of embodiment 200 of device 105 within system 100 of FIG. 2. FIG. 4 illustrates example embodiments of module 210. Additional embodiments may include an embodiment 402, an embodiment 404, an embodiment 406, an embodiment 408, an embodiment 410, and/or an embodiment 412.

At embodiment 402, module 210 may include one or more projector control units that are operably associated with one or more silicon gyroscopes. In some embodiments, one or more projector control units 120 may include one or more projector control units 120 that are operably associated with one or more silicon gyroscopes. In some embodiments, one or more projector control units 120 may control one or more image stabilized projectors 130 in response to one or more silicon gyroscopes. For example, one or more image stabilized projectors 130 may project content in response to motion detected with one or more silicon gyroscopes. Silicon laser gyroscopes have been described and are commercially available (e.g., Boeing, Inc., Seattle, Wash.).

At embodiment 404, module 210 may include one or more projector control units that are operably associated with one or more inertial sensors. In some embodiments, one or more projector control units 120 may include one or more projector control units 120 that are operably associated with one or more inertial sensors 155. In some embodiments, one or more projector control units 120 may control one or more image stabilized projectors 130 in response to one or more inertial sensors 155. For example, one or more image stabilized projectors 130 may project content in response to motion detected with one or more inertial sensors 155. In some embodiments, one or more inertial sensors 155 may be micro-electro-mechanical systems inertial sensors 155 that combine electrical and mechanical inertial sensing components. In some embodiments, such sensors 150 may be accelerometers that include miniature proof masses and sensing electronics and gyroscopes based on the coriolis effect using vibrating forks. Numerous types of inertial sensors 155 have been described and are commercially available (e.g., U.S. Pat. Nos. 7,363,816; 7,337,669; 7,287,428; 7,270,003; 7,252,002; 7,209,569; Honeywell International Inc., Morristown, N.J.).

At embodiment 406, module 210 may include one or more projector control units that are operably associated with one or more yaw rate sensors. In some embodiments, one or more projector control units 120 may include one or more projector control units 120 that are operably associated with one or more yaw rate sensors 161. In some embodiments, one or more projector control units 120 may control one or more image stabilized projectors 130 in response to one or more yaw rate sensors 161. For example, one or more image stabilized projectors 130 may project content in response to motion detected with one or more yaw rate sensors 161. Numerous types of yaw rate sensors 161 have been described and are commercially available (e.g., U.S. Pat. Nos. 6,516,666; 6,708,087; 6,550,331; Nippon Denso Corp., Japan).

At embodiment 408, module 210 may include one or more projector control units that are operably associated with one or more pressure sensors. In some embodiments, one or more projector control units 120 may include one or more projector control units 120 that are operably associated with one or more pressure sensors 158. In some embodiments, one or more projector control units 120 may control one or more image stabilized projectors 130 in response to one or more pressure sensors 158. In some embodiments, one or more image stabilized projectors 130 may project content in response to pressure exerted on a device 105 as determined with one or more pressure sensors 158. For example, a device 105 may be squeezed to advance a slide presentation. In some embodiments, a pressure sensor 158 may be a capacitive pressure sensor 158. In some embodiments, a pressure sensor 158 may be a multiplexed fiber optic sensor. In some embodiments, a pressure sensor 158 may be a micro-electro-mechanical system pressure sensor. Accordingly, a device 105 may include numerous types of pressure sensors 158. Numerous types of pressure sensors 158 have been described and are commercially available (e.g., U.S. Pat. Nos. 7,382,599; 4,320,664; 7,379,630; 7,373,833; National Semiconductor Corporation, Santa Clara, Calif.).

At embodiment 410, module 210 may include one or more projector control units that are operably associated with the one or more sensors that are configured to detect one or more persons. In some embodiments, one or more projector control units 120 may include one or more projector control units 120 that are operably associated with one or more sensors 150 that are configured to detect one or more persons. In some embodiments, one or more projector control units 120 may control one or more image stabilized projectors 130 in response to one or more sensors 150 that are configured to detect one or more persons. For example, one or more image stabilized projectors 130 may project content in response to detection of one or more persons. In some embodiments, one or more projector control units 120 may be operably associated with one or more cameras 163 that are configured to detect one or more persons. In some embodiments, one or more projector control units 120 may be operably associated with one or more sensors 150 that utilize biometric analysis to detect one or more persons. In some embodiments, one or more projector control units 120 may be operably associated with one or more sensors 150 that utilize voice recognition to detect one or more persons. Accordingly, one or more projector control units 120 may be operably associated with numerous types of sensors 150 that are configured to detect one or more persons.

At embodiment 412, module 210 may include one or more projector control units that are operably associated with the one or more sensors that are configured to detect one or more specific persons. In some embodiments, one or more projector control units 120 may include one or more projector control units 120 that are operably associated with one or more sensors 150 that are configured to detect one or more specific persons. In some embodiments, one or more projector control units 120 may control one or more image stabilized projectors 130 in response to one or more sensors 150 that are configured to detect one or more specific persons. For example, one or more image stabilized projectors 130 may project content in response to detection of one or more specific persons. In some embodiments, one or more projector control units 120 may be operably associated with one or more cameras 163 that are configured to detect one or more specific persons. In some embodiments, one or more projector control units 120 may be operably associated with one or more sensors 150 that utilize biometric analysis to detect one or more specific persons. In some embodiments, one or more projector control units 120 may be operably associated with one or more sensors 150 that utilize voice recognition to detect one or more specific persons. Accordingly, one or more projector control units 120 may be operably associated with numerous types of sensors 150 that are configured to detect one or more specific persons.

FIG. 5 illustrates alternative embodiments of embodiment 200 of device 105 within system 100 of FIG. 2. FIG. 5 illustrates example embodiments of module 210. Additional embodiments may include an embodiment 502, an embodiment 504, an embodiment 506, an embodiment 508, an embodiment 510, and/or an embodiment 512.

At embodiment 502, module 210 may include one or more projector control units that are operably associated with one or more cameras. In some embodiments, one or more projector control units 120 may include one or more projector control units 120 that are operably associated with one or more cameras 163. In some embodiments, one or more projector control units 120 may control one or more image stabilized projectors 130 in response to one or more cameras 163. For example, one or more image stabilized projectors 130 may project content in response to detection of one or more changes in the conformation of one or more projection surfaces 200 that are detected through use of one or more cameras 163.

In some embodiments, one or more projector control units 120 may focus one or more image stabilized projectors 130 in response to one or more cameras 163. In some embodiments, one or more projector control units 120 may align one or more images projected by one or more image stabilized projectors 130 in response to one or more cameras 163. In some embodiments, one or more projector control units 120 may control one or more image stabilized projectors 130 in response to detection of one or more calibration images that are detected with one or more cameras 163.

At embodiment 504, module 210 may include one or more projector control units that are operably associated with one or more cameras that are configured to detect one or more calibration images. In some embodiments, one or more projector control units 120 may include one or more projector control units 120 that are operably associated with one or more cameras 163 that are configured to detect one or more calibration images. In some embodiments, one or more projector control units 120 may control one or more image stabilized projectors 130 in response to one or more cameras 163 that are configured to detect one or more calibration images. In some embodiments, the one or more calibration images may be projected by one or more projectors. In some embodiments, the one or more calibration images may be projected by one or more image stabilized projectors 130. In some embodiments, the one or more calibration images may be associated with one or more projection surfaces 200. In some embodiments, one or more calibration images may be permanently associated with one or more projection surfaces 200. For example, in some embodiments, a projection surface 200 may include a calibration image that is printed onto the projection surface 200. In some embodiments, a projection surface 200 may include a calibration image that is printed onto the projection surface 200 with ink that transmits light in a non-visible range. Accordingly, in some embodiments, a camera 163 may be used to detect non-visible light that is emitted from a projection surface 200.

At embodiment 506, module 210 may include one or more projector control units that are operably associated with one or more cameras that are configured to detect content. In some embodiments, one or more projector control units 120 may include one or more projector control units 120 that are operably associated with one or more cameras 163 that are configured to detect content. In some embodiments, one or more projector control units 120 may include one or more projector control units 120 that are operably associated with one or more cameras 163 that are configured to detect content that is displayed on one or more projection surfaces 200.

At embodiment 508, module 210 may include one or more projector control units that are operably associated with one or more cameras that are configured to detect one or more projected calibration images. In some embodiments, one or more projector control units 120 may include one or more projector control units 120 that are operably associated with one or more cameras 163 that are configured to detect one or more projected calibration images. In some embodiments, one or more projector control units 120 may control one or more image stabilized projectors 130 in response to one or more cameras 163 that are configured to detect one or more projected calibration images. In some embodiments, the one or more calibration images may be projected by one or more projectors. In some embodiments, the one or more calibration images may be projected by one or more image stabilized projectors 130. In some embodiments, a visible calibration image may be projected by one or more projectors. In some embodiments, a visible calibration image may be projected by one or more image stabilized projectors 130. In some embodiments, a projected calibration image may be projected with light that is in the non-visible range such that the calibration image is not visible to the human eye. For example, in some embodiments, one or more calibration images may be projected with infrared light. In some embodiments, one or more calibration images may be projected with ultraviolet light.

At embodiment 510, module 210 may include one or more projector control units that are operably associated with one or more cameras that are configured to detect projected content. In some embodiments, one or more projector control units 120 may include one or more projector control units 120 that are operably associated with one or more cameras 163 that are configured to detect projected content. In some embodiments, one or more projector control units 120 may include one or more projector control units 120 that are operably associated with one or more cameras 163 that are configured to detect content that is projected onto one or more projection surfaces 200.

At embodiment 512, module 210 may include one or more projector control units that are operably associated with one or more user interfaces. In some embodiments, one or more projector control units 120 may include one or more projector control units 120 that are operably associated with one or more user interfaces 300. In some embodiments, one or more projector control units 120 may control one or more image stabilized projectors 130 in response to user input received through one or more user interfaces 300. In some embodiments, a user 600 may interface with one or more projector control units 120 through imparting motion to a device 105. For example, in some embodiments, one or more projector control units 120 may respond to a user 600 shaking a device 105. In some embodiments, one or more projector control units 120 may respond to a user 600 rotating a device 105 in a clockwise direction. In some embodiments, one or more projector control units 120 may respond to a user 600 rotating a device 105 in a counter clockwise direction. In some embodiments, one or more projector control units 120 may respond to a user 600 squeezing a device 105. In some embodiments, one or more projector control units 120 may respond to a user interface 300 that includes a trackball. In some embodiments, one or more projector control units 120 may respond to a user interface 300 that includes a touchscreen. In some embodiments, one or more projector control units 120 may respond to a user interface 300 that includes a keyboard. In some embodiments, one or more projector control units 120 may respond to a user interface 300 that includes one or more buttons. Accordingly, numerous types of user interfaces 300 may be used.

FIG. 6 illustrates alternative embodiments of embodiment 200 of device 105 within system 100 of FIG. 2. FIG. 6 illustrates example embodiments of module 210. Additional embodiments may include an embodiment 602, an embodiment 604, an embodiment 606, an embodiment 608, and/or an embodiment 610.

At embodiment 602, module 210 may include one or more projector control units that are operably associated with one or more motion response modules. In some embodiments, one or more projector control units 120 may include one or more projector control units 120 that are operably associated with one or more motion response modules 190. In some embodiments, a motion response module 190 may include one or more processors, memory, instructions, motion patterns, actuators 197, motors 198, and the like. In some embodiments, one or more projector control units 120 may be operably associated with one or more motion response modules 190 that include circuitry for correlating one or more motions with one or more projector commands. For example, in some embodiments, one or more projector control units 120 may be operably associated with one or more motion response modules 190 that include one or more lookup tables. Accordingly, in some embodiments, a motion response module 190 may be configured to use one or more lookup tables to correlate one or more motions with one or more projector commands. In some embodiments, one or more projector control units 120 that are operably associated with one or more motion response modules 190 may be configured to focus one or more image stabilized projectors 130 in response to motion. In some embodiments, one or more projector control units 120 that are operably associated with one or more motion response modules 190 may be configured to select content that is projected by one or more image stabilized projectors 130 in response to motion. In some embodiments, one or more projector control units 120 that are operably associated with one or more motion response modules 190 may be configured to select content that is not projected by one or more image stabilized projectors 130 in response to motion.

At embodiment 604, module 210 may include one or more projector control units that are configured to respond to the one or more substantially defined motions. In some embodiments, one or more projector control units 120 may include one or more projector control units 120 that are configured to respond to one or more substantially defined motions. In some embodiments, one or more projector control units 120 may be configured to respond to one or more substantially defined motions that are preprogrammed. For example, in some embodiments, one or more projector control units 120 may be configured to respond to clockwise rotation of a device 105. In some embodiments, one or more projector control units 120 may be configured to respond to one or more substantially defined motions that are not preprogrammed. In some embodiments, one or more projector control units 120 may be configured by one or more users 600 to respond to user defined motions. For example, in some embodiments, a user may configure one or more projector control units 120 to focus one or more image stabilized projectors 130 in response to shaking a device 105. In some embodiments, one or more projector control units 120 may be configured to respond to numerous types of substantially defined motions and combinations of substantially defined motions. Examples of such substantially defined motions include, but are not limited to, shaking with a substantially defined frequency (e.g., with a range of measurable frequencies), rotation of a device 105 at a substantially defined rate (e.g., rotation about an axis at a rate that is within a range of measurable rates), striking a device 105 with a substantially defined force (e.g., a force within a range of measurable forces), and the like. Accordingly, in some embodiments, one or more projector control units 120 may respond to numerous types of substantially defined motions.

At embodiment 606, module 210 may include one or more projector control units that are configurable to respond to one or more rotary motions. In some embodiments, one or more projector control units 120 may include one or more projector control units 120 that are configurable to respond to one or more rotary motions. In some embodiments, one or more projector control units 120 may be configurable to respond to numerous types of rotary motions and combinations of rotary motions. Examples of such rotary motions include, but are not limited to, rotation about a substantially horizontal axis (e.g., rotation about an axis that is within +/− ten degrees from the horizontal), rotation about a substantially vertical axis (e.g., rotation about an axis that is within +/− ten degrees from the vertical), rotation about an axis having a substantially defined angle from the horizontal (e.g., an axis that is within about thirty-five to about fifty-five degrees from the horizontal), circular rotation (e.g., rotating a device 105 in a way analogous to rotating a laser pointer to draw a circle on a screen), and the like.

At embodiment 608, module 210 may include one or more projector control units that are configurable to respond to one or more substantially linear motions. In some embodiments, one or more projector control units 120 may include one or more projector control units 120 that are configurable to respond to one or more substantially linear motions. In some embodiments, one or more projector control units 120 may be configurable to respond to numerous types of substantially linear motions and combinations of linear motions. Examples of such substantially linear motions include, but are not limited to, motion of a device 105 in a substantially side-to-side motion, motion of a device 105 in a substantially up and down motion, motion of a device 105 in a substantially diagonal motion relative to a vertical axis, motion of a device 105 in a substantially diagonal motion relative to a horizontal axis and the like. For example, in some embodiments, a projector control unit 120 may be configured to respond to a left then right motion in a substantially horizontal position that is imparted to a device 105. In some embodiments, one or more projector control units 120 may be operably associated with one or more gyroscopic sensors 152 to facilitate detection of motion. In some embodiments, one or more projector control units 120 may be operably associated with one or more inertial sensors 155 to facilitate detection of motion. In some embodiments, one or more projector control units 120 may be configured to respond to one or more substantially linear motions. Accordingly, one or more projector control units 120 may be configurable to respond to numerous types of substantially linear motions.

At embodiment 610, module 210 may include one or more projector control units that are configurable to respond to acceleration. In some embodiments, one or more projector control units 120 may include one or more projector control units 120 that are configurable to respond to acceleration. In some embodiments, one or more projector control units 120 may be operably associated with one or more accelerometers. In some embodiments, one or more projector control units 120 may be configurable to respond to shock. In some embodiments, one or more projector control units 120 may respond to a device 105 being struck. For example, in some embodiments, one or more projector control units 120 may be configured to advance a projected slide show by one frame in response to a device 105 being tapped on a surface. In some embodiments, one or more projector control units 120 may be preconfigured to respond to acceleration. In some embodiments, one or more projector control units 120 may be configured by one or more users 600 to respond to acceleration.

Figure 7:
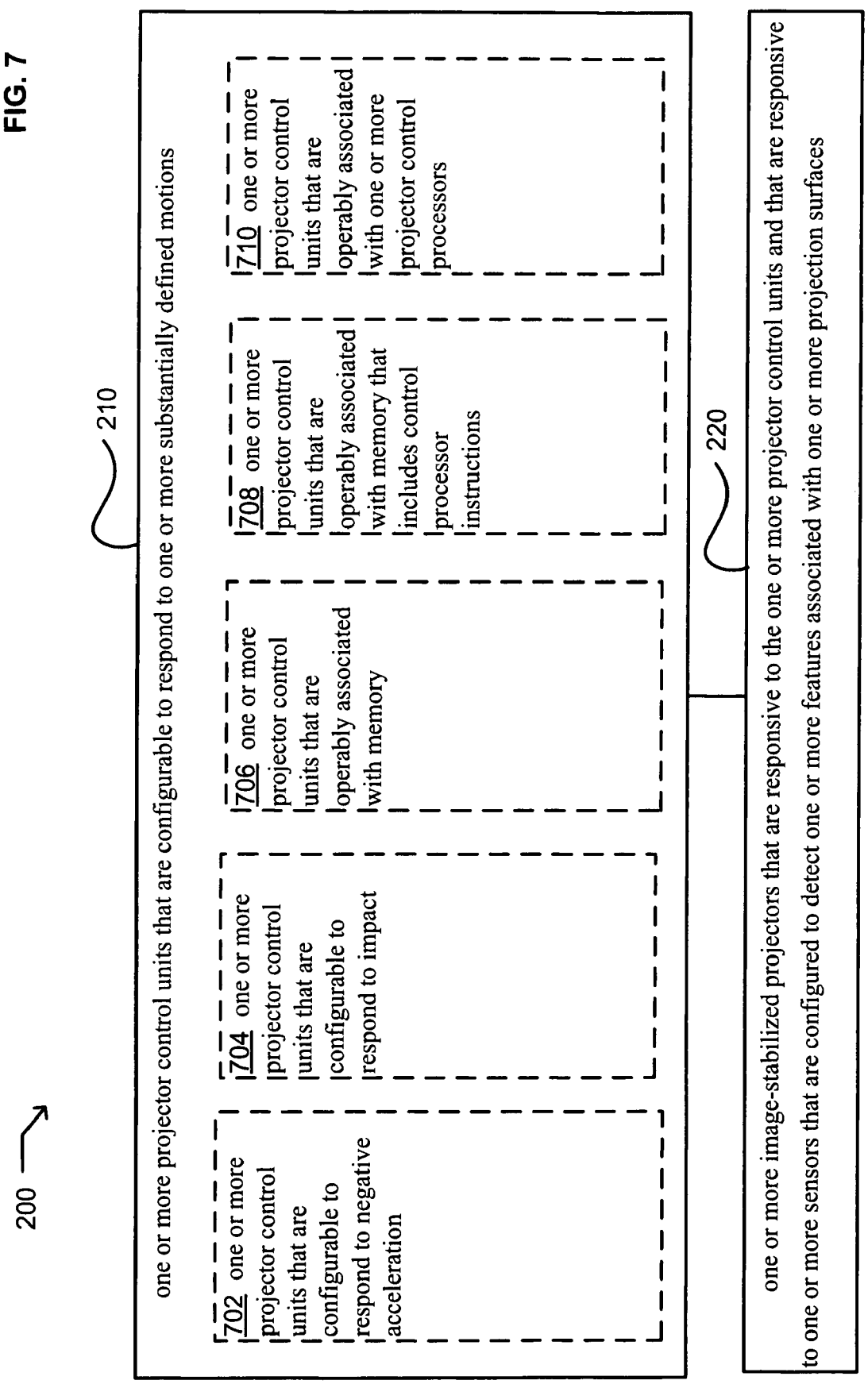
FIG. 7 illustrates alternate embodiments of the device of FIG. 2.

FIG. 7 illustrates alternative embodiments of embodiment 200 of device 105 within system 100 of FIG. 2. FIG. 7 illustrates example embodiments of module 210. Additional embodiments may include an embodiment 702, an embodiment 704, an embodiment 706, an embodiment 708, and/or an embodiment 710.

At embodiment 702, module 210 may include one or more projector control units that are configurable to respond to negative acceleration. In some embodiments, one or more projector control units 120 may include one or more projector control units 120 that are configurable to respond to negative acceleration. In some embodiments, one or more projector control units 120 may be operably associated with one or more accelerometers. In some embodiments, one or more projector control units 120 may be preconfigured to respond to negative acceleration. In some embodiments, one or more projector control units 120 may be configured by one or more users 600 to respond to negative acceleration.

At embodiment 704, module 210 may include one or more projector control units that are configurable to respond to impact. In some embodiments, one or more projector control units 120 may include one or more projector control units 120 that are configurable to respond to impact. In some embodiments, one or more projector control units 120 may be operably associated with one or more accelerometers. In some embodiments, one or more projector control units 120 may be preconfigured to respond to impact. In some embodiments, one or more projector control units 120 may be configured by one or more users 600 to respond to impact.

At embodiment 706, module 210 may include one or more projector control units that are operably associated with memory. In some embodiments, one or more projector control units 120 may include one or more projector control units 120 that are operably associated with memory. One or more projector control units 120 may be operably associated with numerous types of memory that act alone or in combination with other types of memory. Examples of types of memory include, but are not limited to, flash memory, random access memory, read-only memory, hard drives, optical storage, and the like. In some embodiments, memory may include one or more stored calibration images (e.g., coordinates corresponding to one or more calibration images). In some embodiments, memory may be associated with one or more processors and include program instructions for the one or more processors. For example, in some embodiments, memory may include one or more look up tables that correlate one or more motions with one or more projector commands (e.g., commands to advance a slide, commands to focus, commands to shut off a projector, commands to turn on a projector, etc.). In some embodiments, memory may include one or more instructions for controlling one or more image stabilized projectors 130 in response to detection of one or more calibration images (e.g., focusing one or more image stabilized projectors 130, aligning one or more images projected by one or more image stabilized projectors 130, etc.).

At embodiment 708, module 210 may include one or more projector control units that are operably associated with memory that includes control processor instructions. In some embodiments, one or more projector control units 120 may include one or more projector control units 120 that are operably associated with memory that includes control processor instructions 123. In some embodiments, program instructions may include instructions to direct one or more image stabilized projectors 130 to project preselected content. In some embodiments, control processor instructions 123 may include instructions to direct one or more image stabilized projectors 130 to selected content that is to be projected. In some embodiments, control processor instructions 123 may include instructions to direct one or more image stabilized projectors 130 to project selected content that is to be projected in response to one or more substantially defined motions imparted to a device 105. In some embodiments, control processor instructions 123 may include instructions to direct one or more image stabilized projectors 130 to select content for projection in response to use of a device 105 by a specific person. For example, in some embodiments, program instructions may cause one or more image stabilized projectors 130 to project children's content if a device 105 containing the image stabilized projector 130 is used by a child. In some embodiments, control processor instructions 123 may include instructions to access a database in response to one or more substantially defined motions imparted to a device 105. In some embodiments, control processor instructions 123 may include instructions to access a look up table in response to one or more substantially defined motions imparted to a device 105. Accordingly, in some embodiments, control processor instructions 123 may include instructions to correlate one or more substantially defined motions with one or more projector commands that control operation of one or more image stabilized projectors 130.

At embodiment 710, module 210 may include one or more projector control units that are operably associated with one or more projector control processors. In some embodiments, one or more projector control units 120 may include one or more projector control units 120 that are operably associated with one or more projector control processors. In some embodiments, one or more projector control processors may be configured to execute program instructions that are associated with the projector control unit 120. For example, in some embodiments, one or more projector control processors may be configured to receive input associated with one or more sensors 150 and correlate that input with one or more projector commands to control projection by one or more image stabilized projectors 130. In some embodiments, one or more projector control processors may be configured to receive input associated with one or more sensor control units 170 and correlate that input with one or more projector commands to control projection by one or more image stabilized projectors 130. In some embodiments, one or more projector control processors may be configured to receive input associated with one or more calibration images and correlate that input with one or more projector commands to control projection by one or more image stabilized projectors 130. For example, in some embodiments, one or more projector control processors may be configured to receive input associated with one or more calibration images and compare that input with one or more reference calibration images that are kept in memory. Accordingly, in some embodiments, one or more projector control processors may be configured to control projection by one or more image stabilized projectors 130 in response to input associated with one or more calibration images.

FIG. 8 illustrates alternative embodiments of embodiment 200 of device 105 within system 100 of FIG. 2. FIG. 8 illustrates example embodiments of module 210. Additional embodiments may include an embodiment 802, an embodiment 804, an embodiment 806, an embodiment 808, and/or an embodiment 810.

At embodiment 802, module 210 may include one or more projector control units that are operably associated with one or more interface modules. In some embodiments, one or more projector control units 120 may include one or more projector control units 120 that are operably associated with one or more interface modules 180. An interface module 180 may communicate with other components of system 100 through use of numerous communication formats and combinations of communications formats. Examples of such formats include, but are not limited to, VGA 181, USB 185, wireless USB 189, RS-232 182, infrared 186, Bluetooth 18A, 802.11b/g/n 183, S-video 187, Ethernet 184, DVI-D 188, and the like. Accordingly, in some embodiments, a device 105 may receive one or more operating instructions from one or more external devices 400. In some embodiments, a device 105 may be configured to be able to participate within a communications system. For example, in some embodiments, a device 105 may receive one or more signals that include instructions for operating one or more image stabilized projectors 130. In some embodiments, one or more devices 105 may receive one or more signals that include content that is to be projected by one or more image stabilized projectors 130. For example, in some embodiments, a device 105 may receive television broadcast signals that allow a device 105 to project television programming. In some embodiments, one or more interface modules 180 may cooperate to couple two or more devices 105 together. Accordingly, in some embodiments, two or more devices 105 may cooperatively act to synchronously project content. In some embodiments, one or more interface modules 180 may facilitate communication between one or more devices 105 with one or more printers. Accordingly, in some embodiments, content may be printed from one or more devices 105. In some embodiments, one or more interface modules 180 may facilitate communication between one or more devices 105 with external memory 500. In some embodiments, one or more interface modules 180 may facilitate communication between one or more devices 105 with one or more user interfaces 300. In some embodiments, one or more interface modules 180 may be configured to facilitate delivery of software updates to device 105. In some embodiments, one or more interface modules 180 may be configured as a docking station into which a device 105 may be placed. Accordingly, in some embodiments, a device 105 may receive content through use of an interface module 180. For example, in some embodiments, content (e.g., movies, slide presentations, etc.) may be transferred to a device 105 through use of an interface module 180.

At embodiment 804, module 210 may include one or more projector control units that are operably associated with one or more interface modules that are configured for operable association with one or more external devices. In some embodiments, one or more projector control units 120 may include one or more projector control units 120 that are operably associated with one or more interface modules 180 that are configured for operable association with one or more external devices 400. Accordingly, in some embodiments, a device 105 may receive operating instructions from one or more external devices 400 that may instruct operation of one or more image stabilized projectors 130. In some embodiments, one or more external memories may be coupled to one or more devices 105 through use of an interface module 180 to transfer content into memory that is associated with the one or more devices 105. For example, in some embodiments, movies may be transferred to a device 105 from one or more external memories through use of an interface module 180. In some embodiments, one or more interface modules 180 may be used to couple one or more devices 105 into a communications network such that one or more projector control units 120 associated with the one or more devices 105 may be cooperatively controlled within a communications system. Accordingly, interaction of a device 105 with numerous types of external devices 400 may be facilitated through use of one or more interface modules 180.

At embodiment 806, module 210 may include one or more projector control units that are operably associated with one or more interface modules that are configured for operable association with external memory. In some embodiments, one or more projector control units 120 may include one or more projector control units 120 that are operably associated with one or more interface modules 180 that are configured for operable association with external memory 500. In some embodiments, one or more external memories 500 may be coupled to one or more devices 105 through use of an interface module 180 to transfer content into memory that is associated with the one or more devices 105. For example, in some embodiments, movies may be transferred to a device 105 from one or more external memories 500 through use of an interface module 180.

At embodiment 808, module 210 may include one or more projector control units that are operably associated with one or more user interfaces. In some embodiments, one or more projector control units 120 may include one or more projector control units 120 that are operably associated with one or more user interfaces 300. One or more projector control units 120 may be operably associated with numerous types of user interfaces 300 and combinations of user interfaces 300. Examples of such user interfaces 300 include, but are not limited to, track balls, keyboards, buttons, touch screens, and the like. In some embodiments, a user interface 300 may be a computer (e.g., a desktop computer, a laptop computer, etc.). Accordingly, in some embodiments, a device 105 may include one or more interface modules 180 that facilitate communication between the device 105 and a computer.

At embodiment 810, module 210 may include one or more projector control units that are operably associated with the one or more sensors that are configured to detect one or more conformations of the one or more projection surfaces. In some embodiments, one or more projector control units 120 may include one or more projector control units 120 that are operably associated with one or more projector control units 120 that are operably associated with one or more sensors 150 that are configured to detect one or more conformations of one or more projection surfaces 200. In some embodiments, one or more sensors 150 may be configured to detect one or more fiducials associated with the one or more projection surfaces 200. In some embodiments, one or more sensors 150 may be configured to detect one or more calibration images associated with the one or more projection surfaces 200. Accordingly, sensors 150 may be configured in numerous ways to detect one or more conformations of one or more projection surfaces 200.

FIG. 9 illustrates alternative embodiments of embodiment 200 of device 105 within system 100 of FIG. 2. FIG. 9 illustrates example embodiments of module 210. Additional embodiments may include an embodiment 902, an embodiment 904, and/or an embodiment 906.

At embodiment 902, module 210 may include one or more projector control units that are operably associated with one or more sensors that are configured to detect one or more changes in one or more conformations of one or more projection surfaces. In some embodiments, one or more projector control units 120 may include one or more projector control units 120 that are operably associated with one or more projector control units 120 that are operably associated with one or more sensors 150 that are configured to detect one or more changes in one or more conformations of one or more projection surfaces 200. In some embodiments, one or more sensors 150 may be configured to detect one or more changes in position of one or more fiducials associated with the one or more projection surfaces 200. In some embodiments, one or more sensors 150 may be configured to detect one or more changes in position of one or more calibration images associated with the one or more projection surfaces 200. Accordingly, sensors 150 may be configured in numerous ways to detect one or more changes in conformations of one or more projection surfaces 200.

At embodiment 904, module 210 may include one or more projector control units that are operably associated with one or more control unit receivers. In some embodiments, one or more projector control units 120 may include one or more projector control units 120 that are operably associated with one or more control unit receivers 128. In some embodiments, one or more control unit receivers 128 may be configured to receive one or more signals that include information associated with the conformation of one or more projection surfaces 200. In some embodiments, one or more control unit receivers 128 may be configured to receive one or more signals that include information associated with one or more changes in the conformation of one or more projection surfaces 200. In some embodiments, one or more control unit receivers 128 may be configured to receive one or more signals that include information associated with the position of one or more projection surfaces 200. In some embodiments, one or more control unit receivers 128 may be configured to receive one or more signals that include information associated with one or more changes in the position of one or more projection surfaces 200. In some embodiments, one or more control unit receivers 128 may be configured to receive one or more signals that include information associated with motion associated with one or more projection surfaces 200. In some embodiments, one or more control unit receivers 128 may be configured to receive one or more signals that include information associated with one or more changes in the motion associated with one or more projection surfaces 200. In some embodiments, one or more control unit receivers 128 may be configured to receive one or more signals that include information associated with one or more calibration images associated with one or more projection surfaces 200. In some embodiments, one or more control unit receivers 128 may be configured to receive one or more signals that are transmitted by one or more surface transmitters 204 associated with one or more projection surfaces 200.

At embodiment 906, module 210 may include one or more projector control units that are operably associated with one or more control unit transmitters. In some embodiments, one or more projector control units 120 may include one or more projector control units 120 that are operably associated with one or more control unit transmitters 129. In some embodiments, one or more control unit transmitters 129 may be configured to transmit one or more signals that are configured to be received by one or more surface receivers 206. In some embodiments, one or more one or more control unit transmitters 129 may transmit one or more signals that instruct one or more surface processors 208 to transmit one or more signals that include information associated with one or more surface sensors 202. Examples of such information include, but are not limited to, information associated with: one or more positions of one or more projection surface sensors 202, one or more changes in one or more positions of one or more projection surface sensors 202, one or more conformations of one or more projection surface sensors 202, one or more changes in the conformation of one or more projection surface sensors 202, and the like.

Figure 10:
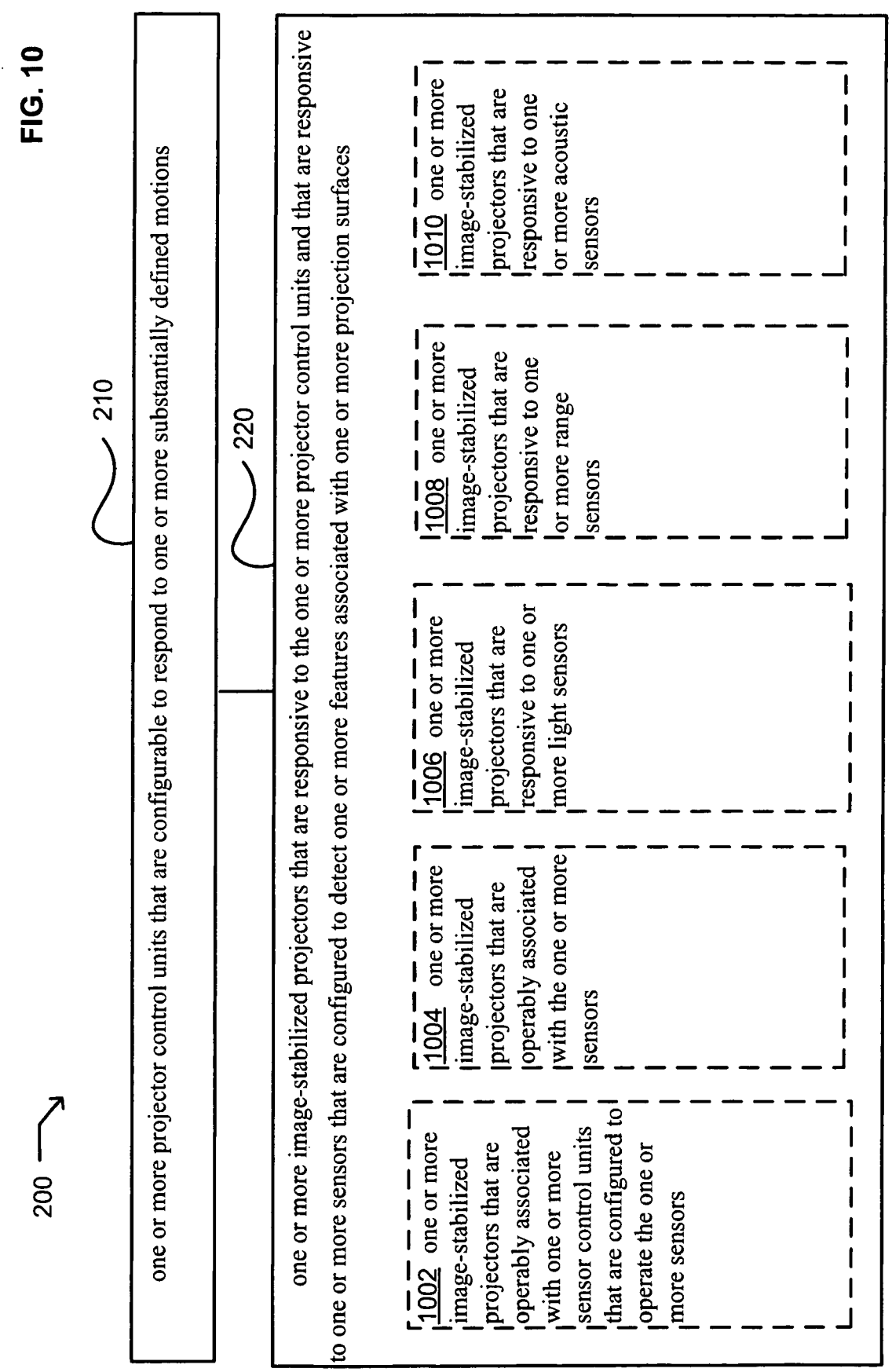
FIG. 10 illustrates alternate embodiments of the device of FIG. 2.

FIG. 10 illustrates alternative embodiments of embodiment 200 of device 105 within system 100 of FIG. 2. FIG. 10 illustrates example embodiments of module 220. Additional embodiments may include an embodiment 1002, an embodiment 1004, an embodiment 1006, an embodiment 1008, and/or an embodiment 1010.

At embodiment 1002, module 220 may include one or more image-stabilized projectors that are operably associated with one or more sensor control units that are configured to operate the one or more sensors. In some embodiments, one or more image-stabilized projectors 130 may include one or more image-stabilized projectors that are operably associated with one or more sensor control units 170 that are configured to operate one or more sensors 150. In some embodiments, a sensor control unit 170 may include one or more sensor processors 171, processor memory, sensor memory 176, processor instructions, sensor instructions 177, motion patterns, calibration images, and substantially any combination thereof. In some embodiments, one or more sensor control units 170 may be configured to control one or more sensors 150. A sensor control unit 170 may be configured to control numerous types of sensors 150 alone or in combination. Examples of sensors 150 include, but are not limited to, cameras 163, light sensors 164, range sensors 165, contact sensors 166, entity sensors 159, infrared sensors 160, yaw rate sensors 161, ultraviolet sensors 162, inertial sensors 155, ultrasonic sensors 156, imaging sensors 157, pressure sensors 158, motion sensors 151, gyroscopic sensors 152, acoustic sensors 153, biometric sensors 154, and the like. In some embodiments, one or more sensor control units 170 may include one or more sensor processors 171. In some embodiments, one or more sensor processors 171 may be configured to receive information from one or more sensors 150 and configure the information for use by one or more image stabilized projectors 130. In some embodiments, one or more sensor processors 171 may be configured to receive information from one or more sensors 150 and configure the information for use by one or more projector control units 120. In some embodiments, one or more sensor control units 170 may be configured to operate one or more sensors 150. In some embodiments, one or more sensor control units 170 may be configured to control the sensitivity of one or more sensors 150. For example, in some embodiments, a sensor control unit 170 may be configured to adjust the sensitivity of one or more light sensors 164 in response to the amount of ambient light detected.

At embodiment 1004, module 220 may include one or more image-stabilized projectors that are operably associated with the one or more sensors. In some embodiments, one or more image-stabilized projectors 130 may include one or more image-stabilized projectors 130 that are operably associated with one or more sensors 150. In some embodiments, one or more image stabilized projectors 130 may be directly linked to one or more sensors 150. For example, in some embodiments, one or more image stabilized projectors 130 may be directly linked to one or more light meters. Accordingly, in some embodiments, one or more image stabilized projectors 130 may include instructions for interpreting information received from one or more sensors 150. In some embodiments, one or more image stabilized projectors 130 may be indirectly linked to one or more sensors 150. For example, in some embodiments, one or more image stabilized projectors 130 may be indirectly linked to one or more biometric sensors 154 through one or more sensor control units 170. Accordingly, in some embodiments, one or more image stabilized projectors 130 may include instructions for interpreting information received from one or more sensor control units 170.

At embodiment 1006, module 220 may include one or more image-stabilized projectors that are responsive to one or more light sensors. In some embodiments, one or more image-stabilized projectors 130 may include one or more image-stabilized projectors 130 that are operably associated with one or more light sensors 164. In some embodiments, one or more image stabilized projectors 130 may be directly linked to one or more light sensors 164. In some embodiments, one or more image stabilized projectors 130 may be indirectly linked to one or more light sensors 164. In some embodiments, one or more image stabilized projectors 130 may be linked to one or more light sensors 164 that detect light intensity. In some embodiments, one or more image stabilized projectors 130 may be linked to one or more light sensors 164 that detect selected wavelengths of light. For example, in some embodiments, one or more light sensors 164 may be configured to detect infrared light. In some embodiments, one or more light sensors 164 may be configured to detect ultraviolet light. Accordingly, in some embodiments, one or more calibration images may be invisible to the human eye but detectable with one or more light sensors 164.

At embodiment 1008, module 220 may include one or more image-stabilized projectors that are responsive to one or more range sensors. In some embodiments, one or more image-stabilized projectors 130 may include one or more image-stabilized projectors 130 that are operably associated with one or more range sensors 165. In some embodiments, one or more image stabilized projectors 130 may be directly linked to one or more range sensors 165. In some embodiments, one or more image stabilized projectors 130 may be indirectly linked to one or more range sensors 165. One or more image-stabilized projectors 130 may be operably associated with numerous types of range sensors 165. Examples of such range sensors 165 include, but are not limited to, laser range finders, acoustic range finders, radar, infrared range finders, and the like. In some embodiments, one or more image stabilized projectors 130 may be responsive to the distance that a projection surface 200 is from the one or more image stabilized projectors 130.

At embodiment 1010, module 220 may include one or more image-stabilized projectors that are responsive to one or more acoustic sensors. In some embodiments, one or more image-stabilized projectors 130 may include one or more image-stabilized projectors 130 that are operably associated with one or more acoustic sensors 153. In some embodiments, one or more image stabilized projectors 130 may be directly linked to one or more acoustic sensors 153. In some embodiments, one or more image stabilized projectors 130 may be indirectly linked to one or more acoustic sensors 153. In some embodiments, one or more image stabilized projectors 130 may be configured to respond to one or more acoustic signals. In some embodiments, one or more image stabilized projectors 130 may be configured to respond to voice commands.

Figure 11:
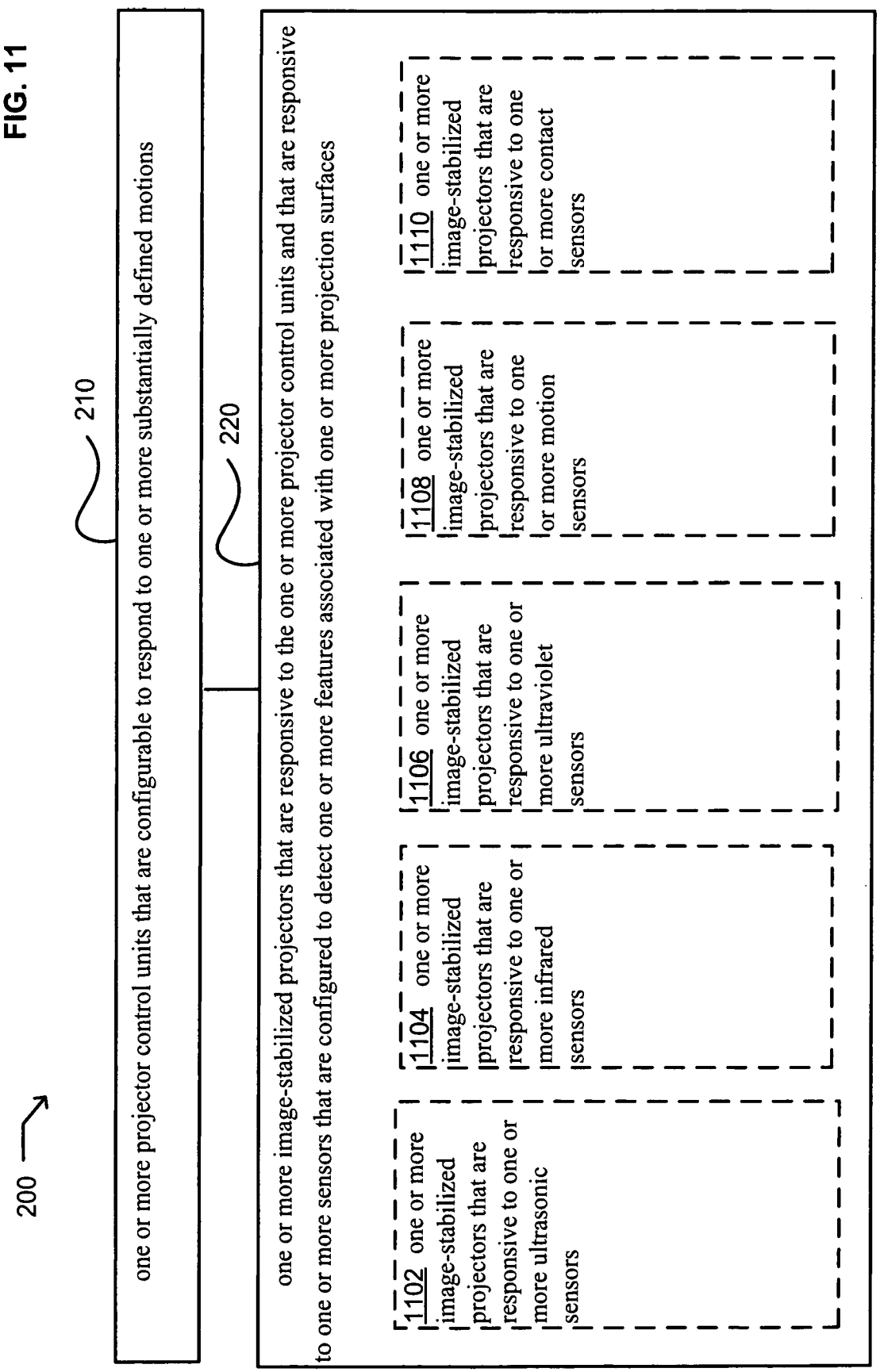
FIG. 11 illustrates alternate embodiments of the device of FIG. 2.

FIG. 11 illustrates alternative embodiments of embodiment 200 of device 105 within system 100 of FIG. 2. FIG. 11 illustrates example embodiments of module 220. Additional embodiments may include an embodiment 1102, an embodiment 1104, an embodiment 1106, an embodiment 1108, and/or an embodiment 1110.

At embodiment 1102, module 220 may include one or more image-stabilized projectors that are responsive to one or more ultrasonic sensors. In some embodiments, one or more image-stabilized projectors 130 may include one or more image-stabilized projectors 130 that are operably associated with one or more ultrasonic sensors 156. In some embodiments, one or more image stabilized projectors 130 may be directly linked to one or more ultrasonic sensors 156. In some embodiments, one or more image stabilized projectors 130 may be indirectly linked to one or more ultrasonicسنors 156. In some embodiments, one or more ultrasonic sensors 156 may be configured to determine one or more distances to one or more projection surfaces 200. For example, in some embodiments, one or more ultrasonic sensors 156 may be configured to determine one or more distances from one or more projection surfaces 200 to one or more projection surfaces 200. Accordingly, in some embodiments, one or more image stabilized projectors 130 may focus projected content in response to one or more ultrasonic sensors 156. Ultrasonic sensors 156 have been described (e.g., U.S. Pat. Nos. 6,549, 487; 6,909,670; 4,779,240).

At embodiment 1104, module 220 may include one or more image-stabilized projectors that are responsive to one or more infrared sensors. In some embodiments, one or more image-stabilized projectors 130 may include one or more image-stabilized projectors 130 that are operably associated with one or more infrared sensors 160. In some embodiments, one or more image stabilized projectors 130 may be directly linked to one or more infrared sensors 160. In some embodiments, one or more image stabilized projectors 130 may be indirectly linked to one or more infrared sensors 160. In some embodiments, one or more infrared sensors 160 may be configured to detect one or more calibration images. Accordingly, in some embodiments, one or more image stabilized projectors 130 may project in response to one or more infrared sensors 160. Infrared sensors 160 have been described (e.g., U.S. Pat. Nos. 7,361,899; 7,332,717; 7,282,712; 7,259, 658).

At embodiment 1106, module 220 may include one or more image-stabilized projectors that are responsive to one or more ultraviolet sensors. In some embodiments, one or more image-stabilized projectors 130 may include one or more image-stabilized projectors 130 that are operably associated with one or more ultraviolet sensors 162. In some embodiments, one or more image stabilized projectors 130 may be directly linked to one or more ultraviolet sensors 162. In some embodiments, one or more image stabilized projectors 130 may be indirectly linked to one or more ultraviolet sensors 162. In some embodiments, one or more ultraviolet sensors 162 may be configured to detect one or more wavelengths of ultraviolet light. In some embodiments, one or more ultraviolet sensors 162 may be configured to detect one or more wavelengths of ultraviolet light that are being projected by one or more image stabilized projectors 130. Ultraviolet sensors 162 have been described (e.g., U.S. Pat. Nos. 7,193,241; 6,551,493).

At embodiment 1108, module 220 may include one or more image-stabilized projectors that are responsive to one or more motion sensors. In some embodiments, one or more image-stabilized projectors 130 may include one or more image-stabilized projectors 130 that are operably associated with one or more motion sensors 151. In some embodiments, one or more image stabilized projectors 130 may be directly linked to one or more motion sensors 151. In some embodiments, one or more image stabilized projectors 130 may be indirectly linked to one or more motion sensors 151. In some embodiments, one or more image stabilized projectors 130 may project in response to motion imparted to a device 105 and detected with one or more motion sensors 151. For example, in some embodiments, a device 105 may be rotated in a clockwise direction to select content that is to be projected. Accordingly, numerous motions may be correlated with numerous projector commands that can be used to control projection from one or more image stabilized projectors 130. In some embodiments, one or more motion sensors 151 may be configured to detect motion that is independent of one or more devices 105. For example, in some embodiments, one or more motion sensors 151 may be configured to detect motion of one or more objects that may block content that is projected by one or more image stabilized projectors 130 from reaching one or more projection surfaces 200. Accordingly, in some embodiments, one or more image stabilized projectors 130 may be configured to alter the direction of projected content in response to one or more motion sensors 151.

At embodiment 1110, module 220 may include one or more image-stabilized projectors that are responsive to one or more contact sensors. In some embodiments, one or more image-stabilized projectors 130 may include one or more image-stabilized projectors 130 that are operably associated with one or more contact sensors 166. In some embodiments, one or more image stabilized projectors 130 may be directly linked to one or more motion sensors 151. In some embodiments, one or more image stabilized projectors 130 may be indirectly linked to one or more motion sensors 151. Contact sensors 166 may be configured in numerous ways. For example, in some embodiments, a contact sensor 166 may be configured as a pressure sensor 158. Accordingly, in some embodiments, a device 105 may be squeezed to facilitate control of one or more image stabilized projectors 130. In some embodiments, one or more contact sensors 166 may be configured to detect placement of a device 105 on a surface (e.g., a desk, a shelf, etc.).

Figure 12:
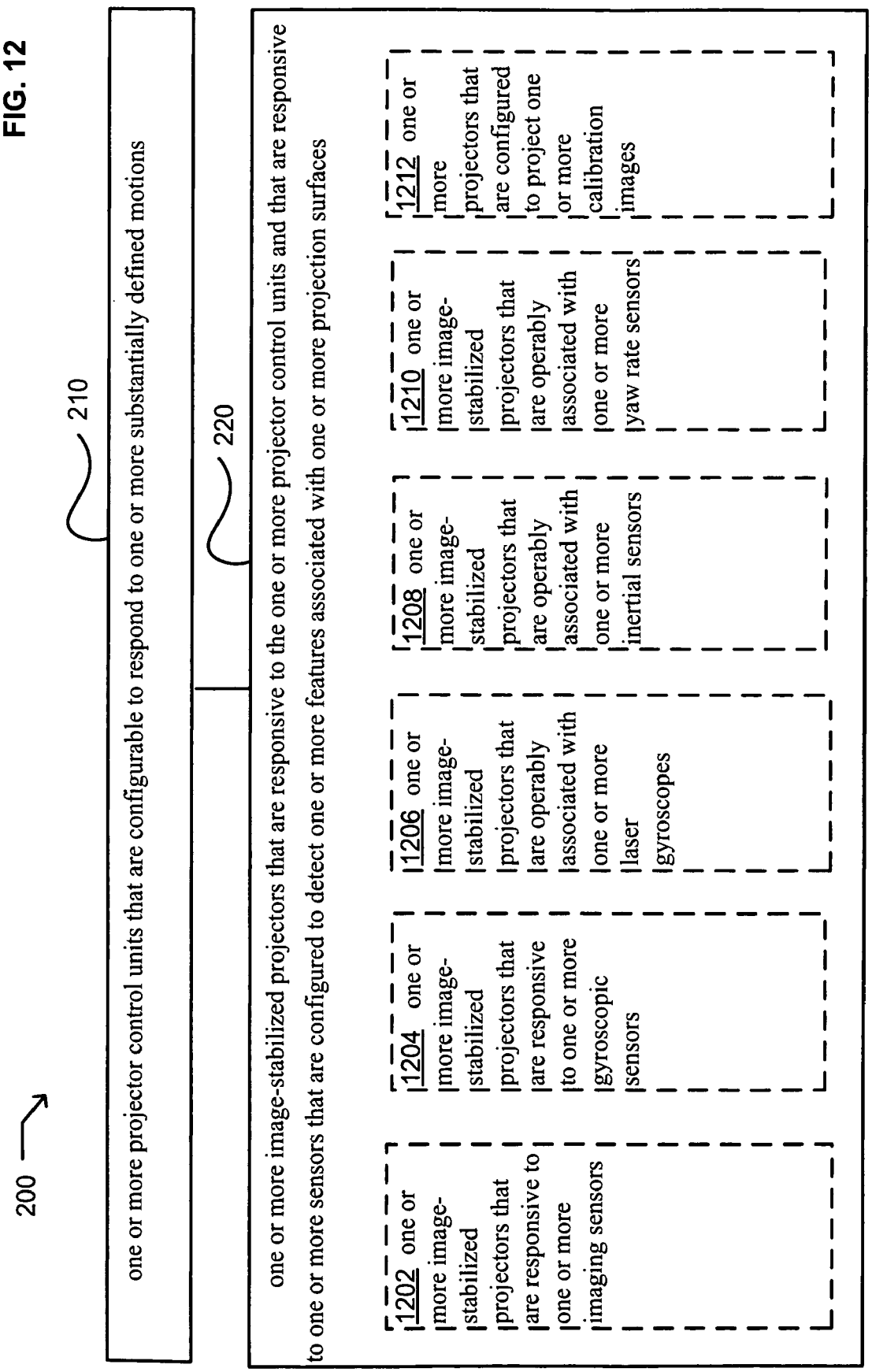
FIG. 12 illustrates alternate embodiments of the device of FIG. 2.

FIG. 12 illustrates alternative embodiments of embodiment 200 of device 105 within system 100 of FIG. 2. FIG. 12 illustrates example embodiments of module 220. Additional embodiments may include an embodiment 1202, an embodiment 1204, an embodiment 1206, an embodiment 1208, an embodiment 1210, and/or an embodiment 1212.

At embodiment 1202, module 220 may include one or more image-stabilized projectors that are responsive to one or more imaging sensors. In some embodiments, one or more image-stabilized projectors 130 may include one or more image-stabilized projectors 130 that are operably associated with one or more imaging sensors 157. In some embodiments, one or more image stabilized projectors 130 may be directly linked to one or more imaging sensors 157. In some embodiments, one or more image stabilized projectors 130 may be indirectly linked to one or more imaging sensors 157. Imaging sensors 157 may be configured in numerous ways. In some embodiments, one or more imaging sensors 157 may be configured to obtain conformation information associated with one or more projection surfaces 200. For example, in some embodiments, an imaging sensor 157 may be configured to detect one or more fiducials associated with one or more projection surfaces 200. In some embodiments, one or more imaging sensors 157 may be configured to obtain information associated with one or more calibration images. Accordingly, in some embodiments, one or more imaging sensors 157 may be used to facilitate alignment of two or more projections from two or more image stabilized projectors 130.

At embodiment 1204, module 220 may include one or more image-stabilized projectors that are responsive to one or more gyroscopic sensors. In some embodiments, one or more image-stabilized projectors 130 may include one or more image-stabilized projectors 130 that are operably associated with one or more gyroscopic sensors 152. In some embodiments, one or more image stabilized projectors 130 may be directly linked to one or more gyroscopic sensors 152. In some embodiments, one or more image stabilized projectors 130 may be indirectly linked to one or more gyroscopic sensors 152. In some embodiments, one or more gyroscopic sensors 152 may be used to stabilize one or more image stabilized projectors 130. Numerous types of gyroscopic sensors 152 have been described and are commercially available (e.g., U.S. Pat. Nos. 7,043,987; 7,159,441; 7,191,653; 7,232,700; 5,747,690; 6,675,630; Boeing, Inc., Seattle, Wash.; Hobby Services, Champaign, Ill.).

At embodiment 1206, module 220 may include one or more image-stabilized projectors that are operably associated with one or more laser gyroscopes. In some embodiments, one or more image-stabilized projectors 130 may include one or more image-stabilized projectors 130 that are operably associated with one or more laser gyroscopes. In some embodiments, one or more image stabilized projectors 130 may be directly linked to one or more laser gyroscopes. In some embodiments, one or more image stabilized projectors 130 may be indirectly linked to one or more laser gyroscopes. In some embodiments, one or more laser gyroscopes may be used to stabilize one or more image stabilized projectors 130. Numerous types of laser gyroscopes have been described and are commercially available (e.g., U.S. Pat. Nos. 7,330,269; 6,498,651; 5,757,490; 5,469,258; 7,245,381; Honeywell International Inc., Morristown, N.J.).

At embodiment 1208, module 220 may include one or more image-stabilized projectors that are operably associated with one or more inertial sensors. In some embodiments, one or more image-stabilized projectors 130 may include one or more image-stabilized projectors 130 that are operably associated with one or more inertial sensors 155. In some embodiments, one or more image stabilized projectors 130 may be directly linked to one or more inertial sensors 155. In some embodiments, one or more image stabilized projectors 130 may be indirectly linked to one or more inertial sensors 155. In some embodiments, one or more inertial sensors 155 may be used to stabilize one or more image stabilized projectors 130. In some embodiments, one or more inertial sensors 155 may be micro-electro-mechanical systems inertial sensors 155 that combine electrical and mechanical inertial sensing components. In some embodiments, such sensors 150 may be accelerometers that include miniature proof masses and sensing electronics and gyroscopes based on the coriolis effect using vibrating forks. Numerous types of inertial sensors 155 have been described and are commercially available (e.g., U.S. Pat. Nos. 7,363,816; 7,337,669; 7,287,428; 7,270,003; 7,252,002; 7,209,569; Honeywell International Inc., Morristown, N.J.).

At embodiment 1210, module 220 may include one or more image-stabilized projectors that are operably associated with one or more yaw rate sensors. In some embodiments, one or more image-stabilized projectors 130 may include one or more image-stabilized projectors 130 that are operably associated with one or more yaw rate sensors 161. In some embodiments, one or more image stabilized projectors 130 may be directly linked to one or more yaw rate sensors 161. In some embodiments, one or more image stabilized projectors 130 may be indirectly linked to one or more yaw rate sensors 161. In some embodiments, one or more yaw rate sensors 161 may be used to stabilize one or more image stabilized projectors 130. Numerous types of yaw rate sensors 161 have been described and are commercially available (e.g., U.S. Pat. Nos. 6,516,666; 6,708,087; 6,550,331; Nippon Denso Corp., Japan).

At embodiment 1212, module 220 may include one or more projectors that are configured to project one or more calibration images. In some embodiments, one or more image-stabilized projectors 130 may include one or more projectors that are configured to project one or more calibration images. Numerous types of calibration images may be projected. In some embodiments, one or more calibration images may be configured as a picture. In some embodiments, one or more calibration images may be configured as a pattern (e.g., star, triangle, circle, square, rectangle, etc.). In some embodiments, one or more calibration images may be configured in a grid pattern. In some embodiments, one or more calibration images that are visible to the human eye may be projected. In some embodiments, one or more calibration images that are invisible to the human eye may be projected. In some embodiments, one or more calibration images may be configured to facilitate alignment of images that are projected by two or more image-stabilized projectors 130. In some embodiments, one or more calibration images may be configured to facilitate focusing of one or more images that are projected onto an irregular projection surface 200.

Figure 13:
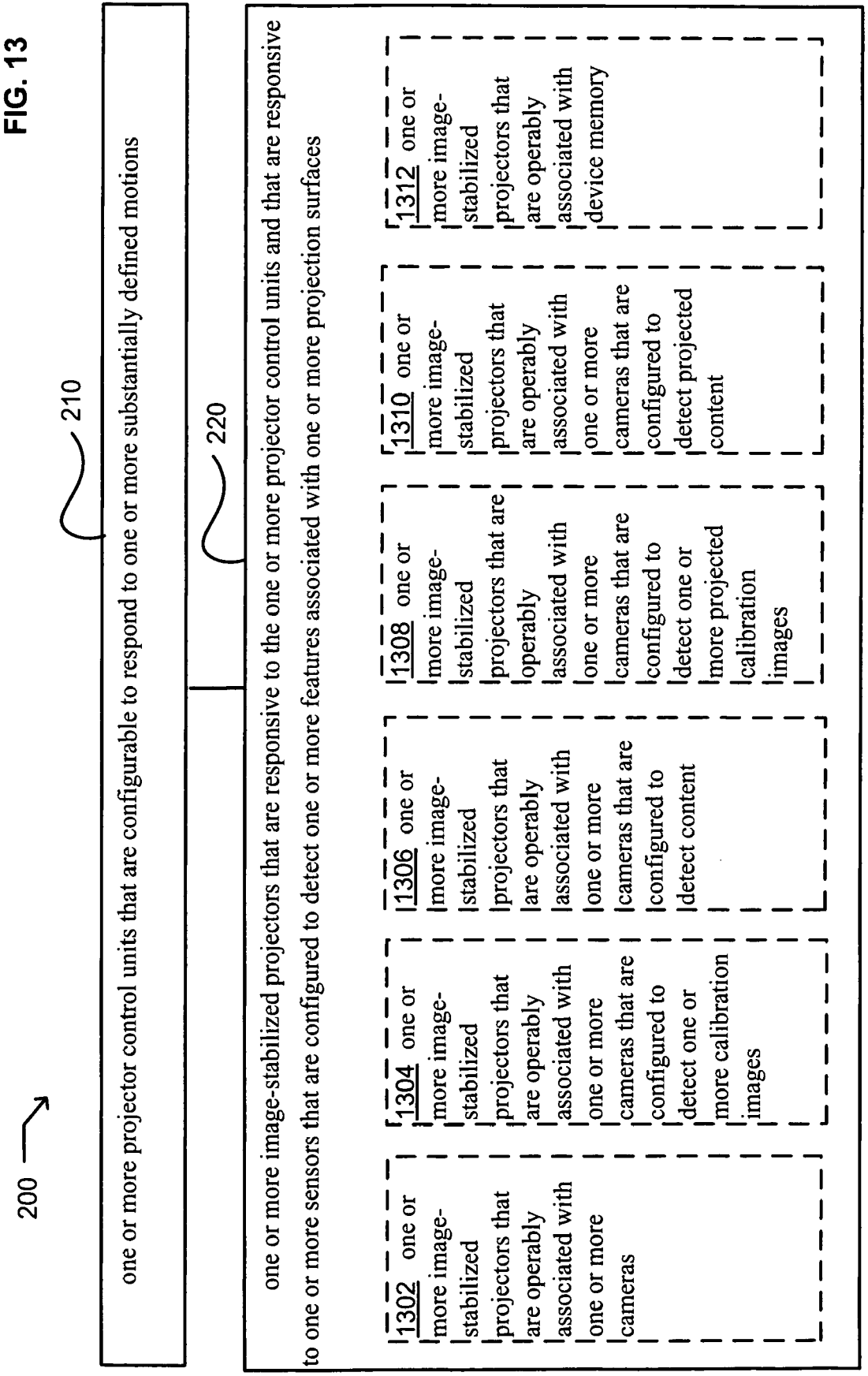
FIG. 13 illustrates alternate embodiments of the device of FIG. 2.

FIG. 13 illustrates alternative embodiments of embodiment 200 of device 105 within system 100 of FIG. 2. FIG. 13 illustrates example embodiments of module 220. Additional embodiments may include an embodiment 1302, an embodiment 1304, an embodiment 1306, an embodiment 1308, an embodiment 1310, and/or an embodiment 1312.

At embodiment 1302, module 220 may include one or more image-stabilized projectors that are operably associated with one or more cameras. In some embodiments, one or more image-stabilized projectors 130 may include one or more image-stabilized projectors 130 that are operably associated with one or more cameras 163. In some embodiments, one or more image stabilized projectors 130 may be responsive to one or more cameras 163 that are operably associated with the image stabilized projectors 130. In some embodiments, one or more cameras 163 may detect information associated with movement of one or more devices 105. Accordingly, one or more image stabilized projectors 130 may utilize the gathered information to adjust projection of content from the one or more image stabilized projectors 130. In some embodiments, one or more cameras 163 may detect information associated with one or more calibration images to determine features associated with one or more projection surfaces 200. Accordingly, one or more image stabilized projectors 130 may utilize the gathered information to focus content that is projected onto the one or more projection surfaces 200.

At embodiment 1304, module 220 may include one or more image-stabilized projectors that are operably associated with one or more cameras that are configured to detect one or more calibration images. In some embodiments, one or more image-stabilized projectors 130 may include one or more image-stabilized projectors 130 that are operably associated with one or more cameras 163 that are configured to detect one or more calibration images. In some embodiments, one or more cameras 163 may detect information associated with one or more calibration images to determine features associated with one or more projection surfaces 200. Accordingly, one or more image stabilized projectors 130 may utilize the gathered information to focus content that is projected onto the one or more projection surfaces 200. In some embodiments, one or more calibration images may be associated with one or more projection surfaces 200. For example, in some embodiments, one or more calibration images may be printed onto one or more projection surfaces 200. In some embodiments, one or more calibration images may be printed onto one or more projection surfaces 200 with ink that is not visible to the human eye. Accordingly, in some embodiments, one or more cameras 163 may be configured to detect one or more wavelengths of light that are emitted by the ink used to create one or more calibration marks.

At embodiment 1306, module 220 may include one or more image-stabilized projectors that are operably associated with one or more cameras that are configured to detect content. In some embodiments, one or more image-stabilized projectors 130 may include one or more image-stabilized projectors 130 that are operably associated with one or more cameras 163 that are configured to detect content. Numerous types of content that is associated with one or more projection surfaces 200 may be detected. Examples of such content include, but are not limited to, text, geometric shapes, marks, images, and the like.

At embodiment 1308, module 220 may include one or more image-stabilized projectors that are operably associated with one or more cameras that are configured to detect one or more projected calibration images. In some embodiments, one or more image-stabilized projectors 130 may include one or more image-stabilized projectors 130 that are operably associated with one or more cameras 163 that are configured to detect one or more projected calibration images. In some embodiments, one or more projectors may be used to project one or more calibration images. Accordingly, in some embodiments, one or more cameras 163 may be configured to detect the one or more projected calibration images. In some embodiments, such calibration images may be used to adjust projection by one or more image stabilized projectors 130.

At embodiment 1310, module 220 may include one or more image-stabilized projectors that are operably associated with one or more cameras that are configured to detect projected content. In some embodiments, one or more image-stabilized projectors 130 may include one or more image-stabilized projectors 130 that are operably associated with one or more cameras 163 that are configured to detect projected content. Numerous types of content that is projected onto one or more projection surfaces 200 may be detected. Examples of such content include, but are not limited to, text, geometric shapes, marks, images, and the like.

At embodiment 1312, module 220 may include one or more image-stabilized projectors that are operably associated with device memory. In some embodiments, one or more image-stabilized projectors 130 may include one or more image-stabilized projectors 130 that are operably associated with device memory 140. In some embodiments, one or more image stabilized projectors 130 may access device memory 140. For example, in some embodiments, device memory 140 may store content that may be accessed by one or more image stabilized projectors 130. Accordingly, in some embodiments, one or more projector control units 120 may instruct one or more image stabilized projectors 130 to access content stored on device memory 140. In some embodiments, device memory 140 may store one or more calibration images (e.g., coordinates to one or more images). In some embodiments, device memory 140 may include one or more substantially defined motion patterns that may be coordinated to one or more projection commands. In some embodiments, device memory 140 may include stored information associated with one or more sensors 150. For example, in some embodiments, device memory 140 may include stored information associated with wavelengths of light that should be projected under certain light conditions.

Figure 14:
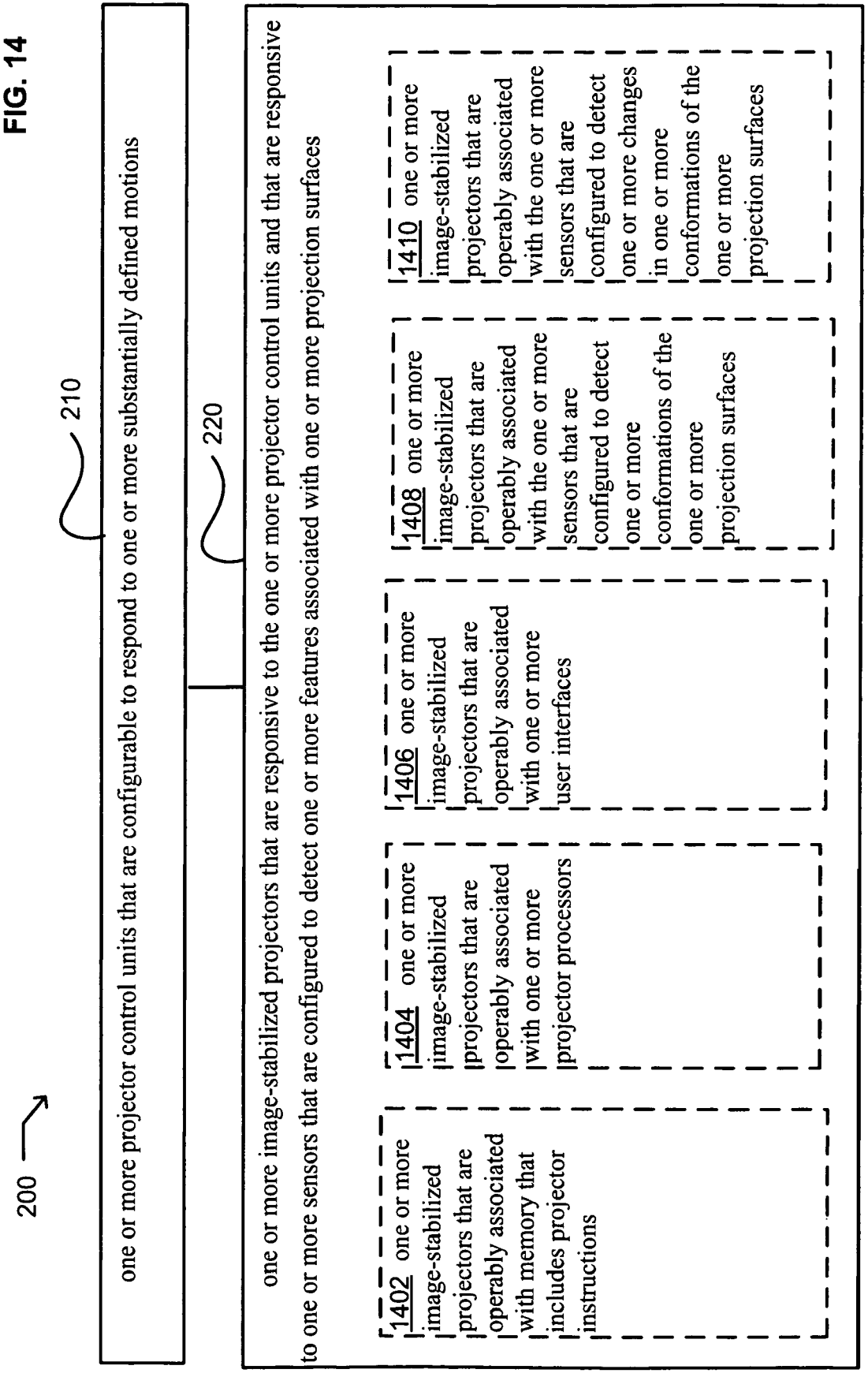
FIG. 14 illustrates alternate embodiments of the device of FIG. 2.

FIG. 14 illustrates alternative embodiments of embodiment 200 of device 105 within system 100 of FIG. 2. FIG. 14 illustrates example embodiments of module 220. Additional embodiments may include an embodiment 1402, an embodiment 1404, an embodiment 1406, an embodiment 1408, and/or an embodiment 1410.

At embodiment 1402, module 220 may include one or more image-stabilized projectors that are operably associated with memory that includes projector instructions. In some embodiments, one or more image-stabilized projectors 130 may include one or more image-stabilized projectors 130 that are operably associated with memory that includes projector instructions 133. In some embodiments, projector instructions 133 may include instructions to project content in response to one or more substantially defined motions that are imparted to device 105. In some embodiments, projector instructions 133 may include instructions to project one or more wavelengths of light. For example, in some embodiments, one or more projector instructions 133 may instruct one or more image stabilized projectors 130 to project infrared light, ultraviolet light, visible light, or substantially any combination thereof. In some embodiments, projector instructions 133 may instruct one or more image stabilized projectors 130 to project content in one or more directions. Accordingly, projector instructions 133 may include numerous types of instructions to control the operation of one or more image stabilized projectors 130.

At embodiment 1404, module 220 may include one or more image-stabilized projectors that are operably associated with one or more projector processors. In some embodiments, one or more image-stabilized projectors 130 may include one or more image-stabilized projectors 130 that are operably associated with one or more projector processors 131. In some embodiments, one or more projector processors 131 may receive information from one or more sensors 150 and process the information to instruct one or more image stabilized projectors 130. For example, in some embodiments, one or more projector processors 131 may receive information from one or more sensors 150 associated with substantially specific motion and process the information to instruct one or more image stabilized projectors 130. In some embodiments, one or more projector processors 131 may instruct one or more image stabilized projectors 130 to project specific content. In some embodiments, one or more projector processors 131 may instruct one or more image stabilized projectors 130 to access device memory 140 to obtain and project specific content.

At embodiment 1406, module 220 may include one or more image-stabilized projectors that are operably associated with one or more user interfaces. In some embodiments, one or more image-stabilized projectors 130 may include one or more image-stabilized projectors 130 that are operably associated with one or more user interfaces 300. In some embodiments, one or more user interfaces 300 may be used to control projection from one or more image stabilized projectors 130. For example, in some embodiments, one or more user inputs may be used to scroll through content that is projected.

At embodiment 1408, module 220 may include one or more image-stabilized projectors that are operably associated with the one or more sensors that are configured to detect one or more conformations of the one or more projection surfaces. In some embodiments, one or more image-stabilized projectors 130 may include one or more image-stabilized projectors 130 that are operably associated with one or more image-stabilized projectors 130 that are operably associated with one or more sensors 150 that are configured to detect one or more conformations of one or more projection surfaces 200.

At embodiment 1410, module 220 may include one or more image-stabilized projectors that are operably associated with the one or more sensors that are configured to detect one or more changes in one or more conformations of one or more projection surfaces. In some embodiments, one or more image-stabilized projectors 130 may include one or more image-stabilized projectors 130 that are operably associated with one or more image-stabilized projectors 130 that are operably associated with one or more sensors 150 that are configured to detect one or more changes in one or more conformations of one or more projection surfaces 200.

Figure 15:
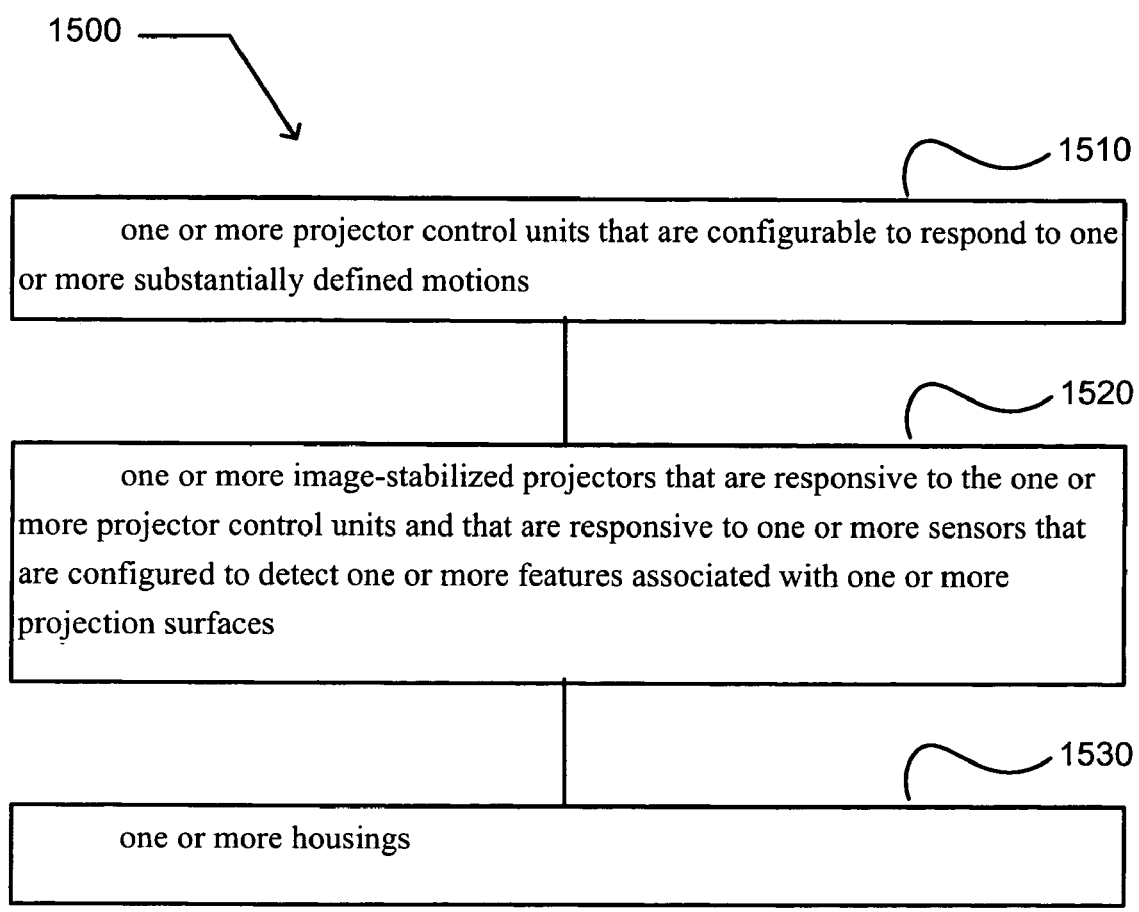
FIG. 15 illustrates an embodiment 1500 of a device.

FIG. 15 illustrates embodiment 1500 of device 105 within system 100. In FIG. 15, discussion and explanation may be provided with respect to the above-described example of FIG. 15, and/or with respect to other examples and contexts. In some embodiments, modules 210 and 220 of FIG. 2 may correspond to modules 1510 and 1520 of FIG. 15. However, it should be understood that the modules may execute operations in a number of other environments and contexts, and/or modified versions of FIG. 1. Also, although the various modules are presented in the sequence(s) illustrated, it should be understood that the various modules may be configured in numerous orientations.

The embodiment 1500 may include module 1510 that includes one or more projector control units that are configurable to respond to one or more substantially defined motions. In some embodiments, device 105 may include one or more projector control units 120 that are configurable to respond to one or more substantially defined motions. In some embodiments, a projector control unit 120 may be preconfigured to respond to one or more substantially defined motions. For example, in some embodiments, a projector control unit 120 may be preconfigured to respond to a substantially rightward motion followed by return to a starting position by advancing the progression of a presentation being projected by one or more image stabilized projectors 130. In some embodiments, a projector control unit 120 may be preconfigured to respond to a substantially upward motion followed by return to a starting position by increasing the volume of sound being projected from one or more image stabilized projectors 130. Accordingly, in some embodiments, a projector control unit 120 may be preconfigured to respond to numerous substantially defined motions. In some embodiments, a projector control unit 120 may be configurable to respond to one or more substantially user 600 defined motions. For example, in some embodiments, a user 600 may select substantially defined motions to which a projector control unit 120 will respond. For example, in some embodiments, a user 600 may cause a projector control unit 120 to correlate clockwise motion with advancement of a projection series. Accordingly, in some embodiments, numerous substantially defined motions may be correlated with commands for controlling the operation of one or more image stabilized projectors 130. In some embodiments, the parameters of one or more substantially defined motions that are recognized by one or more projector control units 120 may be set by one or more users 600. For example, in some embodiments, the minimum acceleration imparted to one or more devices 105 that is recognized by one or more projector control units 120 may be set by one or more users 600. Accordingly, numerous substantially defined motions that are recognized by one or more projector control units 120 may be set by one or more users 600.

The embodiment 1500 may include module 1520 that includes one or more image-stabilized projectors that are responsive to the one or more projector control units and that are responsive to one or more sensors that are configured to detect one or more features associated with one or more projection surfaces. In some embodiments, device 105 may include one or more image-stabilized projectors 130 that are responsive to one or more features associated with one or more projection surfaces 200 and that are operably associated with one or more projector control units 120. In some embodiments, one or more image stabilized projectors 130 may be responsive to numerous features associated with one or more projection surfaces 200. In some embodiments, an image stabilized projector 130 may vary the brightness of projection based on one or more features of one or more projection surfaces 200. For example, in some embodiments, one or more image stabilized projectors 130 may increase projection flux if one or more projection surfaces 200 are in bright light. In some embodiments, one or more image stabilized projectors 130 may decrease projection flux if one or more projection surfaces 200 are in dim light. In some embodiments, one or more image stabilized projectors 130 may modulate one or more projections in response to one or more calibration images. For example, in some embodiments, two or more image stabilized projectors 130 may project an image that is modulated in response to a calibration image to cause the projected image to be in register. In some embodiments, one or more image stabilized projectors 130 may modulate a projected image in response to movement of a projection surface 200. For example, in some embodiments, one or more image stabilized projectors 130 may project a first content set when a projection surface 200 is in a first position and project a second content set when the projection surface 200 is in a second position. In some embodiments, one or more image stabilized projectors 130 may modulate a projected image in response to a conformation of a projection surface 200. For example, in some embodiments, one or more image stabilized projectors 130 may project a first content set when a projection surface 200 is in a first conformation and project a second content set when the projection surface 200 is in a second conformation. Accordingly, in some embodiments, one or more image stabilized projectors 130 may be configured to respond to one or more substantially defined motions and one or more features of one or more projection surfaces 200.

The embodiment 1500 may include module 1530 that includes one or more housings. In some embodiments, device 105 may include one or more housings 110. A housing 110 may exhibit numerous configurations. In some embodiments, a housing 110 may be configured as a handheld housing 111. For example, in some embodiments, a housing 110 may be configured as a computer mouse. In some embodiments, a housing 110 may be configured as a laser pointer. In some embodiments, a housing 110 may be configured as a mountable housing 113. In some embodiments, a housing 110 may be configured to be attached to a person. For example, in some embodiments, a housing 110 that includes an image stabilized projector 130 may be configured to be attached to a runner so that the image stabilized projector 130 can project an image of a running companion next to the runner. In some embodiments, a housing 110 may be configured to be attached to a building. For example, in some embodiments, a housing 110 may be configured to be mounted onto a wall, a floor, a ceiling, and the like. Accordingly, a housing 110 may be configured in numerous ways.

Figure 16:
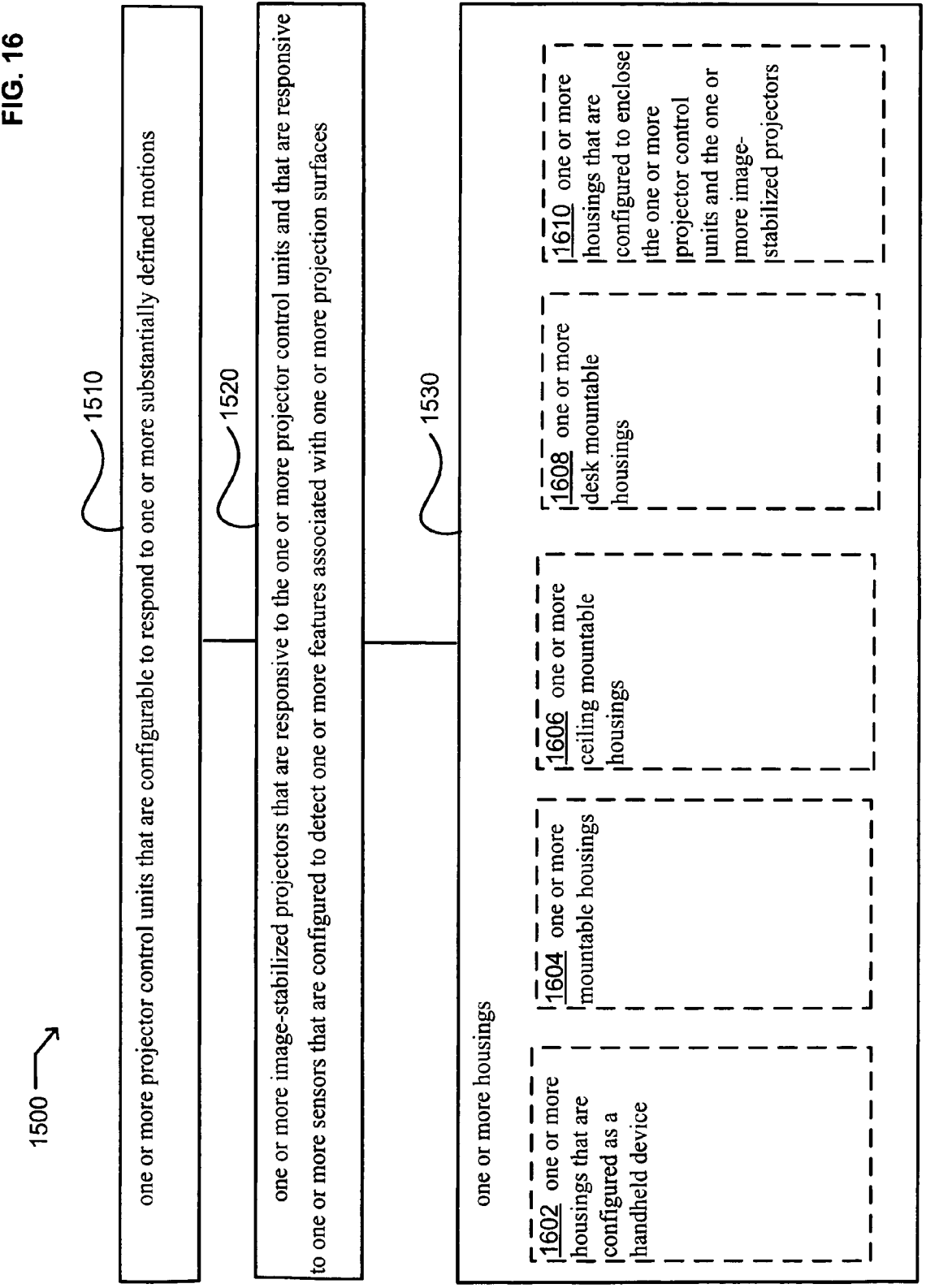
FIG. 16 illustrates alternate embodiments of the device of FIG. 15.

FIG. 16 illustrates alternative embodiments of embodiment 1500 of device 105 within system 100 of FIG. 15. FIG. 16 illustrates example embodiments of module 1530. Additional embodiments may include an embodiment 1602, an embodiment 1604, an embodiment 1606, an embodiment 1608, and/or an embodiment 1610.

At embodiment 1602, module 1530 may include one or more housings that are configured as a handheld device. In some embodiments, one or more housings 110 may include one or more housings 110 that are configured as a handheld device 105. A housing 110 may be configured to include numerous components of device 105. Examples of such components include, but are not limited to, one or more image stabilized projectors 130, one or more projection control units 120, one or more motion response modules 190, one or more memories, one or more sensors 150, one or more sensor control units 170, and one or more interface modules 180. In some embodiments, a housing 110 may be configured as a handheld projector. In some embodiments, a housing 110 may be configured as a handheld computer mouse. In some embodiments, a housing 110 may be configured as a handheld laser pointer. Accordingly, a housing 110 may exhibit numerous conformations.

At embodiment 1604, module 1530 may include one or more mountable housings. In some embodiments, one or more housings 110 may include one or more housings 110 that are configured as a mountable housing 113. A housing 110 may be configured to include numerous components of device 105. Examples of such components include, but are not limited to, one or more image stabilized projectors 130, one or more projection control units 120, one or more motion response modules 190, one or more memories, one or more sensors 150, one or more sensor control units 170, and one or more interface modules 180. In some embodiments, a housing 110 may be configured to be mounted on a building structure. For example, in some embodiments, a housing 110 may be configured to be mounted on a wall, a floor, a ceiling, or substantially any combination thereof. In some embodiments, one or more housings 110 may be configured to be mounted on one or more building structures and be configured to project content onto one or more projection surfaces 200 that are building structures. Examples of such projection surfaces 200 include, but are not limited to, walls, floors, ceilings, or substantially any combination thereof. In some embodiments, a housing 110 may be configured to be mounted on a vehicle or a portion of a vehicle. For example, in some embodiments, a device 105 may be configured to be mounted on an airplane seat such that the device 105 projects content onto a table associated with the airplane seat. In some embodiments, a housing 110 may be configured to be mounted on a person. In some embodiments, a housing 110 may be configured to be mounted onto a headband, an armband, a belt, and the like, such that it may be worn by a person.

At embodiment 1606, module 1530 may include one or more ceiling mountable housings. In some embodiments, one or more housings 110 may include one or more housings 110 that are configured as a ceiling mountable housing 113. A housing 110 may be configured to include numerous components of device 105. Examples of such components include, but are not limited to, one or more image stabilized projectors 130, one or more projection control units 120, one or more motion response modules 190, one or more memories, one or more sensors 150, one or more sensor control units 170, and one or more interface modules 180.

At embodiment 1608, module 1530 may include one or more desk mountable housings. In some embodiments, one or more housings 110 may include one or more housings 110 that are configured as a desk mountable housing 113. A housing 110 may be configured to include numerous components of device 105. Examples of such components include, but are not limited to, one or more image stabilized projectors 130, one or more projection control units 120, one or more motion response modules 190, one or more memories, one or more sensors 150, one or more sensor control units 170, and one or more interface modules 180. In some embodiments, a housing 110 may be configured to be mounted onto a desk. Accordingly, in some embodiments, a housing 110 may be configured to project content onto a desktop. For example, in some embodiments, a device 105 may be configured to project pages of a book onto a desktop in a manner that is responsive to motion that is imparted to the device 105.

At embodiment 1610, module 1530 may include one or more housings that are configured to enclose the one or more projector control units and the one or more image-stabilized projectors. In some embodiments, one or more housings 110 may include one or more housings 110 that are configured to enclose one or more projector control units 120 and one or more image-stabilized projectors. A housing 110 may be configured to include numerous components, and combinations of components, of device 105. Examples of such components include, but are not limited to, one or more image stabilized projectors 130, one or more projection control units 120, one or more motion response modules 190, one or more memories, one or more sensors 150, one or more sensor control units 170, one or more transmitters 18B, one or more receivers 18C, and one or more interface modules 180.

Figure 17:
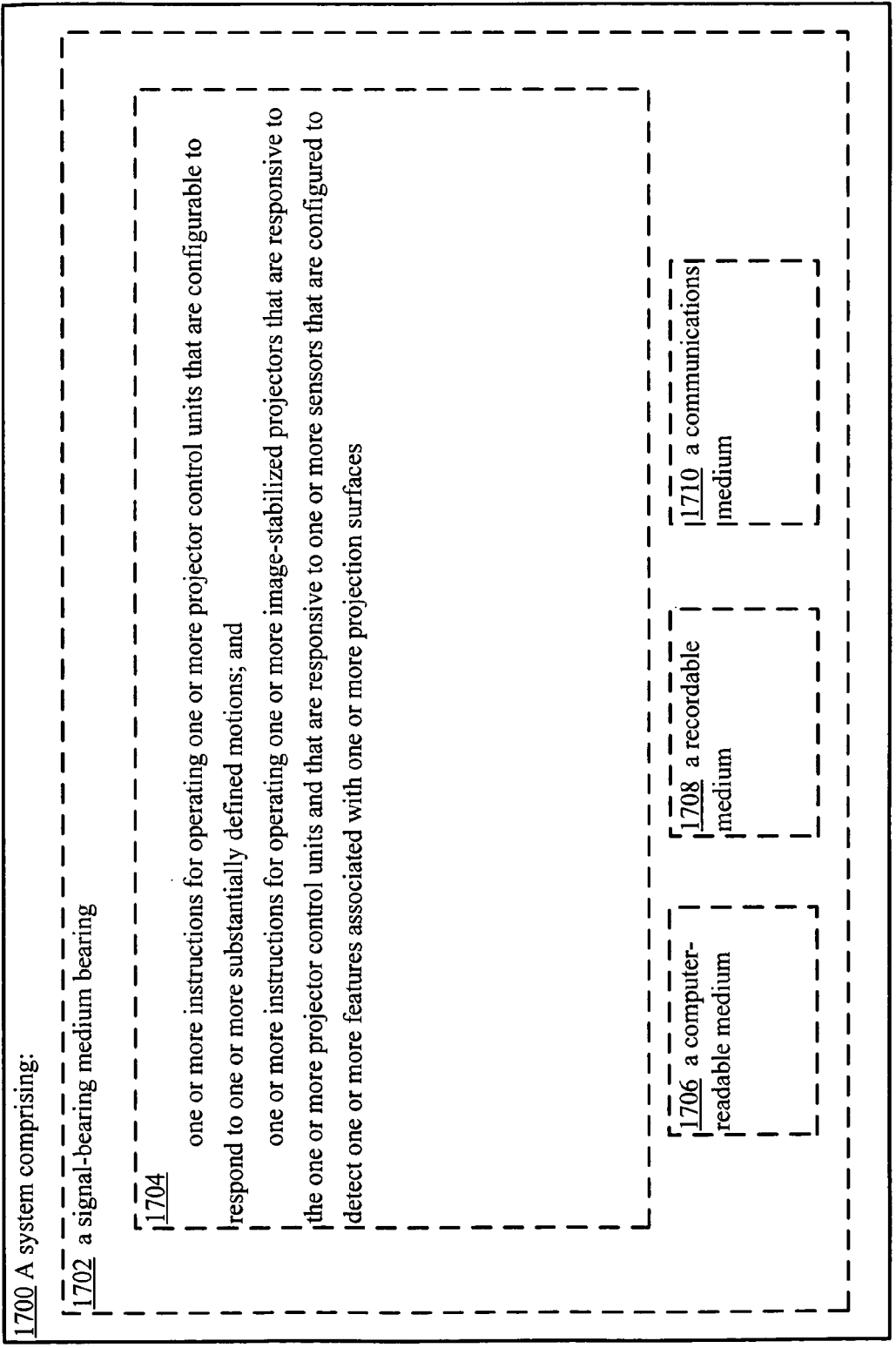
FIG. 17 illustrates a partial view of a system 1700 that includes a computer program for executing a computer process on a computing device.

FIG. 17 illustrates a partial view of a system 1700 that includes a computer program 1704 for executing a computer process on a computing device. An embodiment of system 1700 is provided using a signal-bearing medium 1702 bearing one or more instructions for operating one or more projector control units 120 that are configurable to respond to one or more substantially defined motions and one or more instructions for operating one or more image-stabilized projectors 130 that are responsive to the one or more projector control units 120 and that are responsive to one or more sensors 150 that are configured to detect one or more features associated with one or more projection surfaces 200. The one or more instructions may be, for example, computer executable and/or logic-implemented instructions. In some embodiments, the signal-bearing medium 1702 may include a computer-readable medium 1706. In some embodiments, the signal-bearing medium 1702 may include a recordable medium 1708. In some embodiments, the signal-bearing medium 1702 may include a communications medium 1710.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electromechanical systems include but are not limited to a variety of consumer electronics systems, medical devices, as well as other systems such as motorized transport systems, factory automation systems, security systems, and/or communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces 300, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces 300, drivers, sensors 150, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those skilled in the art will appreciate that a user 600 may be representative of a human user 600, a robotic user 600 (e.g., computational entity), and/or substantially any combination thereof (e.g., a user may be assisted by one or more robotic agents) unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise. While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A device comprising:
    one or more projector control units that are configurable to respond to one or more substantially defined motions; and
    one or more image-stabilized projectors that are responsive to the one or more projector control units and that are responsive to one or more projection surface sensors that are configured to detect one or more features associated with the one or more projection surfaces,
    wherein the one or more projector control units that are configurable to respond to one or more substantially defined motions include:
    one or more projector control units that are operably associated with one or more control unit receivers that are configurable to wirelessly receive via the one or more projection surface sensors one or more signals that include information associated with one or more conformations of the one or more projection surfaces, the one or more projection surface sensors being co-located with the one or more projection surfaces and configured to detect the one or more conformations of the one or more projection surfaces resulting from a first magnetic ink applied to the one or more projection surfaces and resulting from a second magnetic ink applied to the one or more projection surfaces.

2. The device of claim 1, wherein the one or more image-stabilized projectors that are responsive to the one or more projector control units and that are responsive to one or more projection surface sensors that are configured to detect one or more features associated with one or more projection surfaces comprise:
    one or more image-stabilized projectors that are operably associated with the one or more projection surface sensors via the one or more projector control units.

3. The device of claim 1, further comprising:
    one or more housings.

4. The device of claim 3, wherein the one or more housings comprise:
    one or more housings that are configured as a handheld device.

5. The device of claim 3, wherein the one or more housings comprise:
    one or more mountable housings.

6. The device of claim 1, wherein the one or more projector control units that are configurable to respond to one or more substantially defined motions further comprise:
    one or more projector control units that are operably associated with one or more control unit transmitters that are configurable to wirelessly transmit one or more signals that instruct the one or more projection surfaces to transmit the one or more signals that include the information associated with the one or more conformations of the one or more projection surfaces.

7. The device of claim 1, wherein the features include a pressure applied to the one or more projection surfaces, a magnetic ink applied to the one or more projection surfaces, or physical conformations associated with the one or more projection surfaces resulting from a strain to the one or more projection surfaces.

8. The device of claim 1, wherein the one or more projection surface sensors include one or more strain surface sensors.

9. The device of claim 1, wherein the one or more projector control units are configurable to respond to the one or more substantial defined motion by instantiating a change of content projected onto the projection surface.

10. The device of claim 1, wherein the one or more projector control unit are configurable to respond to one or more projection surface sensors detecting features associated with one or more projection surfaces by instantiating a change of content projected onto the projection surface.

11. A system comprising:
    circuitry for operating one or more projector control units that are configurable to respond to one or more substantially defined motions; and circuitry for operating one or more image-stabilized projectors that are responsive to the one or more projector control units and that are responsive to one or more projection surface sensors that are configured to detect one or more features associated with one or more projection surfaces, wherein the circuitry for operating one or more projector control units that are configurable to respond to one or more substantially defined motions includes:

circuitry for operating one or more projector control units that are operably associated with one or more control unit receivers that are configurable to wirelessly receive via the one or more projection surface sensors one or more signals that include information associated with one or more conformations of the one or more projection surfaces, the one or more projection surface sensors being co-located with the one or more projection surfaces and configured to detect the one or more conformations of the one or more projection surfaces resulting from a magnetic ink applied to the one or more projection surfaces.

12. The system of claim 11, wherein the circuitry for operating one or more image-stabilized projectors that are responsive to the one or more projector control units and that are responsive to one or more projection surface sensors that are configured to detect one or more features associated with one or more projection surfaces comprises:

circuitry for operating one or more image-stabilized projectors that are operably associated with the one or more projection surface sensors via the one or more projector control units.

13. The system of claim 11, wherein the circuitry for operating one or more projector control units that are configurable to respond to one or more substantially defined motions further comprises:

circuitry for operating one or more projector control units that are operably associated with one or more control unit transmitters that are configurable to wirelessly transmit one or more signals that instruct the one or more projection surfaces to transmit the one or more signals that include the information associated with the one or more conformations of the one or more projection surfaces.

14. A system comprising:

means for operating one or more projector control units that are configurable to respond to one or more substantially defined motions associated with one or more projection surfaces; and means for operating one or more image-stabilized projectors that are responsive to the one or more projector control units and that are responsive to one or more projection surface sensors that are configured to detect one or more features associated with the one or more projection surfaces resulting from a magnetic ink applied to the one or more projection surfaces, wherein the means for operating one or more projector control units that are configurable to respond to one or more substantially defined motions associated with the one or more projection surfaces includes:

means for operating one or more projector control units that are operably associated with one or more control unit receivers that are configurable to wirelessly receive via the one or more projection surface sensors one or more signals that include information associated with one or more conformations of the one or more projection surfaces, the one or more projection surface sensors configured to detect the one or more conformations of the one or more projection surfaces.

15. The system of claim 14, wherein the means for operating one or more projector control units that are configurable to respond to one or more substantially defined motions further comprises:

means for operating one or more projector control units that are operably associated with one or more control unit transmitters that are configurable to wirelessly transmit one or more signals that instruct the one or more projection surfaces to transmit the one or more signals that include the information associated with the one or more conformations of the one or more projection surfaces.

16. A system comprising:

an article of manufacture including a non-transitory signal-bearing medium bearing:

one or more instructions which when executed by a processor result in one or more projector control units responding to one or more substantially defined motions associated with the one or more projection surfaces by instantiating a change in content projected onto one or more projection surfaces by one or more image-stabilized projectors; and one or more instructions which when executed by the processor result in the one or more image-stabilized projectors responding to the one or more projector control units and responding to one or more projection surface sensors that are configured to detect one or more features associated with the one or more projection surfaces resulting from a magnetic ink applied to the one or more projection surfaces, wherein the one or more instructions which when executed by the processor result in the one or more projector control units responding to one or more substantially defined motions associated with the one or more projection surfaces by instantiating a change in content projected by the one or more image-stabilized projectors include:

one or more instructions which when executed by the processor result in the one or more projector control units that are operably associated with one or more control unit receivers wirelessly receiving via the one or more projection surface sensors one or more signals that include information associated with one or more conformations of the one or more projection surfaces, the one or more projection surface sensors configured to detect the one or more conformations of the one or more projection surfaces.

17. The system of claim 16, wherein the one or more instructions for operating one or more projector control units that are configurable to respond to one or more substantially defined motions further comprise:

one or more instructions for operating one or more projector control units that are operably associated with one or more control unit transmitters that are configurable to wirelessly transmit one or more signals that instruct the one or more projection surfaces to transmit the one or more signals that include the information associated with the one or more conformations of the one or more projection surfaces.

* * * * *